US012321283B2

(12) United States Patent
Yoshida et al.

(10) Patent No.: US 12,321,283 B2
(45) Date of Patent: Jun. 3, 2025

(54) MEMORY SYSTEM AND METHOD FOR CONTROLLING NONVOLATILE MEMORY

(71) Applicant: Kioxia Corporation, Tokyo (JP)

(72) Inventors: Hideki Yoshida, Yokohama Kanagawa (JP); Shinichi Kanno, Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/593,823

(22) Filed: Mar. 1, 2024

(65) Prior Publication Data

US 2024/0202135 A1 Jun. 20, 2024

Related U.S. Application Data

(63) Continuation of application No. 17/689,787, filed on Mar. 8, 2022, now Pat. No. 11,954,043, which is a (Continued)

(30) Foreign Application Priority Data

Oct. 27, 2017 (JP) ................... 2017-208115

(51) Int. Cl.
G06F 12/1009 (2016.01)
G06F 3/06 (2006.01)
(Continued)

(52) U.S. Cl.
CPC ........ *G06F 12/1009* (2013.01); *G06F 3/0662* (2013.01); *G06F 9/4401* (2013.01); (Continued)

(58) Field of Classification Search
None
See application file for complete search history.

(56) References Cited

U.S. PATENT DOCUMENTS 6,763,424 B2 7/2004 Conley
6,804,674 B2 10/2004 Hsiao et al.
(Continued)

FOREIGN PATENT DOCUMENTS

JP 2006-164280 A 6/2006
JP 5589205 B2 9/2014
(Continued)

OTHER PUBLICATIONS

Yiying Zhang et al., "De-indirection for Flash-based SSDs with Nameless Writes", 10th USENIX Conference on File and Storage Technologies (FAST '12), Feb. 14-17, 2012, pp. 1-16.
(Continued)

Primary Examiner — Kaushikkumar M Patel
(74) Attorney, Agent, or Firm — Maier & Maier, PLLC

(57) ABSTRACT

According to one embodiment, when a read request received from a host includes a first identifier indicative of a first region, a memory system obtains a logical address from the received read request, obtains a physical address corresponding to the obtained logical address from a logical-to-physical address translation table which manages mapping between logical addresses and physical addresses of the first region, and reads data from the first region, based on the obtained physical address. When the received read request includes a second identifier indicative of a second region, the memory system obtains physical address information from the read request, and reads data from the second region, based on the obtained physical address information.

19 Claims, 40 Drawing Sheets

Related U.S. Application Data continuation of application No. 16/725,094, filed on Dec. 23, 2019, now Pat. No. 11,347,655, which is a continuation of application No. 15/984,703, filed on May 21, 2018, now Pat. No. 10,552,336.

(51) Int. Cl.
*G06F 9/4401* (2018.01)
*G06F 12/02* (2006.01)

(52) U.S. Cl.
CPC .... *G06F 12/0246* (2013.01); *G06F 2212/202* (2013.01); *G06F 2212/657* (2013.01)

(56) References Cited

U.S. PATENT DOCUMENTS

| | | |
|---|---|---|
| 7,512,957 B2 | 3/2009 | Cohen et al. |
| 7,565,478 B2 | 7/2009 | Bennett et al. |
| 7,934,049 B2 | 4/2011 | Holtzman et al. |
| 2002/0002661 A1 | 1/2002 | Blumenau et al. |
| 2007/0143570 A1 | 6/2007 | Gorobets et al. |
| 2008/0172519 A1 | 7/2008 | Shmulevich et al. |
| 2010/0306452 A1 | 12/2010 | Weber et al. |
| 2011/0055458 A1 | 3/2011 | Kuehne |
| 2011/0107018 A1 | 5/2011 | Honda |
| 2011/0119464 A1 | 5/2011 | Karr et al. |
| 2011/0137966 A1 | 6/2011 | Srinivasan |
| 2012/0246385 A1 | 9/2012 | Dhandapani et al. |
| 2012/0284587 A1 | 11/2012 | Yu et al. |
| 2013/0191580 A1 | 7/2013 | Lasser |
| 2013/0246721 A1 | 9/2013 | Fukutomi et al. |
| 2013/0250686 A1 | 9/2013 | Marukame et al. |
| 2013/0275656 A1 | 10/2013 | Talagala et al. |
| 2013/0325915 A1 | 12/2013 | Ukai |
| 2014/0025864 A1 | 1/2014 | Zhang et al. |
| 2015/0186259 A1 | 7/2015 | Thomas et al. |
| 2015/0242454 A1 | 8/2015 | Bakre et al. |
| 2015/0261452 A1 | 9/2015 | Moon et al. |
| 2015/0370700 A1 | 12/2015 | Sabol et al. |
| 2016/0041760 A1 | 2/2016 | Kuang et al. |
| 2016/0062885 A1 | 3/2016 | Ryu |
| 2016/0170903 A1 | 6/2016 | Kanno et al. |
| 2016/0283114 A1 | 9/2016 | Kimura et al. |
| 2016/0321010 A1 | 11/2016 | Hashimoto |
| 2017/0024276 A1 | 1/2017 | Kanno |
| 2017/0116131 A1 | 4/2017 | Lin |
| 2017/0123971 A1 | 5/2017 | Kanaujia et al. |
| 2017/0139823 A1 | 5/2017 | Tomlin et al. |
| 2017/0139837 A1 | 5/2017 | Tomlin |
| 2017/0139838 A1 | 5/2017 | Tomlin |
| 2017/0255389 A1 | 9/2017 | Tan |
| 2017/0262175 A1 | 9/2017 | Kanno |
| 2017/0262228 A1* | 9/2017 | Kanno ............... G11C 16/10 |
| 2017/0262365 A1 | 9/2017 | Kanno |
| 2017/0357462 A1* | 12/2017 | Walker ............... G06F 3/0683 |
| 2018/0173619 A1 | 6/2018 | Sivasankaran et al. |
| 2018/0246821 A1 | 8/2018 | Kanno |
| 2018/0335947 A1 | 11/2018 | Martineau et al. |
| 2019/0079859 A1 | 3/2019 | Li et al. |
| 2019/0087089 A1 | 3/2019 | Yoshida et al. |
| 2019/0129838 A1 | 5/2019 | Yoshida et al. |

FOREIGN PATENT DOCUMENTS

| | | |
|---|---|---|
| JP | 2016-181058 A | 10/2016 |
| JP | 2017-27388 A | 2/2017 |
| JP | 2017-162065 A | 9/2017 |
| JP | 2019-57155 A | 4/2019 |
| TW | 2014-03318 A | 1/2014 |
| TW | 201510723 A | 3/2015 |
| TW | 201723816 A | 7/2017 |
| TW | 201732821 A | 9/2017 |

OTHER PUBLICATIONS

Jian Huang et al., "FlashBlox: Achieving Both Performance Isolation and Uniform Lifetime for Virtualized SSDs," 15th USENIX Conference on File and Storage Technologies (FAST '17), Feb. 27-Mar. 2, 2017, pp. 375-390.

"Information technology—ATA/ATAPI Command Set—3 (ACS-3," Revision 5, Working Draft Project American National Standard, Oct. 28, 2013, pp. 1-554.

* cited by examiner

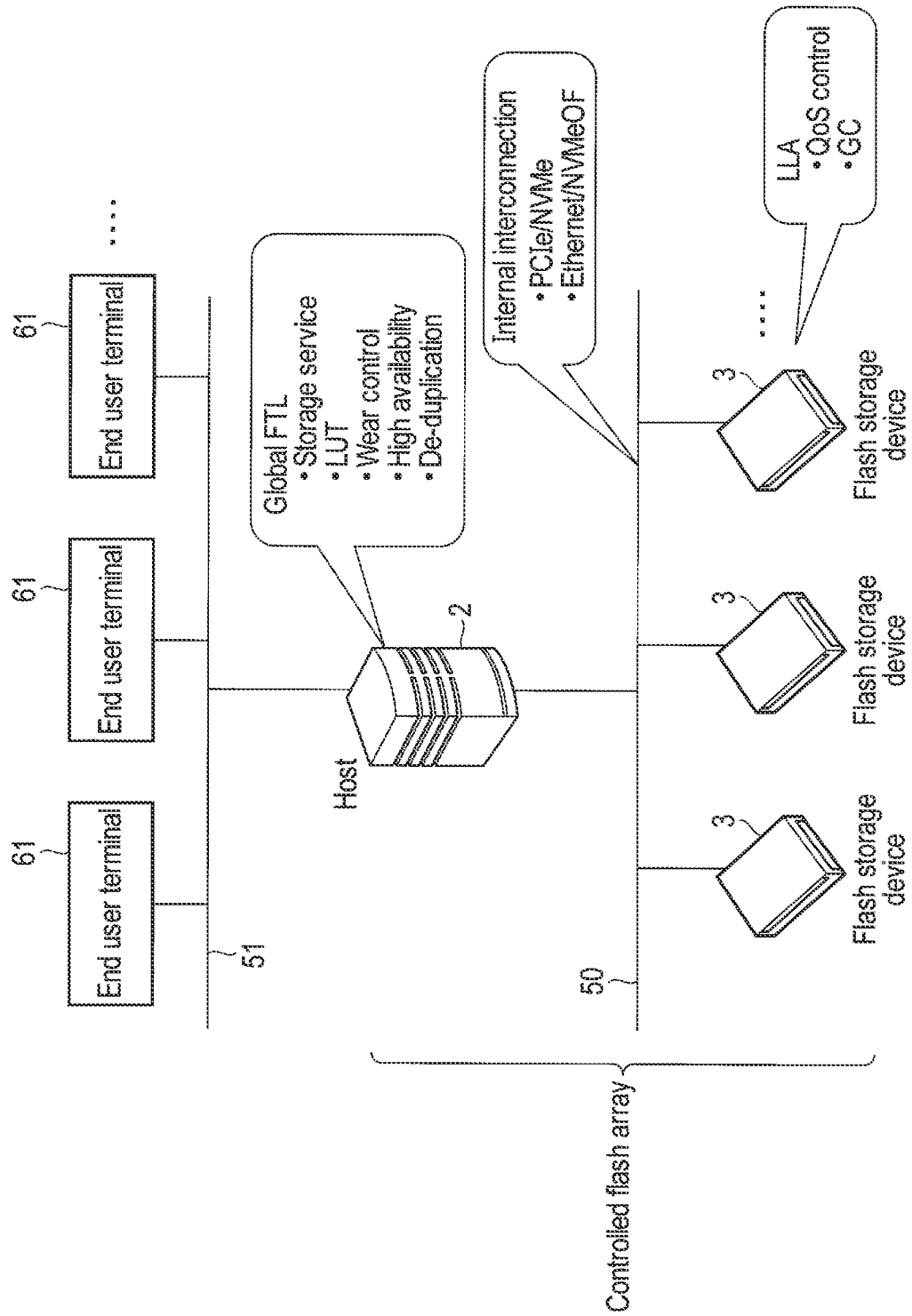
F I G. 1

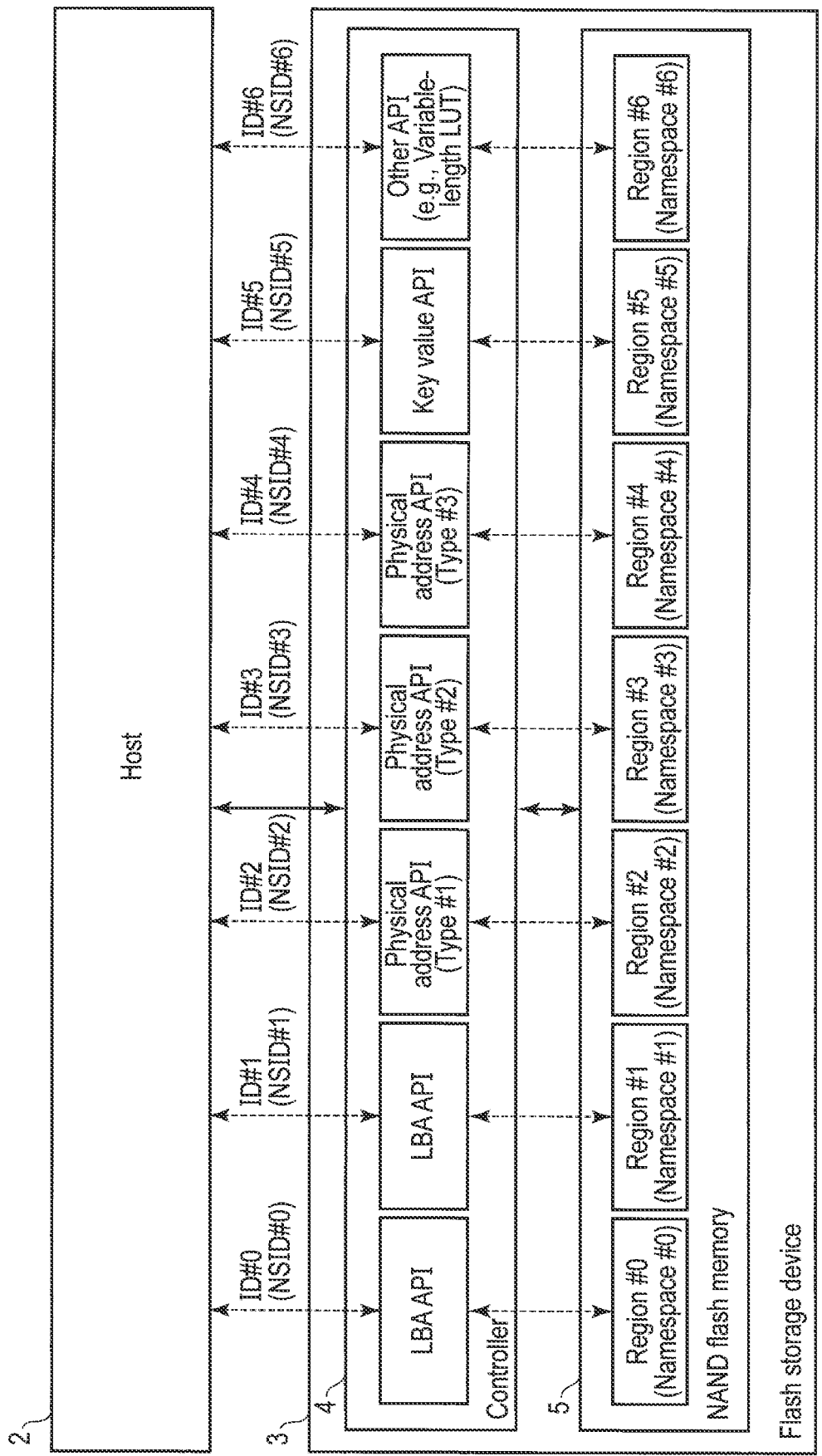
F I G. 2

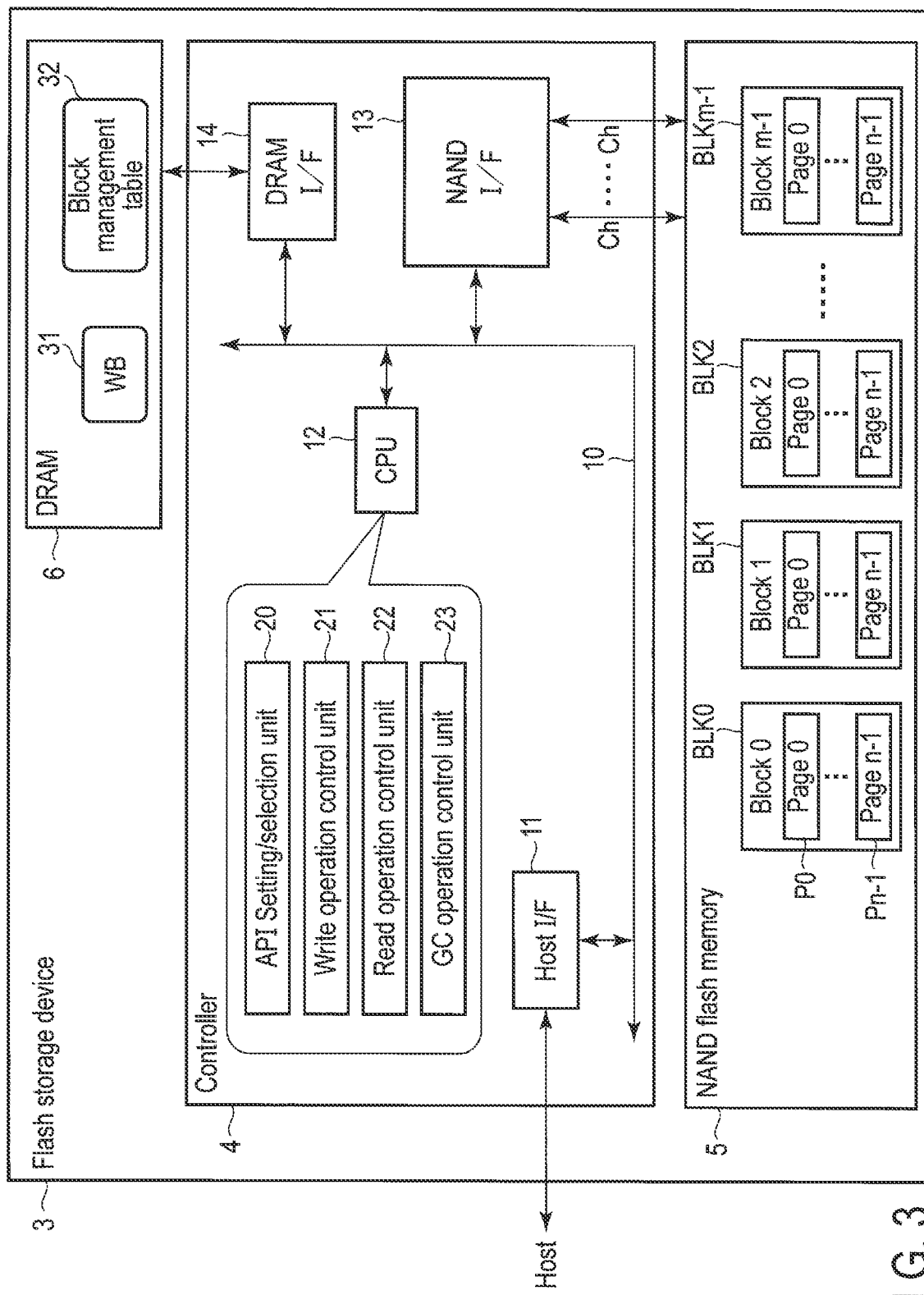
F I G. 3

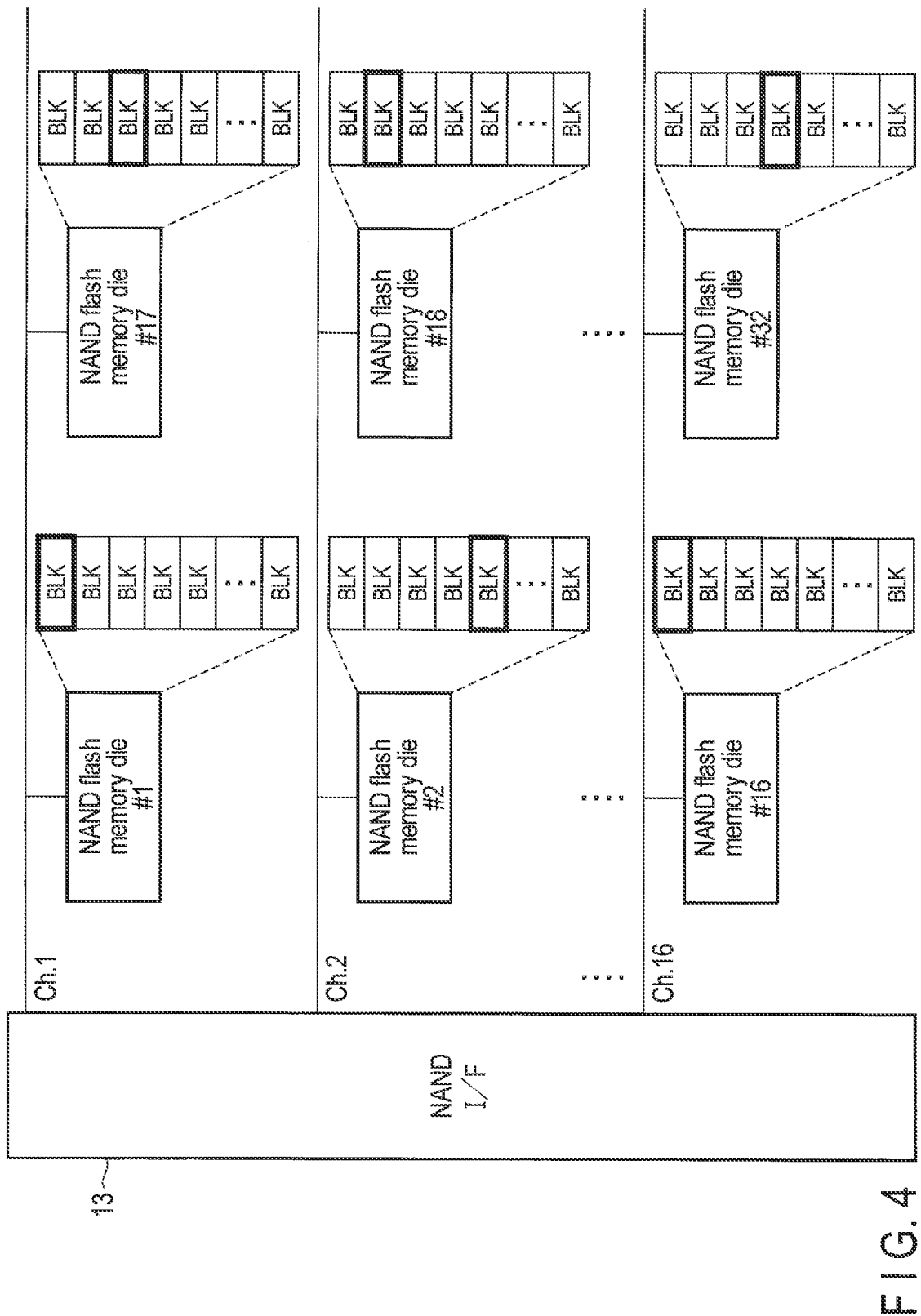
F I G. 4

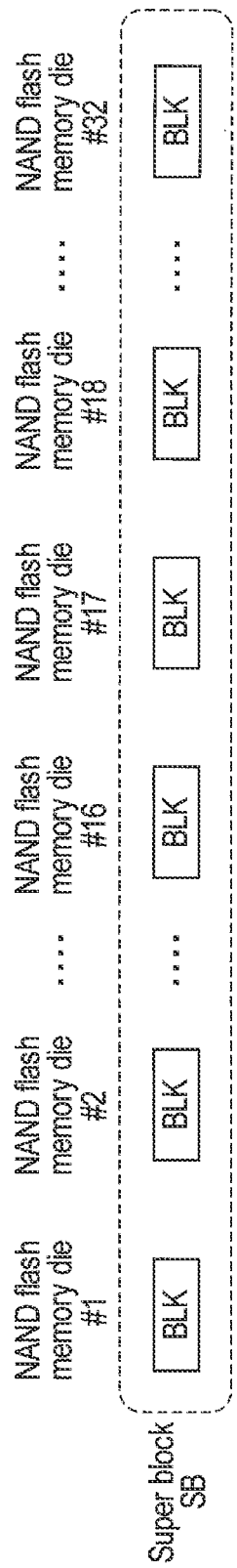
F I G. 5

Extended namespace management command

| Parameters | Description |
|---|---|
| Create/Delete | 0h: Create<br>1h: Delete |
| LBA range | 0 to N-1 |
| Physical resource size (or overprovision size) | Number of physical blocks to be secured (or number of physical blocks to be secured for overprovision) |
| API type (Namespace type) | 000 : LBA<br>001 : Physical address API (Type #1)<br>010 : Physical address API (Type #2)<br>011 : Physical address API (Type #3)<br>100 : Key value<br>101 : Other API (e.g., Variable-length LUT) |

F I G. 6

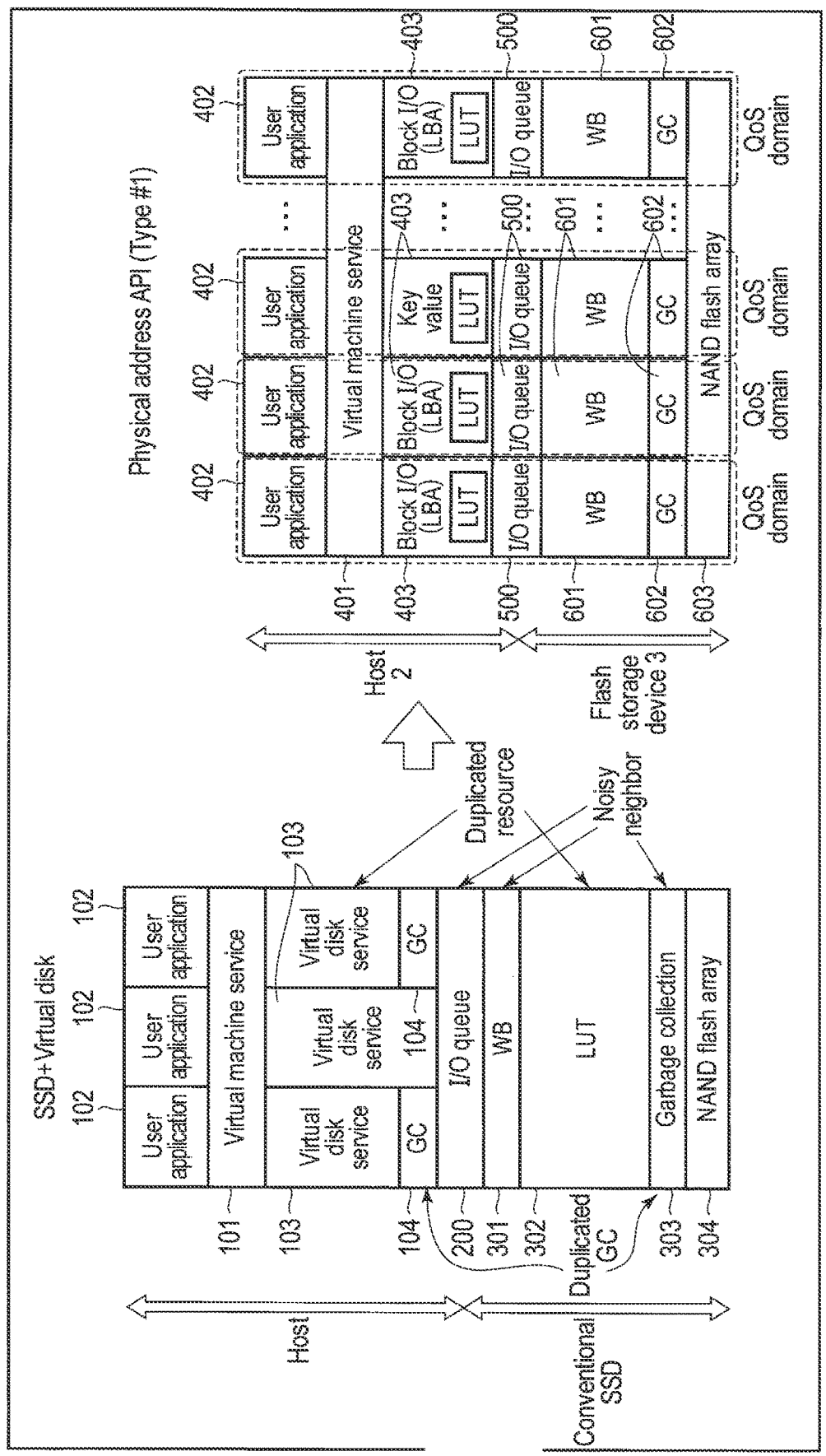
F I G. 8

Write command

|  | Description |
|---|---|
| Command ID | Command ID for write command |
| QoS domain ID | Identifier to uniquely identify QoS domain to which data should be written |
| Logical address | Logical address is indicative of logical location to which data should be written |
| Length | Length of data to be written (data length can be designated by number of grains) |

FIG. 9

Response to write command

|  | Description |
|---|---|
| Logical address | Logical address included in write command |
| Physical address | Physical address is indicative of physical location to which data is written. Physical address is designated by block number and offset. |
| Length | Length of data written (data length can be designated by number of grains) |

FIG. 10

Trim command (capable of designating physical address)

|  | Description |
|---|---|
| Command ID | Command ID for Trim command |
| Physical address | Physical address is indicative of first physical location in which data should be invalidated is stored. Physical address is designated by block number and offset. |
| Length | Length of data to be invalidated (data length can be designated by number of grains) |

FIG. 11

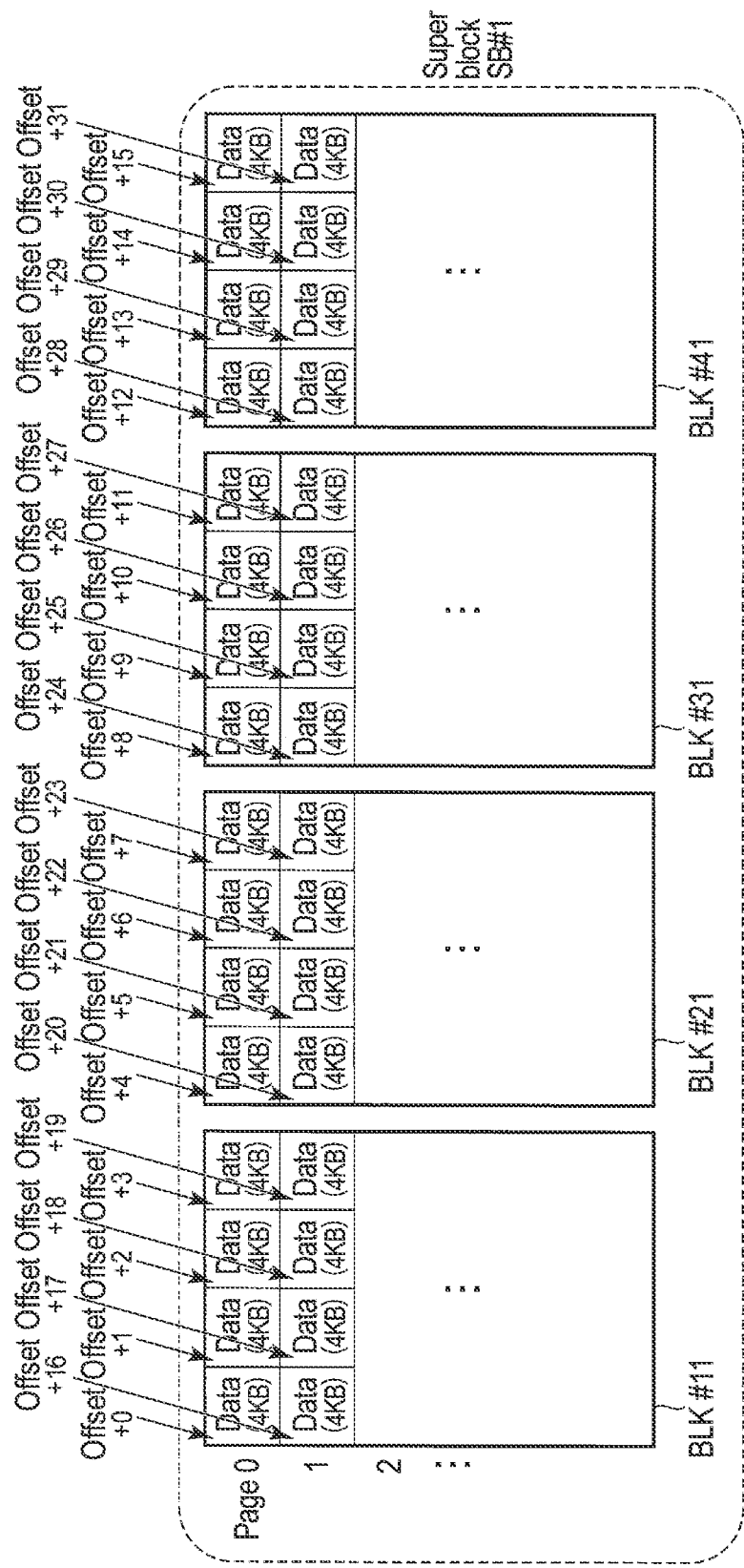
F I G. 18

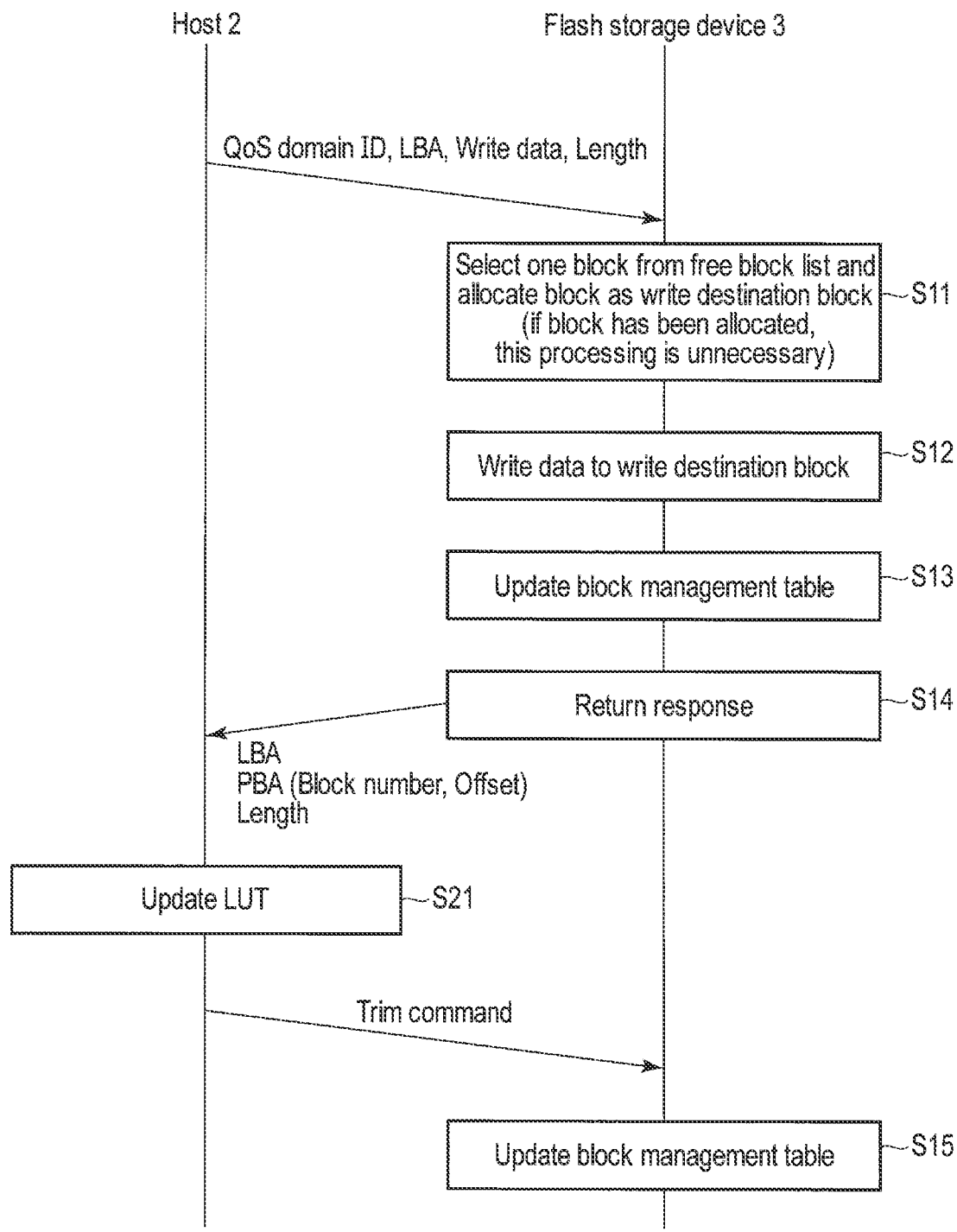
F I G. 19

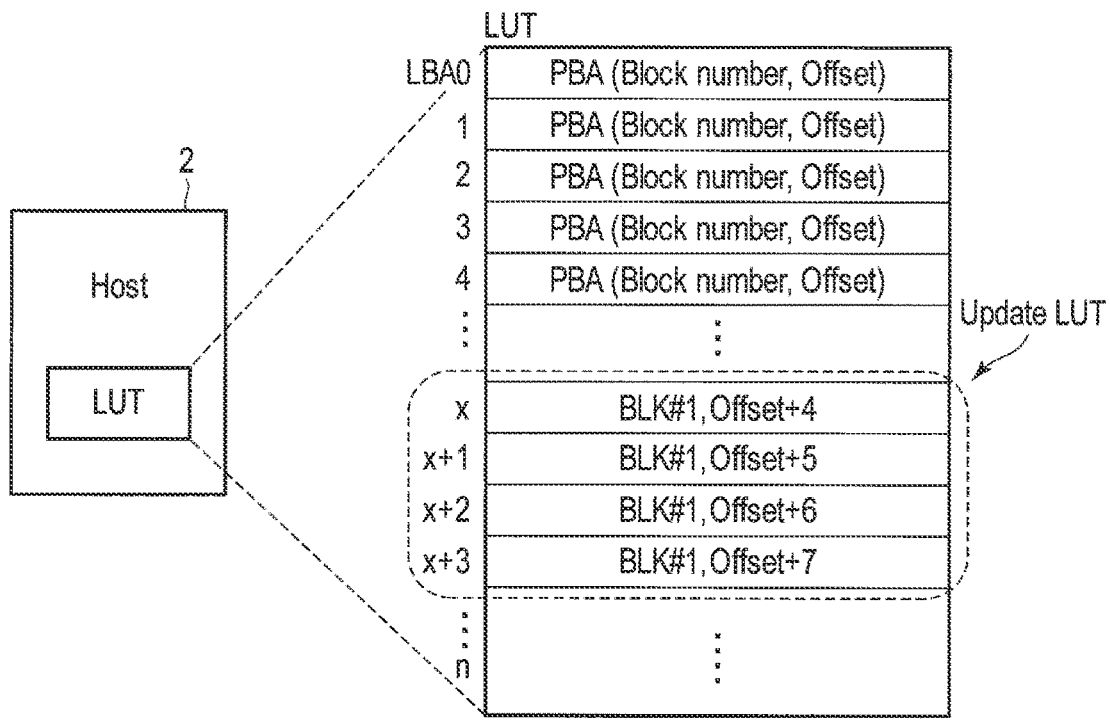
F I G. 22
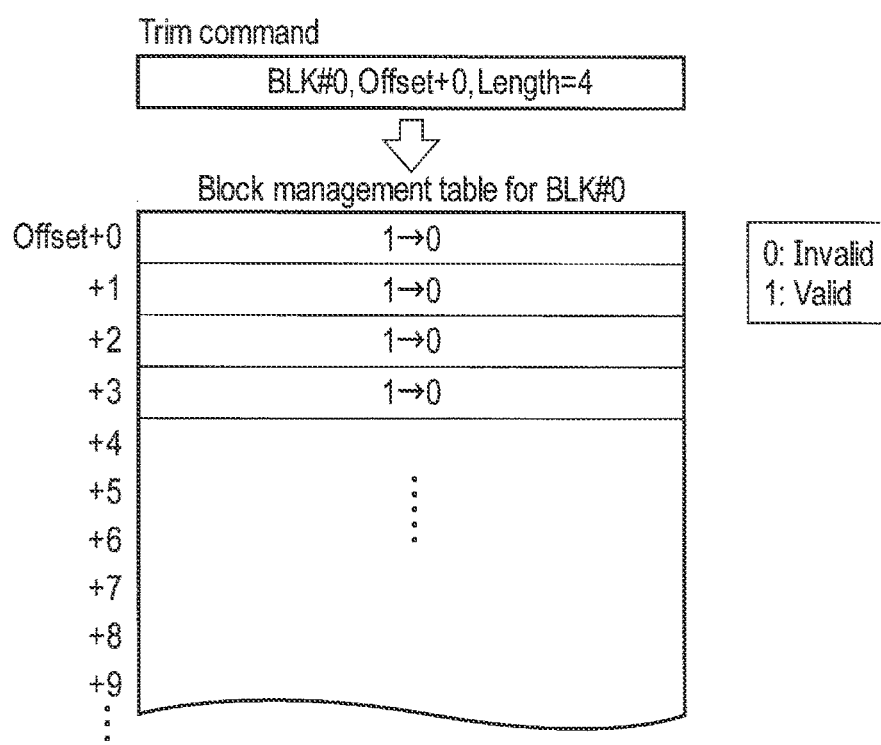
F I G. 23

Read command

| | Description |
|---|---|
| Command ID | Command ID for read command |
| Physical address (PBA) #1 | Physical address is indicative of first physical storage location from which data should be read.<br>Physical address is designated by block number and offset |
| Length #1 | Length of data to be read<br>(data length can be designated by number of grains) |
| Physical address (PBA) #2 | Physical address is indicative of first physical storage location from which data should be read.<br>Physical address is designated by block number and offset |
| Length #2 | Length of data to be read<br>(data length can be designated by number of grains) |
| Transfer destination pointer | Location in host memory to which read data should be transferred |

F I G. 24

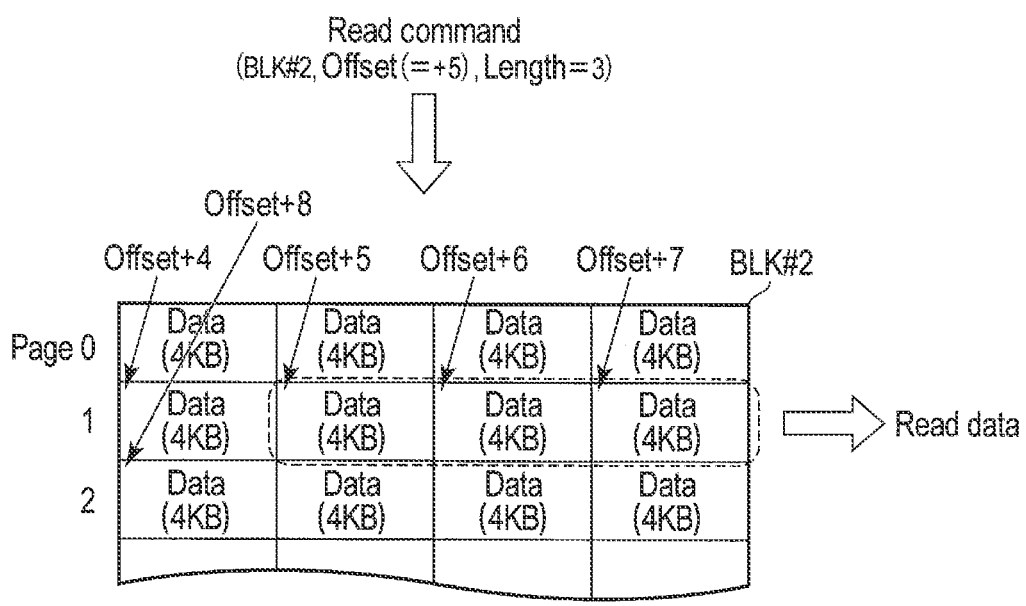

F I G. 25

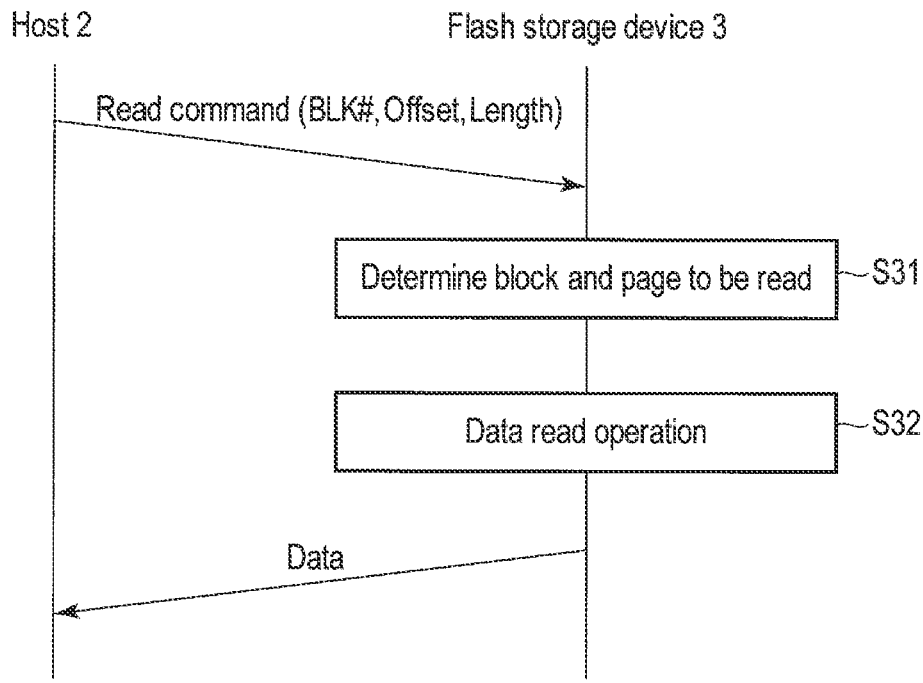

FIG. 26

GC control command

|  | Description |
|---|---|
| Command ID | Command ID for GC control |
| Policy | Host can designate policy to select GC candidate block. Device supports plural policies, and selects GC candidate block by using policy designated by host |
| Source QoS domain ID | Host can designate which QoS domain ID should be GC source |
| Destination QoS domain ID | Host can designate which QoS domain ID should be GC destination |

FIG. 27

Callback command for GC

|  | Description |
|---|---|
| Command ID | Command ID for GC callback |
| Logical address | Logical address of copied valid data |
| Length | Length of copied valid data |
| Destination physical address | Destination physical address is indicative of location in GC destination block in which valid data is copied.<br>Destination physical address can be designated by block number and offset |
| (Optional) Source physical address | Source physical address is indicative of location in GC source block in which valid data has been stored. Source physical address can be designated by block number and offset.<br>Host can be notified of a set of logical address, destination physical address, and source physical address |

F I G. 28

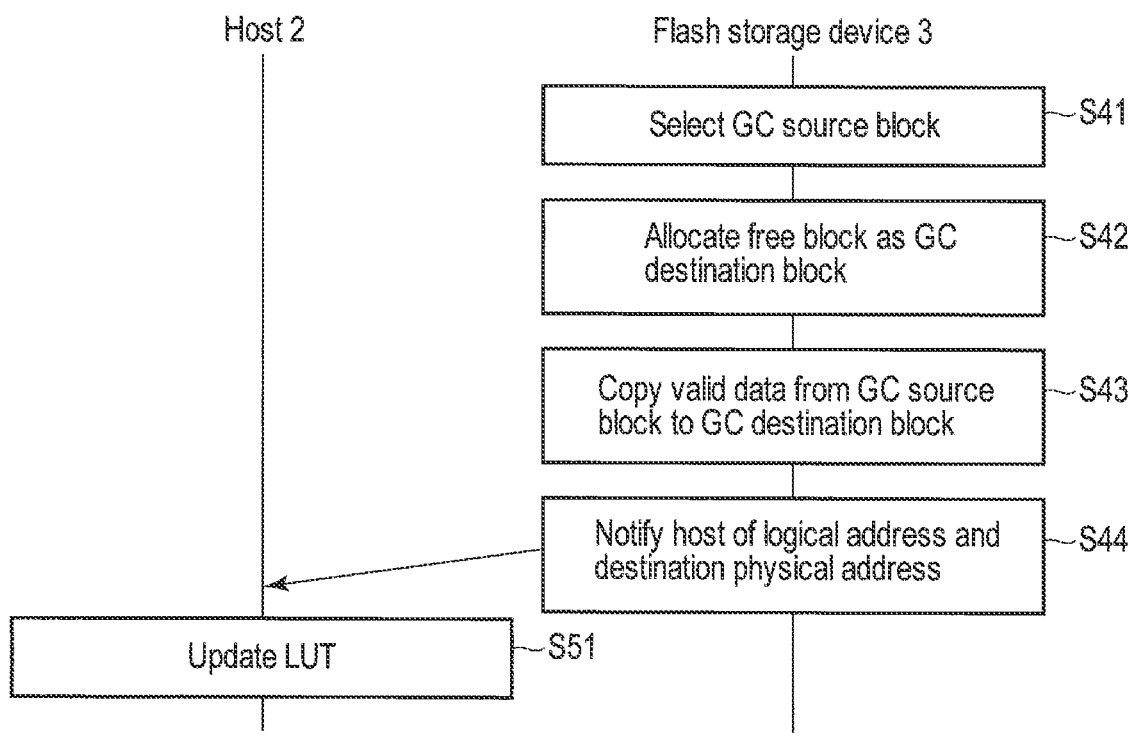

F I G. 29

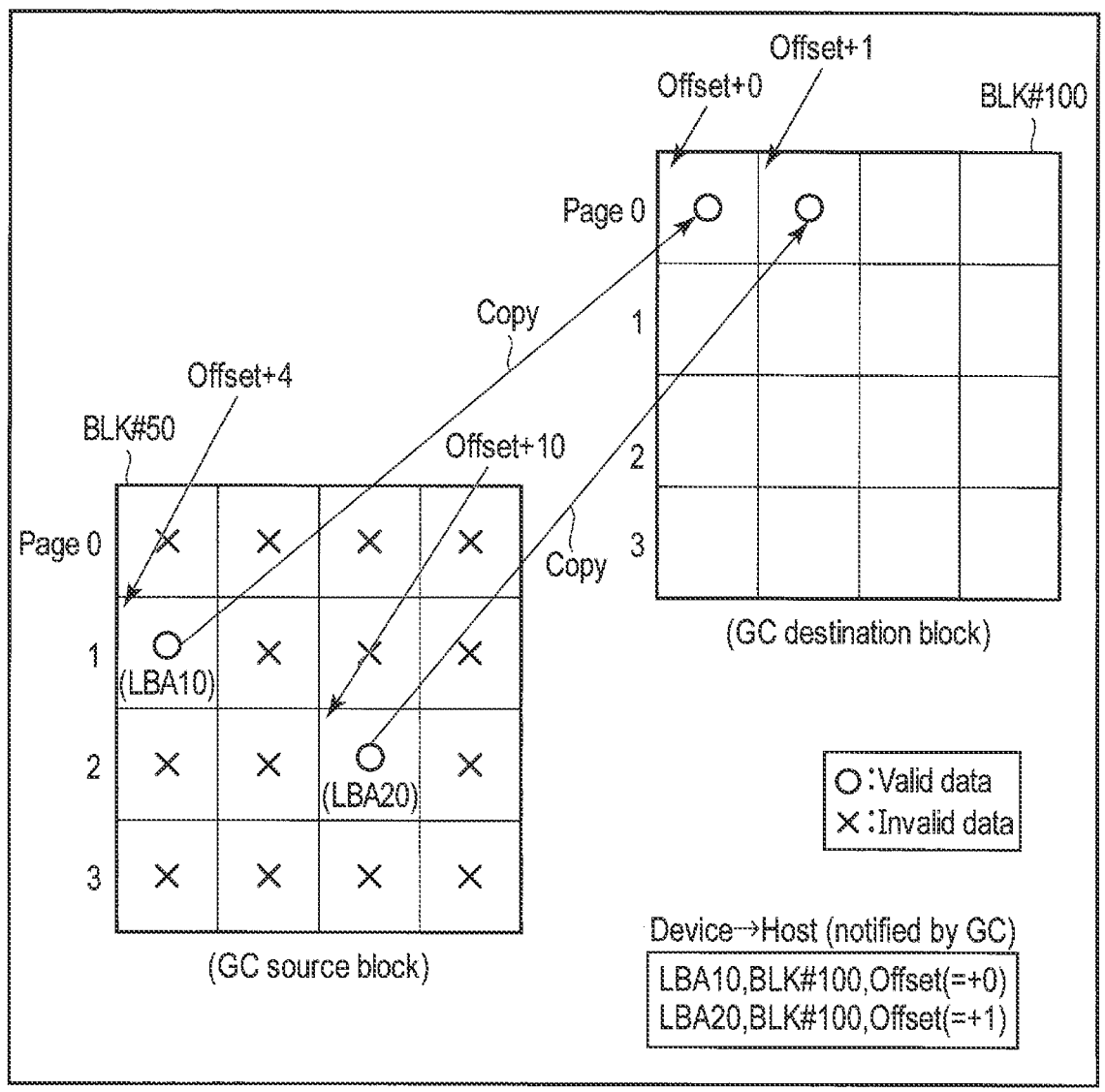
F I G. 30

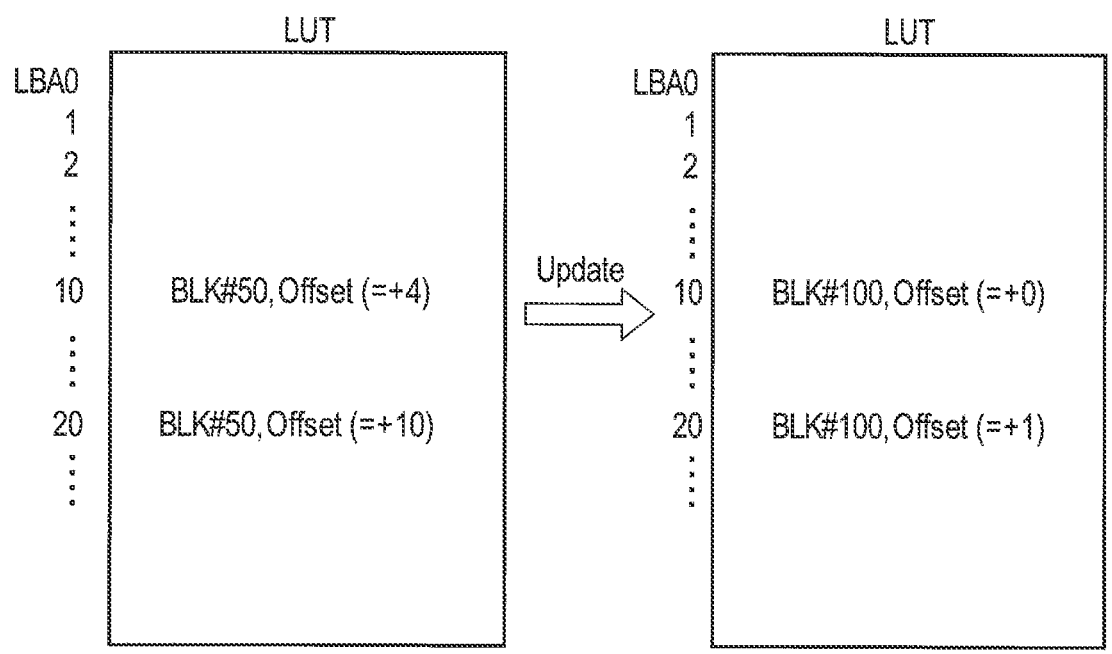
F I G. 31

GC control command

|  | Description |
|---|---|
| Command ID | Command ID for GC control |
| Policy | Host can designate policy to select GC candidate block. Device supports a plurality of policies, and selects GC candidate block by using policy designated by host |
| Source device ID / Source QoS domain ID | Host can designate which device should be GC source. In addition, host can designate which QoS domain ID should be GC source |
| Destination device ID / Destination QoS domain ID | Host can designate which device should be GC destination. In addition, host can designate which QoS domain ID should be GC destination |

F I G. 33

Callback command for GC

|  | Description |
|---|---|
| Command ID | Command ID for callback for GC |
| Logical address | Logical address of copied valid data |
| Length | Length of copied valid data |
| Destination device ID / Destination physical address | Destination device ID is indicative of device in which valid data is copied. Destination physical address is indicative of location in GC destination block in which valid data is copied. Destination physical address can be designated by block number and offset |
| (Optional) Source device ID / Source physical address | Source device ID is indicative of device in which valid data is stored. Source physical address is indicative of location in GC source block in which valid data is stored. Source physical address can be designated by block number and offset. Host can be notified of a set of logical address, destination physical address, and source physical address |

F I G. 34

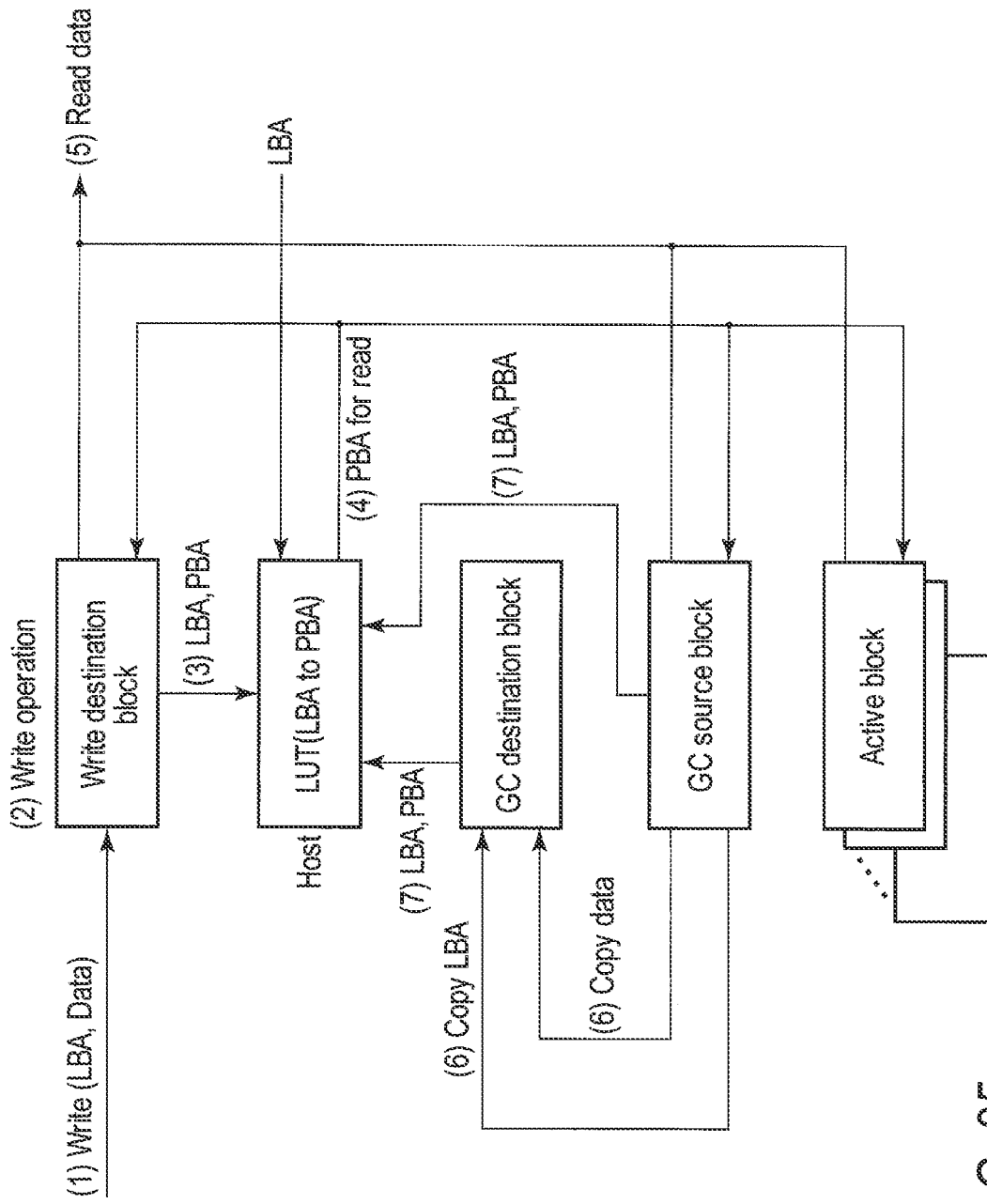
F I G. 35

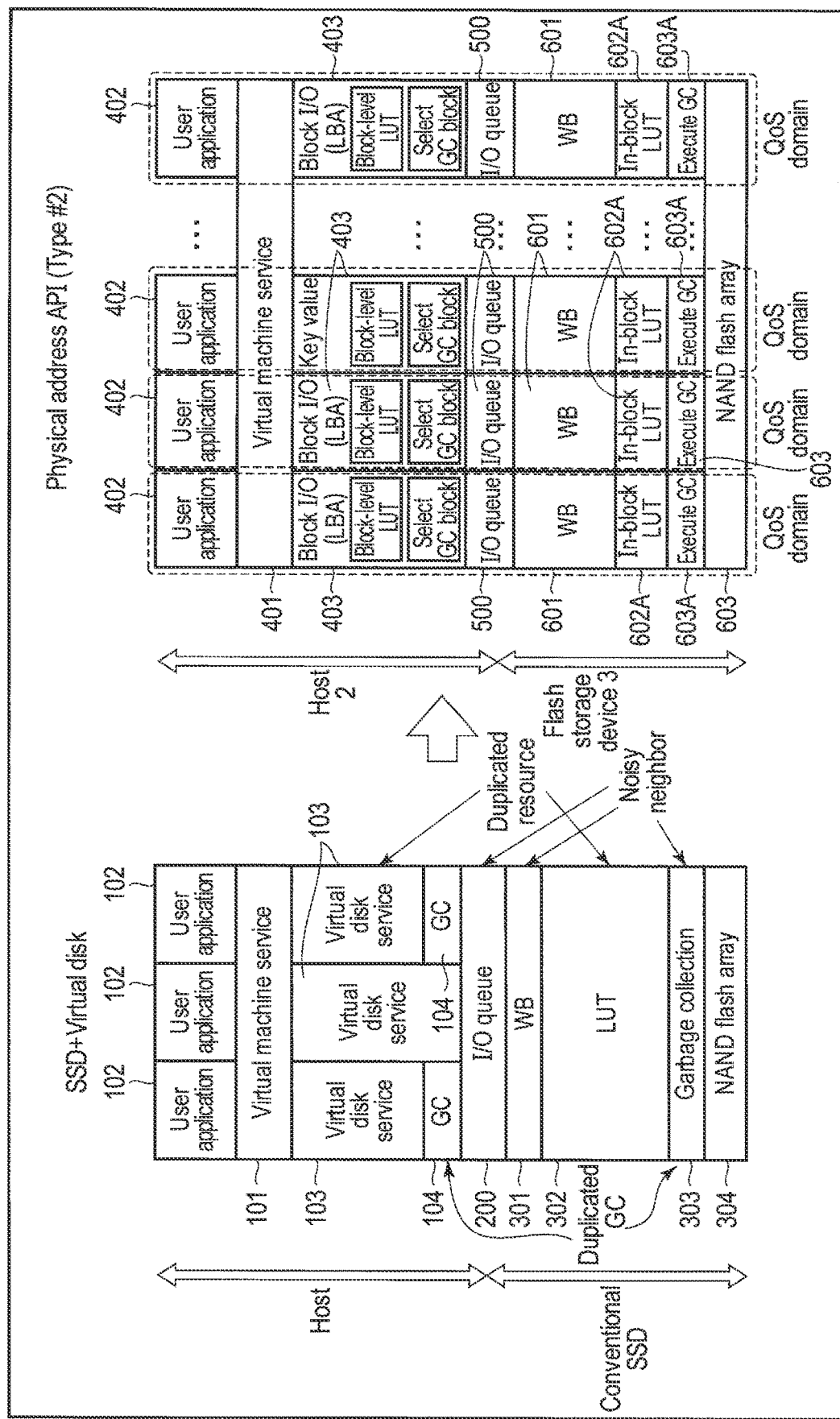
F I G. 36

Write command

| | Description |
|---|---|
| Command ID | Command ID for write command |
| Block number(BLK#) | Physical address designating block to which data should be written |
| Logical address | Logical address is indicative of first logical location to which data should be written |
| Length | Size of data to be written |

Trim command

|  | Description |
|---|---|
| Command ID | Command ID for Trim command |
| Block number (BLK#) | Block number is indicative of block in which data to be invalidated is stored |
| Logical address | Physical address is indicative of first logical location of data to be invalidated |
| Length | Length of data to be invalidated (data length can be designated by number of grains) |

FIG. 39

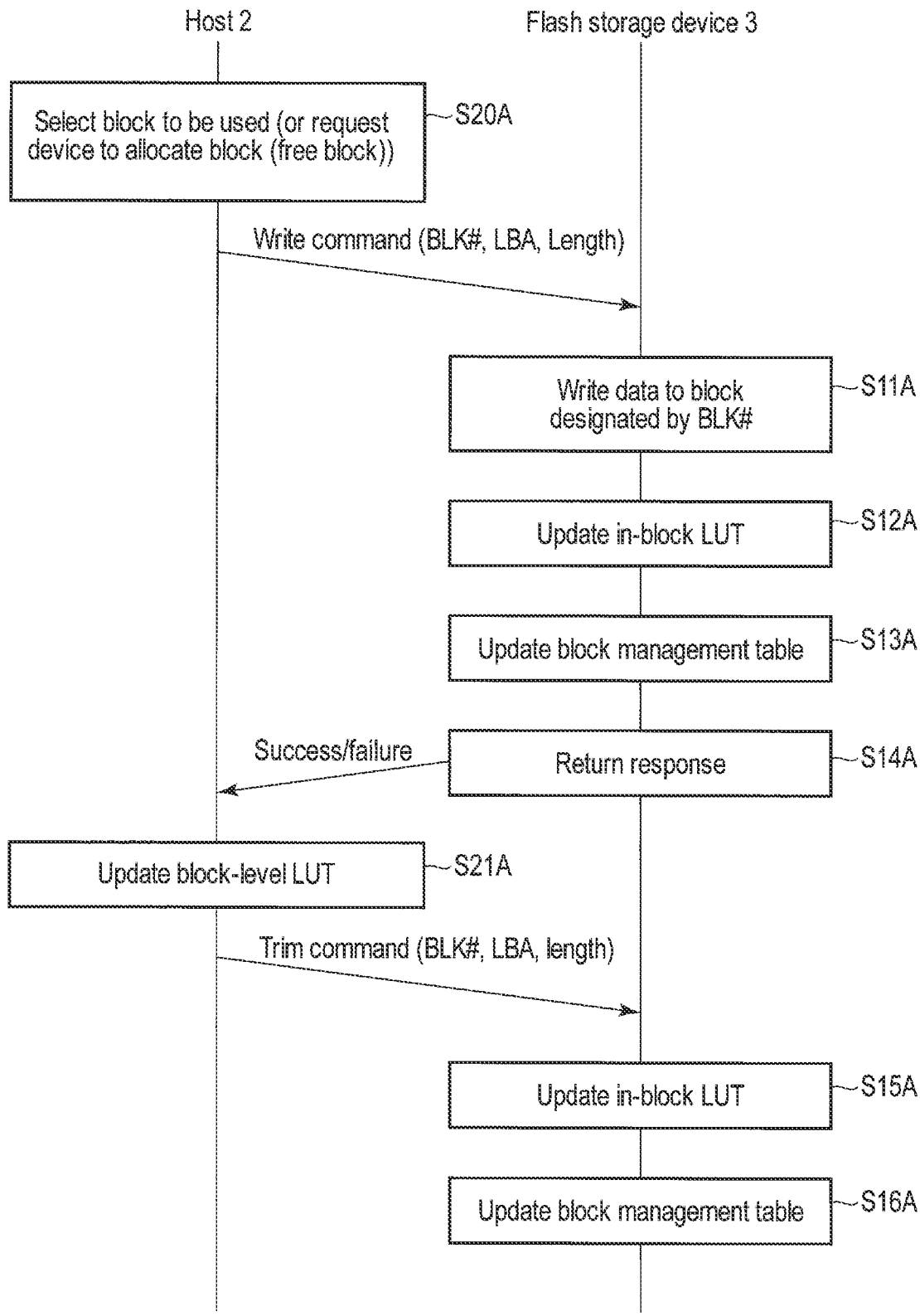
F I G. 40

Block management table for BLK#1

| Offset | | |
|---|---|---|
| Offset+0 | 1 | |
| +1 | 1 | |
| +2 | 1 | |
| +3 | 1 | |
| +4 | 0→1 | |
| +5 | 0→1 | |
| +6 | 0→1 | |
| +7 | 0→1 | |
| +8 | 0 | |
| +9 | 0 | |
| ⋮ | ⋮ | |

0: Invalid
1: Valid

F I G. 43

Block-level LUT (Host)

| | |
|---|---|
| LBA0 | BLK# |
| 1 | BLK# |
| 2 | BLK# |
| ⋮ | ⋮ |
| LBAx | BLK#0→BLK#1 |
| x+1 | BLK#0→BLK#1 |
| x+2 | BLK#0→BLK#1 |
| x+3 | BLK#0→BLK#1 |
| ⋮ | ⋮ |

F I G. 44

Read command
| | Description |
|---|---|
| Command ID | Command ID for read command |
| Block number (BLK#) | Block number where data to be read is stored |
| Logical address | Logical address of data to be read |
| Length | Length of data to be read |
| Transfer destination pointer | Location in host memory to which read data should be transferred |
F I G. 46
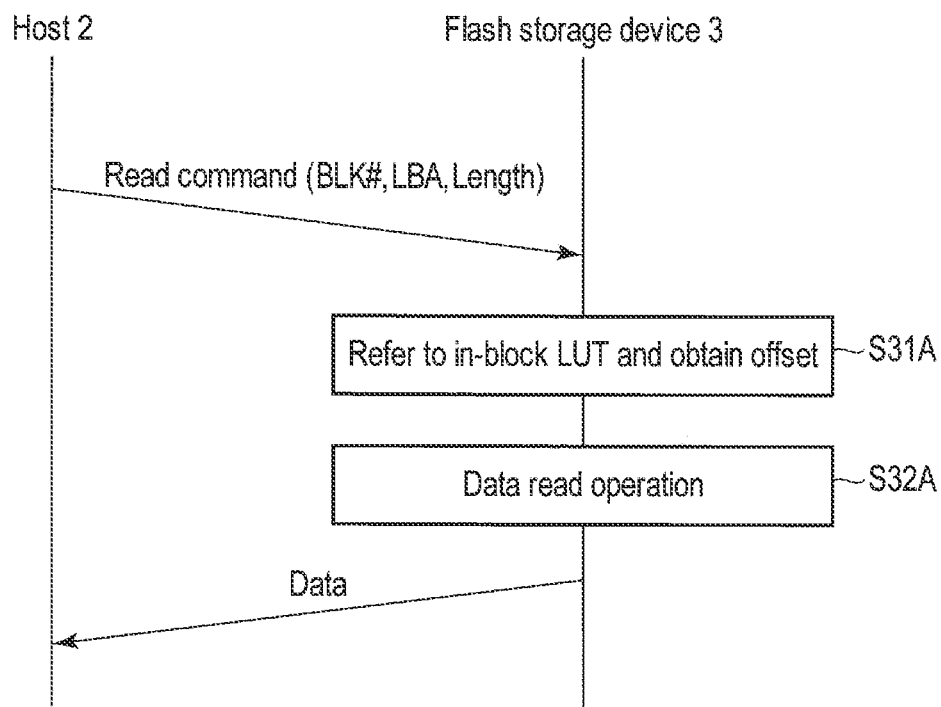
F I G. 47

GC control command

| | Description |
|---|---|
| Command ID | Command ID for GC control |
| GC source block number (BLK#) | Host can designate which block should be GC source block. Host can designate plural GC source block numbers |
| GC destination block number (BLK#) | Host can designate which block should be GC destination block. Host can designate plural GC destination block numbers |

F I G. 48

Callback command for GC

| | Description |
|---|---|
| Command ID | Command ID for GC callback |
| LBA, Destination block number | Pair of LBA of copied data and block number of destination block to which data is copied |
| LBA, Destination block number | Pair of LBA of copied data and block number of destination block to which data is copied |
| ⋮ | ⋮ |

F I G. 49

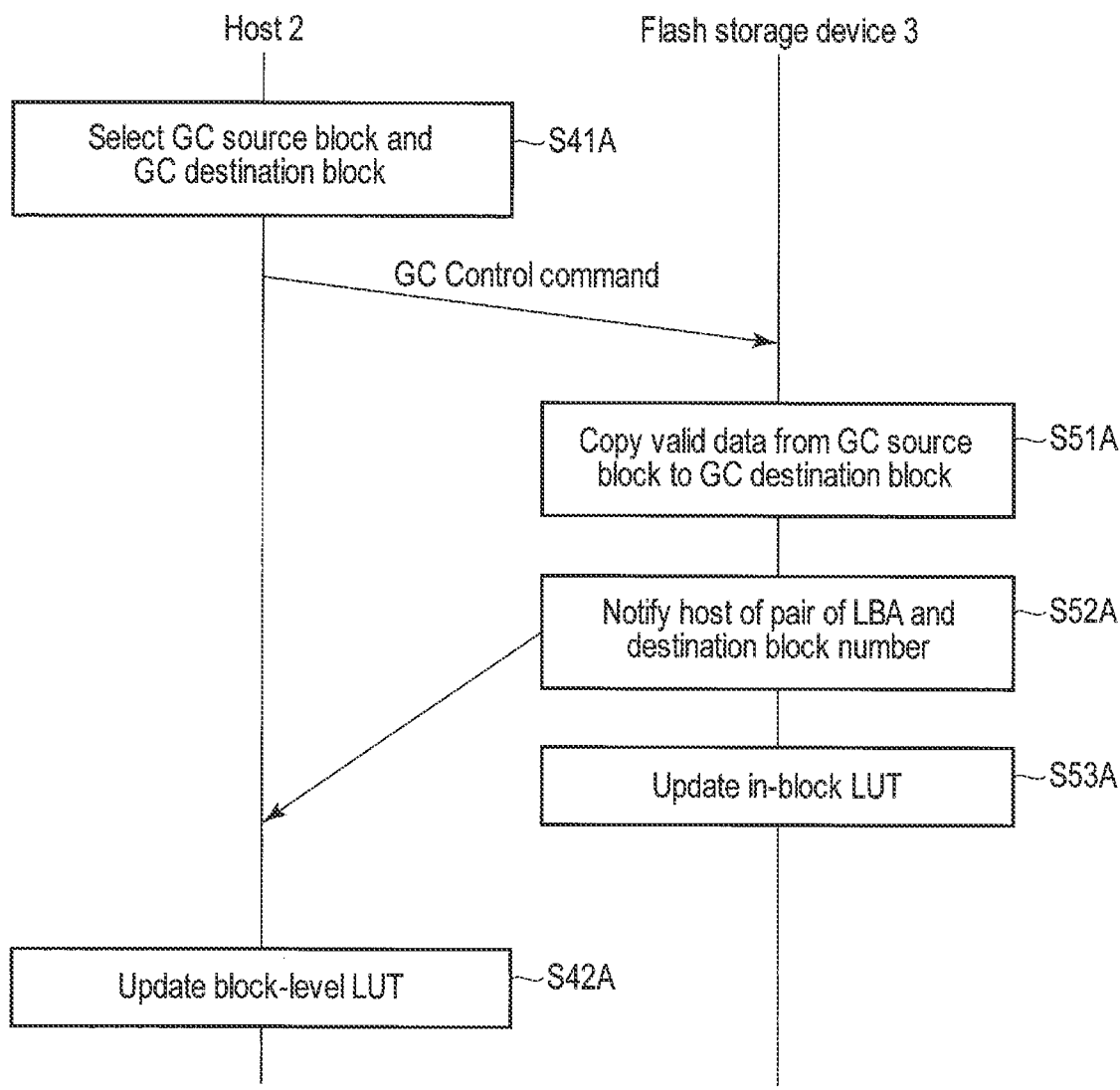
F I G. 50

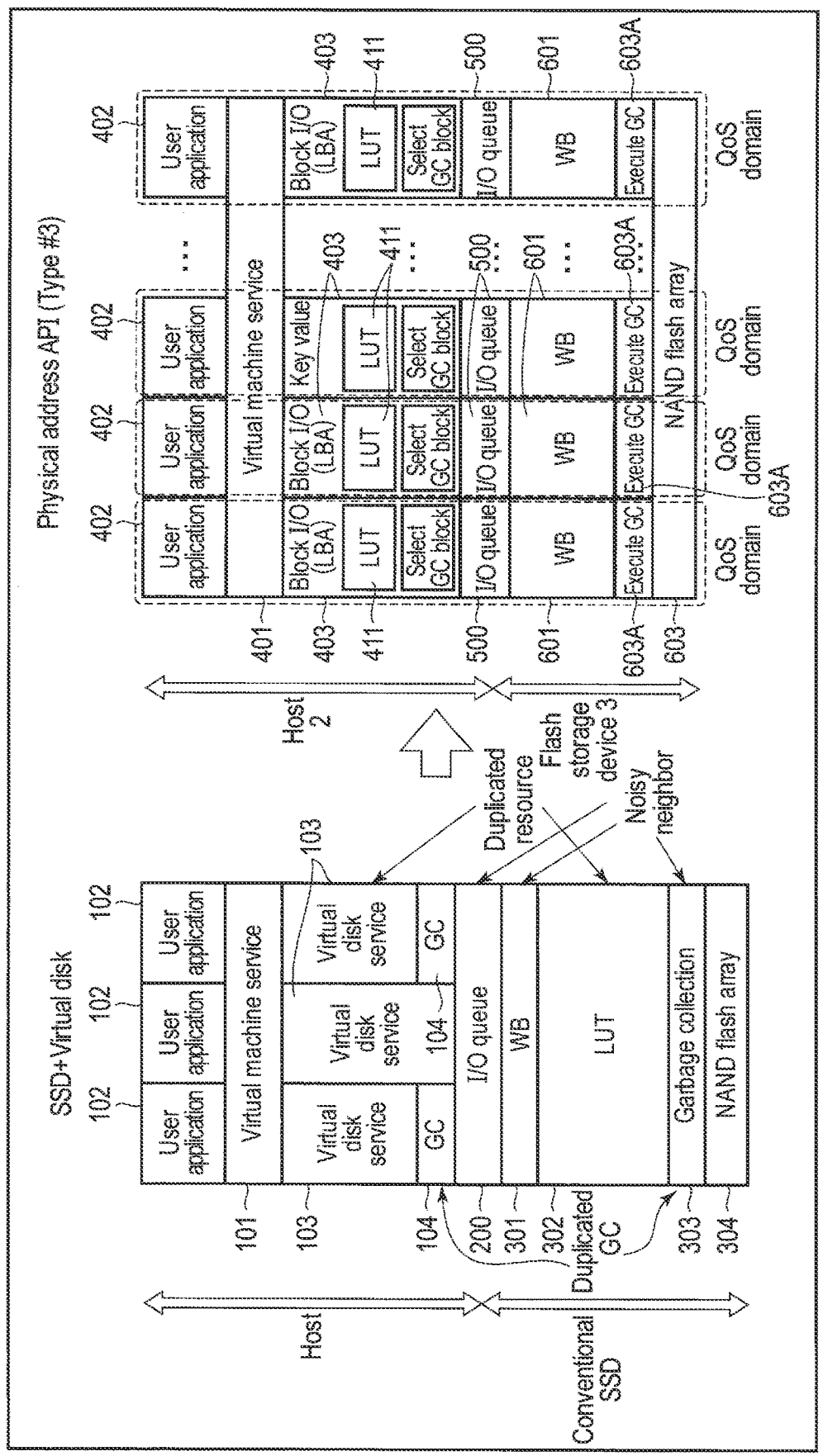
F I G. 51

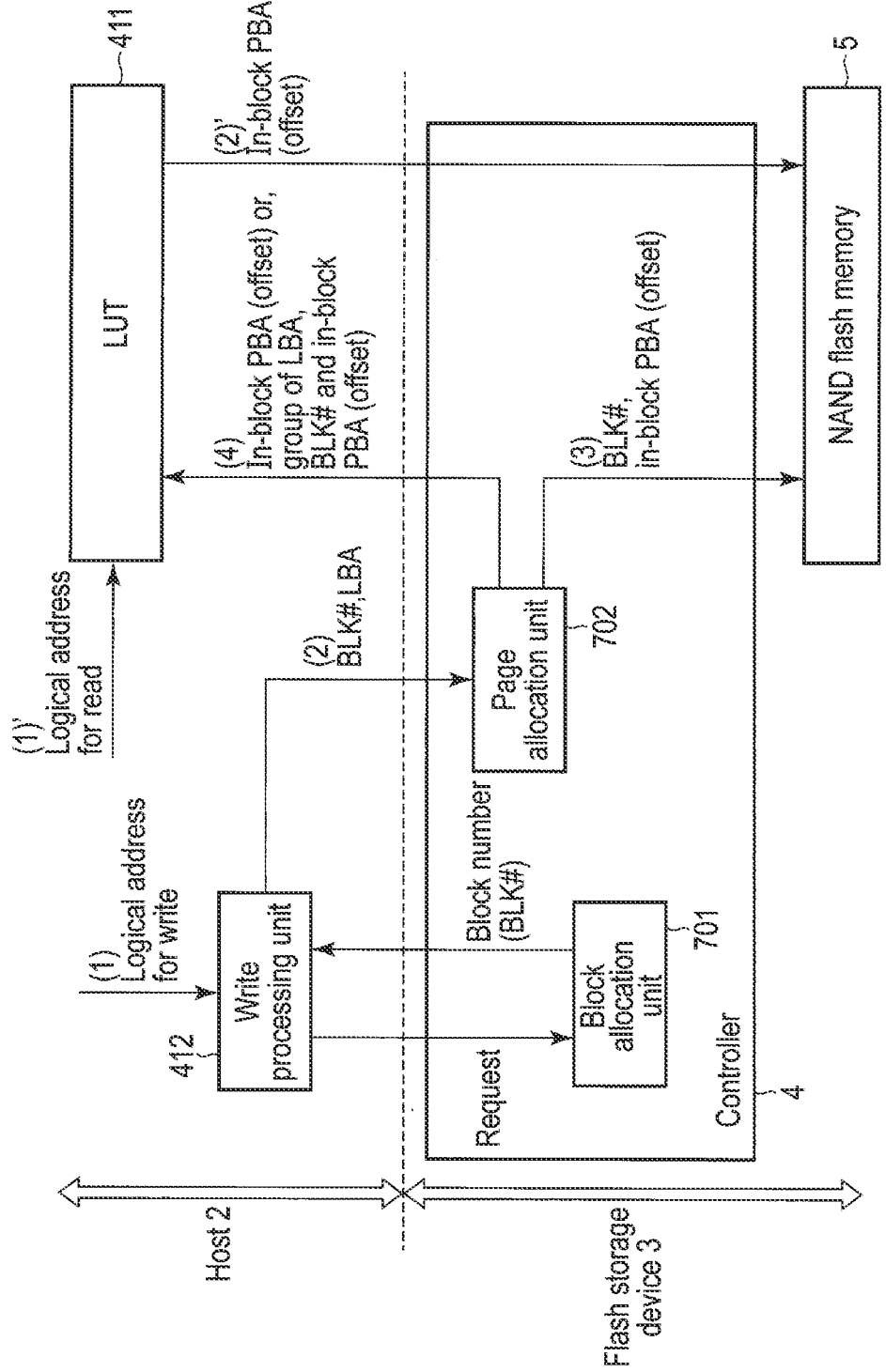
F I G. 52

Write command

|  | Description |
|---|---|
| Command ID | Command ID for write command |
| Block number (BLK#) | Physical address designating block to which data should be written |
| Logical address | Logical address is indicative of first logical location to which data should be written |
| Length | Size of data to be written |

F I G. 53

Response to write command

|  | Description |
|---|---|
| In-block physical address | In-block physical address is indicative of location in block to which data has been written. In-block physical address can be designated by in-block offset |
| Length | Length of written data (data length can be designated by number of grains) |

F I G. 54

Trim command (capable of designating physical address)

|  | Description |
|---|---|
| Command ID | Command ID for Trim command |
| Physical address | Physical address is indicative of first physical storage location in which data to be invalidated is stored. Physical address can be designated by block number and offset |
| Length | Length of data to be invalidated (data length can be designated by number of grains) |

F I G. 55

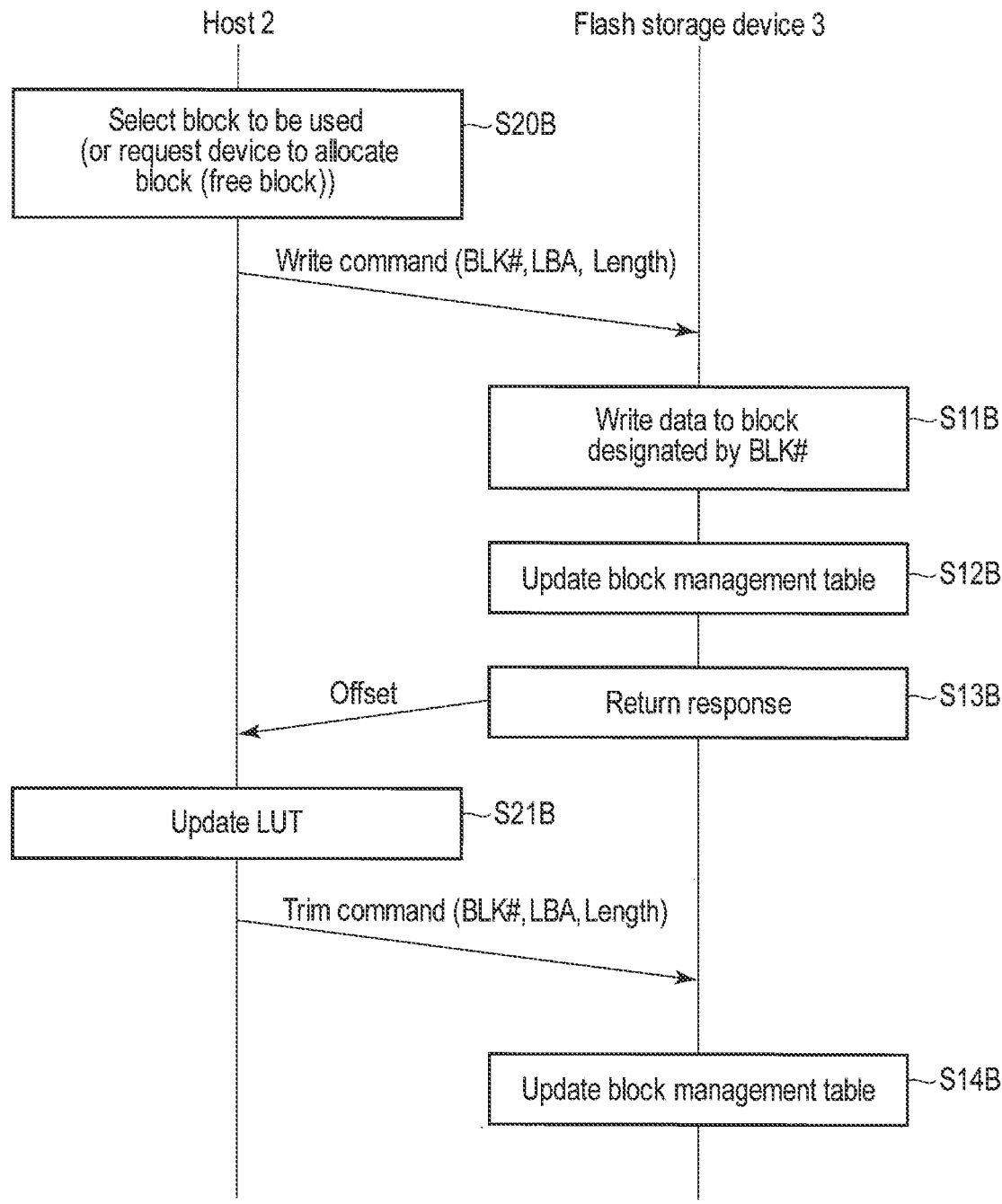
F I G. 56

Read command

| | Description |
|---|---|
| Command ID | Command ID for read command |
| Physical address (PBA) #1 | Physical address is indicative of first physical storage location from which data should be read.<br>Physical address can be designated by block number and offset |
| Length #1 | Length of data to be read<br>(data length can be designated by number of grains) |
| Physical address (PBA) #2 | Physical address is indicative of first physical storage location from which data should be read.<br>Physical address can be designated by block number and offset |
| Length #2 | Length of data to be read<br>(data length can be designated by number of grains) |
| Transfer destination pointer | Location in host memory to which read data should be transferred |

F I G. 57

GC control command

| | Description |
|---|---|
| Command ID | Command ID for GC control |
| GC source block number (BLK#) | Host can designate which block should be GC source block.<br>Host can designate plural GC source block numbers |
| GC destination block number (BLK#) | Host can designate which block should be GC destination block.<br>Host can designate plural GC destination block numbers |

F I G. 58

Callback command for GC

| | Description |
|---|---|
| Command ID | Command ID for GC callback |
| Logical address | Logical address of copied valid data |
| Length | Length of copied valid data |
| Destination physical address | Destination physical address is indicative of location in GC destination block to which valid data has been copied.<br>Destination physical address can be designated by block number and offset |

F I G. 59

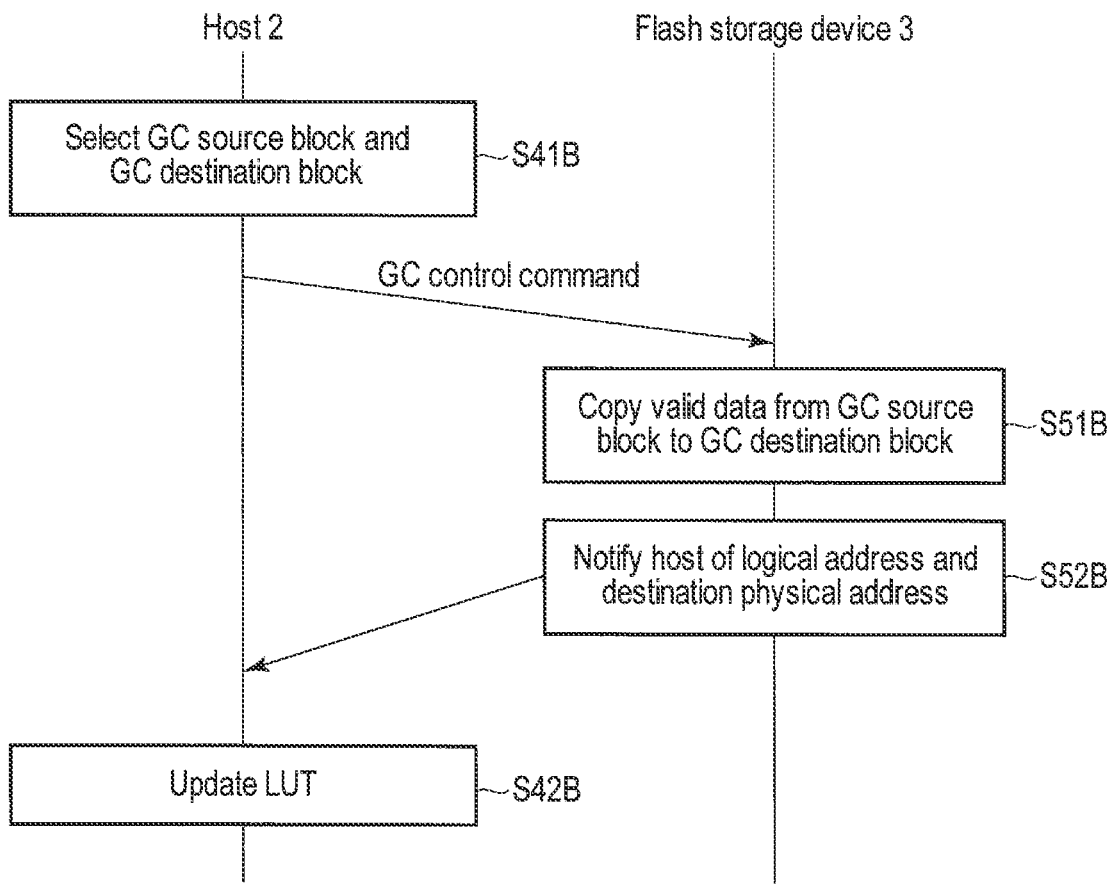

F I G. 60

MEMORY SYSTEM AND METHOD FOR CONTROLLING NONVOLATILE MEMORY

CROSS-REFERENCE TO RELATED APPLICATIONS

This application is a continuation of U.S. application Ser. No. 17/689,787 filed Mar. 8, 2022, which is a continuation of U.S. application Ser. No. 16/725,094 filed on Dec. 23, 2019 (now U.S. Pat. No. 11,347,655), which is a continuation of U.S. application Ser. No. 15/984,703 filed May 21, 2018 (now U.S. Pat. No. 10,552,336) and is based upon and claims the benefit of priority from Japanese Patent Application No. 2017-208115, filed Oct. 27, 2017, the entire contents of which are incorporated herein by reference.

FIELD

Embodiments described herein relate generally to a technology of controlling a nonvolatile memory.

BACKGROUND

In recent years, memory systems comprising nonvolatile memories have been widely prevalent.

As such a memory system, a solid state drive (SSD) based on a NAND flash technology is known.

A new interface between a host and a storage has been recently proposed.

BRIEF DESCRIPTION OF THE DRAWINGS

FIG. 1 is a block diagram showing a relationship between a host and a memory system (flash storage device) according to an embodiment.

FIG. 2 is a block diagram for explanation of plural types of interfaces supported by the flash storage device according to the embodiment.

FIG. 3 is a block diagram showing a configuration example of the flash storage device according to the embodiment.

FIG. 4 is a block diagram showing a relationship between a NAND interface and plural NAND flash memory dies provided in the flash storage device according to the embodiment.

FIG. 5 is a block diagram showing a configuration example of a super block configured by plural blocks.

FIG. 6 is a block diagram for explanation of an extended namespace management command applied to the flash storage device according to the embodiment.

FIG. 8 is a block diagram for explanation of role sharing between a host and conventional SSD, and role sharing between the host and the flash storage device according to the embodiment supporting a first type interface (physical address API (type #1)).

FIG. 9 is a table for explanation of a write command used in the physical address API (type #1).

FIG. 10 is a table for explanation of a response to the write command shown in FIG. 9.

FIG. 11 is a table for explanation of a Trim command used in the physical address API (type #1).

FIG. 18 is a diagram for explanation of a relationship between a block number and offsets in a case where a super block is used.

FIG. 19 is a sequence chart showing a sequence of write processing executed by the host and the flash storage device according to the embodiment.

FIG. 22 is a diagram for explanation of an operation of updating a lookup table (logical-to-physical address translation table) managed by the host.

FIG. 23 is a diagram for explanation of an operation of updating the block management table in response to a notification from the host indicative of the physical address corresponding to data to be invalidated.

FIG. 24 is a table for explanation of a read command used in the physical address API (type #1).

FIG. 25 is a diagram for explanation of a read operation corresponding to the physical address API (type #1).

FIG. 26 is a sequence chart showing a sequence of read processing corresponding to the physical address API (type #1).

FIG. 27 is a table for explanation of a garbage collection (GC) control command used in the physical address API (type #1).

FIG. 28 is a table for explanation of a callback command for GC used in the physical address API (type #1).

FIG. 29 is a sequence chart showing a sequence of a garbage collection (GC) operation corresponding to the physical address API (type #1).

FIG. 30 is a diagram for explanation of an example of a data copy operation executed for the garbage collection (GC).

FIG. 31 is an illustration for explanation of contents of a lookup table of the host updated based on a result of the data copy operation shown in FIG. 30.

FIG. 33 is a table for explanation of another example of the garbage collection (GC) control command used in the physical address API (type #1).

FIG. 34 is a table for explanation of another example of the callback command for GC used in the physical address API (type #1).

FIG. 35 is a diagram for explanation of write/read/GC operations corresponding to the physical address API (type #1).

FIG. 36 is a block diagram for explanation of role sharing between a host and conventional SSD, and role sharing between the host and the flash storage device according to the embodiment supporting a second type interface (physical address API (type #2)).

FIG. 39 is a table for explanation of a Trim command used in the physical address API (type #2).

FIG. 40 is a sequence chart showing a sequence of write processing corresponding to the physical address API (type #2).

FIG. 43 is a diagram for explanation of an operation of updating a block management table managed by the flash storage device according to the embodiment.

FIG. 44 is a diagram for explanation of an operation of updating a block-level LUT managed by the host.

FIG. 46 is a table for explanation of a read command used in the physical address API (type #2).

FIG. 47 is a sequence chart for explanation of a read command corresponding to the physical address API (type #2).

FIG. 48 is a table for explanation of a garbage collection (GC) control command used in the physical address API (type #2).

FIG. 49 is a table for explanation of a callback command for GC used in the physical address API (type #2).

FIG. 50 is a sequence chart showing a sequence of a garbage collection (GC) operation corresponding to the physical address API (type #2).

FIG. 51 is a block diagram for explanation of role sharing between a host and conventional SSD, and role sharing between the host and the flash storage device according to the embodiment supporting a third type interface (physical address API (type #3)).

FIG. 52 is a block diagram for explanation of a data write operation corresponding to the physical address API (type #3) and a data read operation corresponding to the physical address API (type #3).

FIG. 53 is a table for explanation of a write command used in the physical address API (type #3).

FIG. 54 is a table for explanation of a response to the write command shown in FIG. 53.

FIG. 55 is a table for explanation of a Trim command used in the physical address API (type #3).

FIG. 56 is a sequence chart showing a sequence of write processing corresponding to the physical address API (type #3).

FIG. 57 is a table for explanation of a read command used in the physical address API (type #3).

FIG. 58 is a table for explanation of a garbage collection (GC) control command used in the physical address API (type #3).

FIG. 59 is a table for explanation of a callback command for GC used in the physical address API (type #3).

FIG. 60 is a sequence chart showing a sequence of a garbage collection (GC) operation corresponding to the physical address API (type #3).

DETAILED DESCRIPTION

Figure 7:
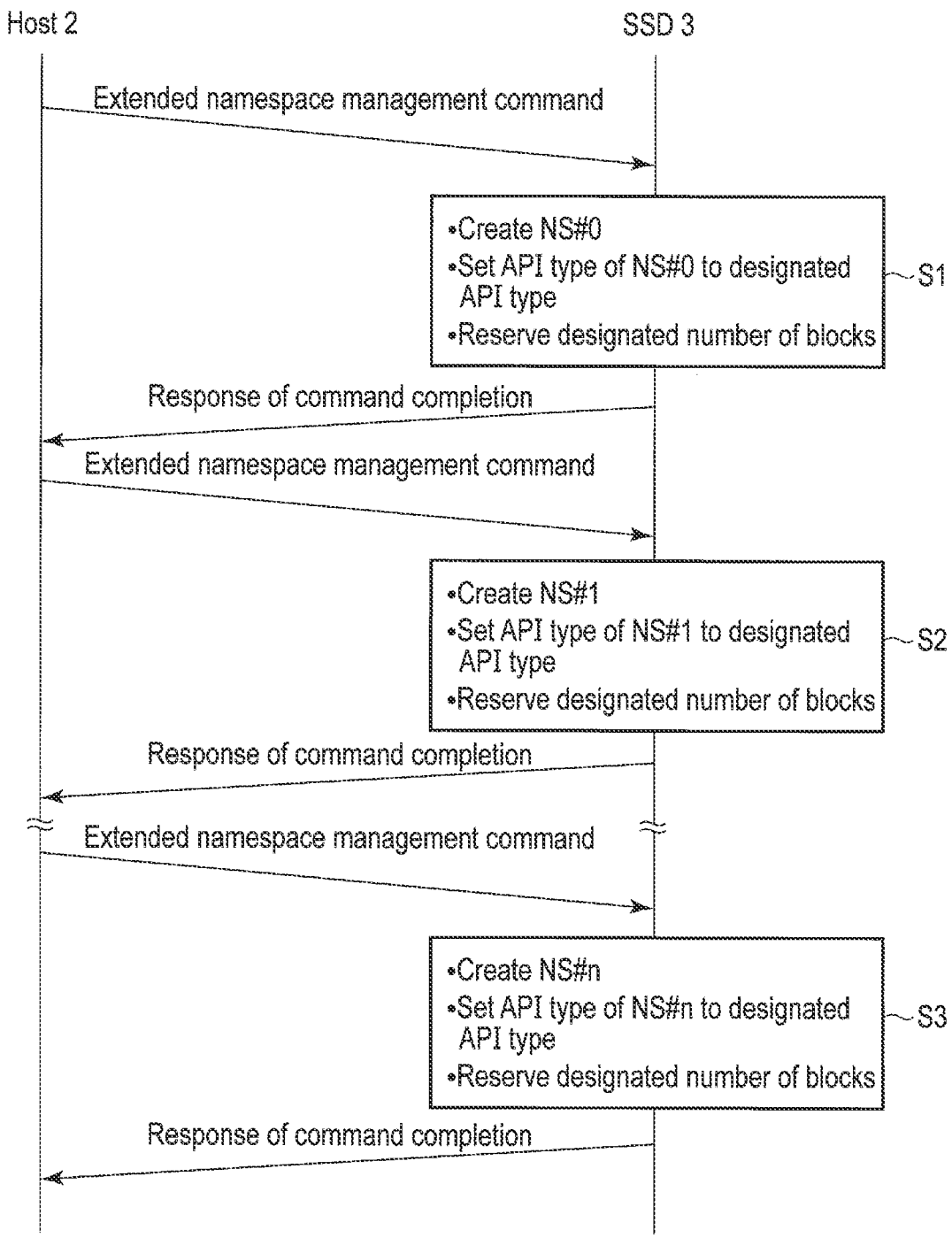
FIG. 7 is a sequence chart showing region (namespace) creation processing executed by the flash storage device according to the embodiment.

Various embodiments will be described hereinafter with reference to the accompanying drawings.

In general, according to one embodiment, a memory system connectable to a host comprises nonvolatile memory including plural blocks each including plural pages, and a controller electrically connected to the nonvolatile memory to control the nonvolatile memory.

The controller manages plural regions obtained by logically dividing the nonvolatile memory. The plural regions include one or more first regions read accessed using a first type interface where the host designates a logical address and does not designate a physical address of the nonvolatile memory, and one or more second regions read accessed by using a second type interface where the host designates a part of or all of a physical address of the nonvolatile memory.

The controller receives a read request from the host.

When the received read request includes a first identifier indicative of the first region of the one or more first regions, the controller selects the first type interface, obtains the logical address from the received read request, obtains a physical address corresponding to the obtained logical address from a logical-to-physical address translation table which manages mapping between each of logical addresses and each of physical addresses of the first region, and reads data from the first region, based on the obtained physical address.

When the received read request includes a second identifier indicative of the second region of the one or more second regions, the controller selects the second type interface, obtains physical address information designating a part of or all of a physical address of the second region from the received read request, and reads data from the second region, based on the obtained physical address information.

First, a configuration of a computing system including a memory system according to one of the embodiments will be described with reference to FIG. 1.

The memory system is a semiconductor storage device configured to write data to a nonvolatile memory and to read data from the nonvolatile memory. The memory system is implemented as a flash storage device 3 based on the NAND flash technology.

The computing system may include a host (host device) 2 and plural flash storage devices 3. The host 2 may be a server configured to use a flash array composed of plural flash storage devices 3 as a storage. The host (server) 2 and the flash storage devices 3 are interconnected via an interface 50 (internal interconnection). The interface (i.e., the physical interface) 50 for the internal interconnection is not limited to this, but PCI Express (PCIe) (registered trademark), NVM Express (NVMe) (registered trademark), Ethernet (registered trademark), NVMe over Fabrics (NVMeOF), and the like can be used as the interface.

A typical example of a server which functions as the host 2 is a server in a data center.

In a case where the host 2 is implemented by the server in the data center, the host (server) 2 may be connected to plural end user terminals (clients) 61 via a network 51. The host 2 can provide various services to the end user terminals 61.

Examples of services which can be provided by the host (server) 2 are (1) Platform as a Service (PaaS) which provides a system running platform to each of the clients (each of the end user terminals 61), (2) Infrastructure as a Service (IaaS) which provides an infrastructure such as a virtual server to each of the clients (each of the end user terminals 61), and the like.

Plural virtual machines may be run on a physical server which functions as the host (server) 2. Each of the virtual machines running on the host (server) 2 can function as a virtual server configured to provide various services to several corresponding clients (end user terminals 61).

The host (server) 2 comprises a storage management function of managing plural flash storage devices 3 constituting a flash array, and a front-end function of providing various services including the storage access to each of the end user terminals 61.

In the conventional SSD, a block/page hierarchical structure of a NAND flash memory is concealed by a flash translation layer (FTL) in SSD. In other words, FTL of the conventional SSD comprises (1) a function of managing mapping between each of the logical addresses and each of the physical addresses of the NAND flash memory, by using a lookup table which functions as a logical-to-physical address translation table, (2) a function of concealing read/write in page units and the erase operation in block units, (3) a function of performing garbage collection (GC) of the NAND flash memory, and the like. Mapping between each of the logical addresses and the physical address of the NAND flash memory cannot be seen from the host. The block/page structure of the NAND flash memory cannot be seen from the host, either.

A type of address translation (application-level address translation) is often executed in the host, too. This address translation manages mapping between each of the application-level logical addresses and each of the logical addresses for SSD, using the application-level address translation table. In addition, in the host, too, a type of GC (application-level GC) for change of data placement in the logical address space is executed for cancellation of a fragment which occurs in the logical address space for SSD.

In a redundant configuration in which each of the host and SSD includes the address translation table (in which SSD includes the lookup table functioning as the logical-to-physical address translation table while the host includes the application-level address translation table), however, enormous volumes of memory resources are consumed to hold these address translation tables. Furthermore, duplex address translation including the address translation on the host side and the address translation on the SSD side is also a factor which degrades the I/O performance.

Furthermore, the application-level GC on the host side becomes a factor which increases the amount of data written to SSD to a multiple (for example, double) of actual user data amount. Such increase of the data write amount does not increase write amplification of SSD, but degrades the storage performance of the entire system and shortens the life of SSD.

A measure of moving all the functions of FTL of the conventional SSD to the host has been proposed in order to solve this problem.

To take this measure, however, the host needs to directly handle blocks and pages of the NAND flash memory. The capacity of the NAND flash memory is increased as the generation of the NAND flash memory changes, and the block size/page size of the NAND flash memory is also different as the generation changes. For this reason, the NAND flash memories of different block sizes and different page sizes often need to be used together in the host 2. Handling the NAND flash memories of different block sizes/page sizes is difficult for the host. In addition, since an unexpected number of defective pages (bad pages) generated for various reasons in manufacturing may exist, the number of pages substantially available in the blocks is expected to be different in each block, and the block size in the NAND flash memory is often different in each block. Handling the bad pages and irregular block sizes is still more difficult for the host.

Thus, in the flash storage device 3 of the embodiments, plural types of interfaces (software interfaces) to access the NAND flash memory are supported, and the interfaces to be used can be changed in each region to be accessed inside the NAND flash memory. A more appropriate interface can be therefore used for each purpose.

More specifically, the flash storage device 3 manages plural regions obtained by logically dividing the NAND flash memory.

The plural regions include one or more first regions read accessed using the first type interface where the host 2 designates the only logical address and does not designate the physical address of the NAND flash memory.

In the first type interface, the host 2 does not need to designate the physical address of the NAND flash memory but may designate the only logical address corresponding to the data to be read.

As regards the first region, the host 2 does not need to handle the NAND flash memory directly. To handle the NAND flash memory directly, function groups necessary to handle the NAND flash memory directly needs to be already run on the host 2. However, since the function groups are unnecessary in reading the data from the first region, the first region can be used as a bootable region to boot an operating system.

Furthermore, the plural regions include one or more second regions that are read accessed using the second type interface where the host 2 designates a part (for example, the only block number) of the physical address of the NAND flash memory, or all (for example, the block number and the in-block offset) of the physical address of the NAND flash memory.

When the data is read by using the second type interface (hereinafter called a physical address API), a part or all of the physical address of the NAND flash memory is designated by the host 2.

The host 2 can therefore use the physical address API as needed and directly access the NAND flash memory.

In implementation of the physical address API, the role of the FTL may be appropriately shared by the host 2 and the flash storage device 3. In this case, a part of the function of FTL of the conventional SSD may be moved to the host 2. The FTL function moved to the host 2 is hereinafter called global FTL.

The global FTL of the host 2 may comprise a function of executing a storage service, a function of managing a lookup table (LUT) which functions as a logical-to-physical address translation table managing mapping between each of the logical addresses and each of physical addresses of the NAND flash memory (or a block-level LUT managing only mapping between each of the logical addresses and each of block numbers of the NAND flash memory), a wear control function, a function of implementing high availability, a de-duplication function of preventing plural duplicated data parts having the same contents from being stored in a storage, and the like.

In contrast, the flash storage device 3 may comprise a function for low-level abstraction (LLA). LLA is a function for abstraction of the NAND flash memory. LLA can be used to implement the physical address API.

FIG. 2 shows plural types of interfaces (plural types of APIs) supported by the flash storage device 3.

The flash storage device 3 comprises a controller 4 and a NAND flash memory 5. The controller 4 supports the plural types of APIs. The APIs may include LBA API, physical address API, key value API, and the other APIs (for example, variable-length LUT, and the like).

LBA API is used as the above-explained first type interface. In LBA API, the read request from the host 2 designates the only logical address such as LBA and does not designate the physical address of the NAND flash memory 5. In addition, in LBA API, the write request from the host 2 also designates the only logical address such as LBA and does not designate the physical address of the NAND flash memory 5.

The physical address API is used as the above-explained second type interface. In the embodiment, each of three types of APIs, i.e., the physical address API (type #1), the physical address API (type #2), and the physical address API (type #3) can be used as the above-explained second type interface designating a part or all of the physical address of the NAND flash memory 5. The controller 4 may support all of the physical address API (type #1), the physical address API (type #2), and the physical address API (type #3) as available physical addresses APIs or may support an arbitrary one of the physical address API (type #1), the physical address API (type #2), and the physical address API (type #3) as an available physical address API.

The physical address API (type #1), the physical address API (type #2), and the physical address API (type #3) have the following characteristics.

<Physical Address API (Type #1)>

In the physical address API (type #1), the read request received from the host 2 designates the entire body of the physical address (i.e., both of the block number and the in-block offset) of the NAND flash memory 5. The in-block offset is an in-block physical address which designates the location in the block. The write request received from the host 2 designates the only logical address.

In other words, the host 2 manages the lookup table which functions as the logical-to-physical address translation table, but selection of the block which should be used for writing is executed by the controller 4 of the flash storage device 3.

<Physical Address API (Type #2)>

In the physical address API (type #2), the read request received from the host 2 designates a part of the physical address (i.e., the block number) of the NAND flash memory 5, and the logical address. In contrast, the write request received from the host 2 designates a part of the physical address (i.e., the block number) of the NAND flash memory 5, and the logical address.

In other words, the host 2 manages a block-level lookup table (block-level LUT) which is a the block-level address translation table for managing mapping between each of the logical addresses and each of the block numbers, and the flash storage device 3 manages an in-block lookup table (in-block LUT) which is a page-level address translation table for managing mapping between each of the logical addresses and each of the in-block physical addresses of each block.

<Physical Address API (Type #3)>

In the physical address API (type #3), the read request received from the host 2 designates the entire body of the physical address (i.e., both of the block number and the in-block offset) of the NAND flash memory 5. In contrast, the write request received from the host 2 designates a part of the physical address (i.e., the block number) of the NAND flash memory 5, and the logical address.

In other words, the host 2 manages the lookup table which functions as the logical-to-physical address translation table, but the host 2 designates a block number of a block to which the data should be written and a logical address corresponding to the data, alone, and a location in the block to which the data should be written (i.e., a write destination location) is determined by the flash storage device 3. The flash storage device 3 notifies the host 2 of an in-block offset (in-block physical address) indicative of the determined location in the block (write destination location).

The key value API has the following characteristics.

In the key value API, a key (tag) of a key-value store or a hash value of the key is used as a type of the logical address.

In the key value API, the read request from the host 2 designates the key as the logical address and does not designate the physical address of the NAND flash memory 5. In addition, in the key value API, the write request from the host 2 also designates the key as the logical address and does not designate the physical address of the NAND flash memory 5.

In the above-explained physical address API (type #1), the physical address API (type #2), and the physical address API (type #3), LBA may be used as the logical address, or the key (tag) of the key-value store or the hash value of the key may be used as the logical address.

The API corresponding to the variable-length LUT has the following characteristics.

The API corresponding to the variable-length LUT is API for handling the variable-length data. The controller 4 manages the variable-length LUT including plural entries corresponding to plural logical addresses. Each of the entries includes a field holding the logical address corresponding to certain data, a field holding the physical address indicative of the physical storage location to which the data is written, and a field holding a length of the data. API corresponding to the variable-length LUT enables data having an arbitrary length to be written to an arbitrary logical address.

In the embodiments, the controller 4 can apply arbitrary API to an arbitrary region of the NAND flash memory 5. A relationship of correspondence between each of the regions and each of the APIs can be designated by the host 2.

FIG. 2 illustrates a case where the NAND flash memory 5 is logically divided into plural regions (regions #0 to #6 in this case), APIs corresponding to the regions #0 and #1 are set to LBA APIs, API corresponding to the region #2 is set to the physical address API (type #1), API corresponding to the region #3 is set to the physical address API (type #2), API corresponding to the region #4 is set to the physical address API (type #3), API corresponding to the region #5 is set to the key value API, and API corresponding to the region #6 is set to the other API.

The read request, the write request, and the like from the host 2 include an identifier (ID) indicative of the region to be accessed. The controller 4 selects API to be used, based on the identifier (ID) included in the read request/write request.

For example, if the controller 4 receives read request including ID #0 designating the region #0 from the host 2, the controller 4 executes the data read from the region #0 by using the LBA API. In contrast, if the controller 4 receives the read request including ID (any one of ID #2 to ID #4)

designating any one of the region #2 to region #4, the controller 4 executes the data read from the designated region by using the physical address API.

More specifically, the controller 4 executes the following steps of the read processing.

(1) The controller 4 receives the read request (read command) from the host 2.

(2) The controller 4 checks the ID included in the received read request.

(3) If the received read request includes ID #0, the controller 4 selects LBA API which is the API corresponding to the region #0. To read access the region #0 by using LBA API, the controller 4 obtains the logical address from the received read request, and obtains the physical address corresponding to the obtained logical address from a logical-to-physical address translation table (LUT) which manages mapping between each of logical addresses and each of physical addresses of the region #0. Then, the controller 4 reads the data from the region #0, based on the obtained physical address.

(4) If the received read request includes ID (any one of ID #2 to #4) designating any one of the regions #2 to #4, the controller 4 selects the physical address API which is the API corresponding to any one of the regions #2 to #4. To read access the designated region by using the physical address API, the controller 4 obtains physical address information designating a part of or all of a physical address from the received read request. Then, the controller 4 reads the data from the designated region, based on the obtained physical address information.

Thus, API to be used is automatically selected in accordance with the region to be accessed.

The plural regions (i.e., the regions #0 to #6) may be implemented by plural namespaces. Each of the namespaces is a region of a kind (storage region) in the NAND flash memory 5, and a logical address space (LBA range) is allocated to each of the namespaces. The individual namespaces are identified by identifiers (NSID) of the namespaces. LBA ranges (LBA0 to LBAn−1) are allocated to the respective regions. The size of the LBA range (that is, the number of LBAs) is variable for each region (namespace). Each of the LBA ranges starts with LBA0.

If each of the regions #0 to #6 is implemented by the namespace, each read/write request from the host 2 includes an identifier (NSID) corresponding to the namespace to be accessed.

When the controller 4 receives the read request, the controller 4 checks NSID included in the read request. If the received read request includes NSID #0, the controller 4 selects LBA API which is the API corresponding to the region #0. To read access the namespace #0 by using LBA API, the controller 4 obtains the logical address from the received read request, and obtains the physical address corresponding to the obtained logical address from LUT (LUT for namespace #0) which manages mapping between each of the logical addresses corresponding to the namespace #0 and each of the physical addresses of the NAND flash memory 5. The controller 4 reads the data from the namespace #0 (i.e., the region in the NAND flash memory 5 corresponding to the namespace #0), based on the obtained physical address.

If the received read request includes any one of NSID #2 to #4, the controller 4 selects the physical address API. To read and access the designated namespace by using the physical address API, the controller 4 obtains physical address information designating a part of or all of the physical addresses from the received read request. The controller 4 reads the data from the designated namespace (i.e., the region in the NAND flash memory 5 corresponding to the namespace), based on the obtained physical address information.

FIG. 3 shows a configuration example of the flash storage device 3.

The flash storage device 3 comprises the controller 4 and the NAND flash memory 5 as explained above. The flash storage device 3 may comprise a random access memory, for example, a DRAM 6.

The NAND flash memory 5 comprises a memory cell array comprising plural memory cells arranged in a matrix. The NAND flash memory 5 may be a NAND flash memory having a two-dimensional structure or a NAND flash memory having a three-dimensional structure.

The memory cell array of the NAND flash memory 5 includes plural blocks BLK0 to BLKm−1. Each of the blocks BLK0 to BLKm−1 is formed of plural pages (pages P0 to Pn−1 in this case). The blocks BLK0 to BLKm−1 function as erase units. The blocks may be referred to as "erase blocks", "physical blocks" or "physical erase blocks". Each of the pages P0 to Pn−1 comprises plural memory cells connected to the same word line. The pages P0 to Pn−1 are units for a data write operation and a data read operation.

The controller 4 is electrically connected to the NAND flash memory 5 which is a nonvolatile memory, via a NAND interface 13 such as toggle or open NAND flash interface (ONFI). The controller 4 is a memory controller (control circuit) configured to control the NAND flash memory 5.

As illustrated in FIG. 4, the NAND flash memory 5 comprises plural NAND flash memory dies. Each of the NAND flash memory dies is a nonvolatile memory die comprising a memory cell array comprising plural blocks BLK and a peripheral circuit which controls the memory cell array. The individual NAND flash memory dies can operate independently. For this reason, the NAND flash memory dies function as parallel operation units. The NAND flash memory dies are referred to as "NAND flash memory chips" or "nonvolatile memory chips". FIG. 4 illustrates a case where sixteen channels Ch1, Ch2, . . . Ch16 are connected to the NAND interface 13 and the same number (for example, two dies per channel) of NAND flash memory dies are connected to each of the channels Ch1, Ch2, . . . Ch16. Each of the channels comprises a communication line (memory bus) for communication with the corresponding NAND flash memory dies.

The controller 4 controls NAND flash memory dies #1 to #32 via the channels Ch1, Ch2, . . . Ch16. The controller 4 can simultaneously drive the channels Ch1, Ch2, . . . Ch16.

Sixteen NAND flash memory dies #1 to #16 connected to the channels Ch1 to Ch16 may be formed as a first bank, and remaining sixteen NAND flash memory dies #17 to #32 connected to the channels Ch1 to Ch16 may be formed as a second bank. The banks function as units of causing plural memory modules to be operated in parallel by bank interleaving. In the configuration example shown in FIG. 5, a maximum of thirty-two NAND flash memory dies can be operated in parallel by sixteen channels and the bank interleaving using two banks.

In the present embodiments, the controller 4 may manage plural blocks (hereinafter called super blocks) each of which is composed of the blocks BLK and may execute the erase operation in units of super blocks.

The super blocks are not limited to these but may include a total of thirty-two blocks BLK selected from the NAND flash memory dies #1 to #32, respectively. Each of the NAND flash memory dies #1 to #32 may have a multi-plane configuration. For example, if each of the NAND flash memory dies #1 to #32 has the multi-plane configuration including two planes, one super block may include a total of sixty-four blocks BLK selected from sixty-four planes corresponding to the NAND flash memory dies #1 to #32, respectively. FIG. 5 illustrates a case where one super block SB is composed of a total of thirty-two blocks BLK (i.e., the blocks BLK surrounded by a thick frame in FIG. 4) selected from the NAND flash memory dies #1 to #32, respectively.

As shown in FIG. 3, the controller 4 comprises a host interface 11, a CPU 12, a NAND interface 13, a DRAM interface 14, and the like. The host interface 11, the CPU 12, the NAND interface 13, and the DRAM interface 14 are interconnected via the bus 10.

The host interface 11 is a host interface circuit configured to execute communication with the host 2. The host interface 11 may be, for example, a PCIe controller (NVMe controller). The host interface 11 receives various requests (commands) from the host 2. The requests (commands) include a write request (write command), a read request (read command), and the other various requests (commands).

The CPU 12 is a processor configured to control the host interface 11, the NAND interface 13, and the DRAM interface 14. The CPU 12 loads a control program (firmware) from the NAND flash memory 5 or a ROM (not shown) to the DRAM 6 in response to power-on of the flash storage device 3 and executes various processing by executing the firmware. The firmware may be loaded into SRAM (not shown) in the controller 4. The CPU 12 can execute command processing for processing various commands from the host 2, and the like. Operations of the CPU 12 are controlled by the above-explained firmware executed by the CPU 12. A part or all the command processing may be executed by exclusive hardware in the controller 4.

The CPU 12 can function as an API setting/selection unit 20, a write operation control unit 21, a read operation control unit 22, and a GC operation control unit 23.

The API setting/selection unit 20 sets API to be used for each region, based on the request from the host 2. In addition, the API setting/selection unit 20 selects API to be used for the read/write access, based on the ID included in the read/write request received from the host 2.

The write operation control unit 21 can execute plural types of write processing corresponding to the above-explained plural types of APIs. The read operation control unit 22 can also execute plural types of read processing corresponding to the above-explained plural types of APIs. Similarly, the GC operation control unit 23 can also execute plural types of GC operation corresponding to the above-explained plural types of APIs.

<Write Processing Corresponding to Physical Address API (Type #1)>

In the physical address API (type #1), the write operation control unit 21 receives the write request (write command) designating the logical address from the host 2. The logical address is an identifier capable of identifying data (user data) to be written and may be, for example, LBA, a tag such as a key of a key-value store, or a hash value of the key.

When the write operation control unit 21 receives the write command, the write operation control unit 21 first determines the block (write destination block) to which the data should be written from the host 2 and a location (write destination location) in the block. Next, the write operation control unit 21 writes the data (write data) from the host 2 to the write destination location of the write destination block. In this case, the write operation control unit 21 does not write only the data from the host 2, can write both of the data and the logical address of the data to the write destination block. Then, the write operation control unit 21 returns to the host 2 the designated logical address and a physical address indicating the location (physical storage location) in the NAND flash memory 5 to which the data (write data) is written.

In this case, the physical address is represented by (1) the block number of the write destination block, and (2) an in-block offset indicative of the write destination location in the write destination block. The block number is an identifier designating the block to which the data has is written. Various numbers that can uniquely identify an arbitrary one of the blocks can be used as the block number.

The in-block offset is an in-block physical address indicative of the location in the write destination block. This in-block offset is indicative of an offset from the leading part of the write destination block to the write destination location, i.e., an offset of the write destination location relative to the leading part of the write destination block. The size of the offset from the leading part of the write destination block to the write destination location is represented by a multiple of the grain having the size different from the page size. The grain is the access unit. The maximum value of the size of the grain is restricted to the block size. In other words, the in-block offset represents the offset from the leading part of the write destination block to the write destination location by a multiple of the grain having the size different from the page size.

The grain may have the size smaller than the page size. For example, if the page is 16K bytes, the size of the grain may be 4K bytes. In this case, plural offset locations each having the size of 4K bytes are defined in a certain block. The in-block offset corresponding to the first offset location in the block is, for example, 0, the in-block offset corresponding to the next offset location in the block is, for example, 1, and the in-block offset corresponding to the further next offset location in the block is, for example, 2.

Alternatively, the grain may have the size larger than the page size. For example, the grain may have the size which is several times as large as the page size. If the page is 16K bytes, the grain may have the size of 32K bytes.

Thus, the write operation control unit 21 determines both of the block and a location in this block, to which data should be written, by itself, and notifies the host 2 of the physical address indicative of the location to which the data (user data) from the host 2 has been written. The block number and the in-block offset can be used as the physical address. The block designated by the block number may be a physical block or the above-explained super block.

The host 2 can write the user data to the NAND flash memory 5 without considering the block size, restrictions on page write order, bad pages, page size, and the like, and can further map the physical address represented by the block number and the in-block offset to the logical address of the user data.

<Read Processing Corresponding to Physical Address API (Type #1)>

In the physical address API (type #1), the read operation control unit 22 receives the read request (read command) designating the physical address (i.e., the block number and the in-block offset (in-block physical address)) from the host 2. When the read operation control unit 22 receives the read command from the host 2, the read operation control unit 22 reads the data from the NAND flash memory 5, based on the block number and the in-block offset. The block to be read is specified by the block number. The physical storage location to be read in the block is specified by the in-block offset.

To obtain the physical storage location to be read, the read operation control unit 22 may first divide the in-block offset by the number of grains (4 in this case) indicative of the page size, and determine a quotient and a remainder obtained by the division as the page number to be read and the in-page offset to be read, respectively.

<GC Processing Corresponding to Physical Address API (Type #1)>

In the physical address API (type #1), the GC operation control unit 23 selects the copy source block (GC source block) and the copy destination block (GC destination block) for the garbage collection from a number of blocks in the NAND flash memory 5. In this case, the GC operation control unit 23 generally selects plural copy source blocks (GC source blocks) and at least one copy destination block (GC destination block). A condition (GC policy) for selecting the copy source blocks (GC source blocks) may be designated by the host 2. For example, a GC policy of selecting the block in which the valid data amount is the smallest as the copy source block (GC source block) in priority may be used or the other GC policy may be used. Thus, the selection of the copy source block (GC source block) and the copy destination block (GC destination block) is executed by not the host 2, but the controller 4 (GC operation control unit 23) of the flash storage device 3. The controller 4 may manage the valid data amount of each of the blocks by using each of the block management blocks.

Management of valid data/invalid data may be executed by using the block management table 32. The block management table 32 may exist, for example, for each of the blocks. In the block management table 32 corresponding to a certain block, a bit map flag indicative of validity/invalidity of each of the data in this block is stored. The valid data means data which is referred to from LUT (i.e., data linked to the logical address as the latest data) and which may be read later by the host 2. The invalid data means data which no longer has a possibility of being read from the host 2. For example, data associated with a certain logical address is valid data, and data unassociated with logical address is invalid data.

The GC operation control unit 23 determines a location (copy destination location) in the copy destination block (GC destination block) to which the valid data stored in the copy source block (GC source block) should be written, and copies the valid data to the determined location (copy destination location) of the copy destination block (GC destination block). In this case, the GC operation control unit 23 may copy both of the valid data and the logical address of the valid data to the copy destination block (GC destination block). The GC operation control unit 23 may specify the valid data in the GC source block by referring to the block management table 32 corresponding to the copy source block (GC source block). Alternatively, management of the valid data/invalid data may be executed by the host 2 in the other embodiment. In this case, the GC operation control unit 23 may receive information indicating validity/invalidity of each of the data in the GC source block and specify the valid data in the GC source block, based on the received information.

Then, the GC operation control unit 23 notifies the host 2 of the logical address of the copied valid data, the block number of the copy destination block (GC destination block), and the in-block offset which represents the offset from the leading part of the copy destination block (GC destination block) to the copy destination location by the above-explained multiple of the grain.

As explained above, the write operation control unit 21 can write both of the data (write data) from the host 2 and the logical address from the host 2 to the write destination block. For this reason, since the GC operation control unit 23 can easily acquire the logical address of each of the data in the copy source block (GC source block) from the copy source block (GC source block), the GC operation control unit 23 can easily notify the host 2 of the logical address of the copied valid data.

<Write Processing Corresponding to Physical Address API (Type #2)>

In the physical address API (type #2), the write operation control unit 21 receives the write request (write command) designating the block number and the logical address from the host 2. The logical address is an identifier capable of identifying data (user data) to be written and may be, for example, LBA, a tag such as a key of a key-value store, or a hash value of the key. When the write operation control unit 21 receives the write command, the write operation control unit 21 first determines a location (write destination location) in the block (write destination block) having the designated block number, to which the data should be written from the host 2. Next, the write operation control unit 21 writes the data (write data) from the host 2 to the write destination location of the write destination block. In this case, the write operation control unit 21 does not write only the write data from the host 2, can write both of the write data and the logical address of the write data to the write destination block.

Then, the write operation control unit 21 updates the in-block LUT which manages the mapping between each of the logical addresses and each of the in-block physical addresses of this block, and maps the in-block physical address indicative of the above-explained write destination location of the write destination block to the logical address of the write data.

In this case, the in-block physical address is represented by an in-block offset indicative of the write destination location in the write destination block.

Thus, the write operation control unit 21 determines the write destination location in the block having the block number from the host 2 by itself and writes the write data from the host 2 to the write destination location in the block. Then, the write operation control unit 21 updates the in-block LUT corresponding to this block, and maps the in-block physical address (in-block offset) indicative of the write destination location to the logical address of the write data. The flash storage device 3 can thereby conceal the restrictions on page write order, the bad page, the page size, and the like while urging the host 2 to handle the block number.

As a result, the host 2 can recognize the block boundary, can manage the user data which exists at each block number without considering the restrictions on page write order, the bad page, and the page size.

<Read Processing Corresponding to Physical Address API (Type #2)>

In the physical address API (type #2), the read operation control unit 22 receives the read request (read command) designating the logical address and the block number from the host 2. The logical address is an identifier capable of identifying data (user data) to be written and may be, for example, LBA, a tag such as a key of a key-value store, or a hash value of the key. If the read operation control unit 22 receives the read command from the host 2, the read operation control unit 22 refers to in-block LUT 32 corresponding to the block having the block number designated by this read request, by using this logical address. The read operation control unit 22 can thereby acquire the in-block physical address (in-block offset) of the block in which the data corresponding to the logical address is stored. Then, the read operation control unit 22 reads the data corresponding to the logical address from the NAND flash memory 5, based on the block number designated by the read command and the acquired in-block physical address.

In this case, the block to be read is specified by the block number. The physical storage location to be read in the block is specified by the in-block offset. To obtain the physical storage location to be read, the read operation control unit 22 may first divide the in-block offset by the number of grains (4 in this case) indicative of the page size, and determine a quotient and a remainder obtained by the division as the page number to be read and the in-page offset to be read, respectively.

<GC Processing Corresponding to Physical Address API (Type #2)>

In the physical address API (type #2), the GC operation control unit 23 receives from the host 2 the GC control command designating the copy source block number (GC source block number) and the copy destination block number (GC destination block number) for the garbage collection of the NAND flash memory 5. If the GC operation control unit 23 receives a GC control command from the host 2, the GC operation control unit 23 selects a block having the designated copy source block number and a block having the designated copy destination block number, of the plural blocks of the NAND flash memory 5, as the copy source block (GC source block) and the copy destination block number (GC destination block). The GC operation control unit 23 determines a copy destination location in the GC destination block to which the valid data stored in the selected GC source block should be written, and copies the valid data to the copy destination location in the GC destination block.

Then, the GC operation control unit 23 updates the in-block LUT corresponding to the GC source block and the in-block LUT corresponding to the GC destination block, such that the in-block physical address (in-block offset) mapped to the logical address of the valid data is changed from the in-block physical address indicative of the copy source location in the GC source block in which the valid data is stored to the in-block physical address indicative of the copy destination location in the GC destination block.

As explained above, the GC operation control unit 23 determines a location (copy destination location) in the copy destination block (GC destination block) to which the valid data stored in the copy source block (GC source block) should be written, and copies the valid data to the determined location (copy destination location) of the copy destination block (GC destination block). In this case, the GC operation control unit 23 may copy both of the valid data and the logical address of the valid data to the copy destination block (GC destination block).

As explained above, the write operation control unit 21 can write both of the data (write data) from the host 2 and the logical data from the host 2 to the write destination block. For this reason, since the GC operation control unit 23 can easily acquire the logical address of each of the data in the copy source block (GC source block) from the copy source block (GC source block), the GC operation control unit 23 can easily update the in-block LUT corresponding to the copy source block and the in-block LUT corresponding to the copy destination block.

<Write Processing Corresponding to Physical Address API (Type #3)>

The physical address API (type #3) is the intermediate API between the physical address API (type #2) and the physical address API (type #1). In the physical address API (type #3), the in-block LUT is not used unlike the physical address API (type #2).

In the physical address API (type #3), the write operation control unit 21 receives the write request (write command) designating the block number and the logical address from the host 2. The logical address is an identifier capable of identifying data (user data) to be written and may be, for example, LBA, a tag such as a key of a key-value store, or a hash value of the key. When the write operation control unit 21 receives the write command, the write operation control unit 21 first determines a location (write destination location) in the block (write destination block) having the designated block number, to which the data should be written from the host 2. Next, the write operation control unit 21 writes the data (write data) from the host 2 to the write destination location of the write destination block. In this case, the write operation control unit 21 does not write only the data from the host 2, can write both of the data and the logical address of the data to the write destination block.

Then, the write operation control unit 21 notifies the host 2 of the in-block physical address indicative of the above-explained write destination location of the write destination block. The in-block physical address is represented by an in-block offset indicative of the write destination location in the write destination block.

Thus, the write operation control unit 21 determines the write destination location in the block having the block number from the host 2 by itself and writes the write data from the host 2 to the write destination location in the block. Then, the write operation control unit 21 notifies the host 2 of the in-block physical address (in-block offset) indicative of the write destination location as a response (return value) to the write request. Alternatively, the write operation control unit 21 does not notify the host 2 of only the in-block physical address (in-block offset), may notify the host 2 of a group of the logical address, the block number, and the in-block physical address (in-block offset).

Therefore, the flash storage device 3 can conceal the restrictions on page write order, the bad page, the page size, and the like while urging the host 2 to handle the block number.

As a result, the host 2 can recognize the block boundary, and can manage the user data which exists at each block number without considering the restrictions on page write order, the bad page, and the page size.

<Read Processing Corresponding to Physical Address API (Type #3)>

In the physical address API (type #3), the read operation control unit 22 receives the read request (read command) designating the physical address (i.e., the block number and the in-block offset) from the host 2. When the read operation control unit 22 receives the read command from the host 2, the read operation control unit 22 reads the data from the physical storage location to be read in the block to be read, based on the block number and the in-block offset. The block to be read is specified by the block number. The physical storage location to be read in the block is specified by the in-block offset.

To obtain the physical storage location to be read, the read operation control unit 22 may first divide the in-block offset by the number of grains (4 if the page size is 16K bytes and the grain is 4K bytes) indicative of the page size, and determine a quotient and a remainder obtained by the division as the page number to be read and the in-page offset to be read, respectively.

<GC Processing Corresponding to Physical Address API (Type #3)>

In the physical address API (type #3), the GC operation control unit 23 receives from the host 2 the GC control command designating the copy source block number (GC source block number) and the copy destination block number (GC destination block number) for the garbage collection of the NAND flash memory 5. If the GC operation control unit 23 receives a GC control command from the host 2, the GC operation control unit 23 selects a block having the designated copy source block number and a block having the designated copy destination block number, of the plural blocks of the NAND flash memory 5, as the copy source block (GC source block) and the copy destination block (GC destination block). The GC operation control unit 23 determines a copy destination location in the GC destination block to which the valid data stored in the selected GC source block should be written, and copies the valid data to the copy destination location in the GC destination block. Then, the GC operation control unit 23 notifies the host 2 of the logical address of the valid data, the copy destination block number, and the in-block physical address (in-block offset) indicative of the copy destination location in the GC destination block.

The NAND interface 13 is a memory control circuit configured to control the NAND flash memory 5 under the control of the CPU 12. The DRAM interface 14 is a DRAM control circuit configured to control the DRAM 6 under the control of the CPU 12. A part of a storage region of the DRAM 6 is used to store the write buffer (WB) 31. In addition, the other part of the storage region in the DRAM 6 is utilized to store the block management table 32. In addition, in the case of using the physical address API (type #2), the other part of the storage region in the DRAM 6 is partially used for storage of the in-block LUT. The write buffer (WB) 31, the block management table 32, and the in-block LUT may be stored in SRAM (not shown) in the controller 4.

FIG. 6 shows an extended namespace management command.

The extended namespace management command is a management command to create or delete the region (namespace in this example).

The extended namespace management command includes the following parameters.

(1) Create/Delete
(2) LBA range
(3) Physical resource size
(4) API type

The value 0h of the creation/deletion parameter requests creation of a namespace to the SSD 3. The value 1h of the creation/deletion parameter requests deletion of a namespace to the SSD 3. When deletion of a namespace is requested, a parameter indicating the ID of the namespace to be deleted is set to the extended namespace management command.

The LBA range parameter indicates the LBA range (LBA 0 to n−1) of the namespace. This LBA range is mapped to a user area of the namespace.

The physical resource size parameter indicates the number of blocks to be secured for a namespace.

In another embodiment, instead of the physical resource size parameter, the extended namespace management command may include a parameter indicative of the size of over-provision.

The over-provision size parameter indicates the number of blocks to be secured for an over-provision area within the area associated with the namespace. If the extended namespace management command includes a parameter corresponding to the size of the over-provision, the SSD 3 may create a namespace and allocate blocks whose number is specified by this parameter to an over-provision area within the area associated with this namespace.

The relationship between the value of the API type parameter and the API type is as follows:
000: LBA API
001: Physical Address API (type #1)
010: Physical Address API (type #2)
011: Physical Address API (type #3)
100: Key value API
101: Other API (for example, variable-length LUT)

FIG. 7 shows region (namespace) creation processing executed by the flash storage device 3.

The host 2 sends an extended namespace management command requesting creation of a namespace to the SSD 3. This extended namespace management command includes a physical resource size parameter designating the number of blocks to be secured for the region (namespace) to be created, and the API type parameter designating the API type to be set for the region (namespace) to be created. Since the capacity of one block within the SSD 3 is reported to the host 2 from the SSD 3, the host 2 can request the number of blocks suitable for the region (namespace) to be created. In addition, the host 2 can designate API suitable to the region (namespace) to be created. For example, if the host 2 creates a bootable region where the operating system can be booted, the host 2 may designate LBA API. In addition, if the host 2 creates a region where a high priority should be placed on the I/O performance, the host 2 may designate the physical address API (type #1), the physical address API (type #2), and the physical address API (type #3).

In response to receipt of the extended namespace management command, the controller 4 of the SSD 3 creates namespace (NS #0), reserves a specified number of blocks for the namespace (NS #0), and further sets the API type of the namespace (NS #0) to the API type of the designated type (step S1). The controller 4 sends a response indicating completion of the command to the host 2. This response may include the ID of the created namespace.

The host 2 sends an extended namespace management command requesting creation of a next namespace to the SSD 3. This extended namespace management command includes a physical resource size parameter designating the number of blocks to be secured for the region (namespace) to be created, and the API type parameter designating the API type to be set for the region (namespace) to be created. In response to receipt of the extended namespace management command, the controller 4 of the SSD 3 creates namespace (NS #1), reserves a specified number of blocks for the namespace (NS #1), and further sets the API type of the namespace (NS #1) to the API type of the designated type (step S2). The controller 4 sends a response indicating completion of the command to the host 2. This response may include the ID of the created namespace.

Similarly, the host 2 sends an extended namespace management command requesting creation of a further next namespace to the SSD 3. This extended namespace management command includes a physical resource size parameter designating the number of blocks to be secured for the region (namespace) to be created, and the API type parameter designating the API type to be set for the region (namespace) to be created. In response to receipt of the extended namespace management command, the controller 4 of the SSD 3 creates namespace (NS #n), reserves a specified number of blocks for the namespace (NS #n), and further sets the API type of the namespace (NS #n) to the API type of the designated type (step S3). The controller 4 sends a response indicating completion of the command to the host 2. This response may include the ID of the created namespace.

By thus repeating the process of creating a namespace, the NAND memory 5 is logically divided into plural regions, and the API type is set for each of the regions. The correspondence of the region to the API type is managed by an API type management table managed by the controller 4 of the flash storage device 3.

The controller 4 of the flash storage device 3 receives from the host 2 commands (read command, write command, GC control command, and the like) including an identifier (namespace ID: NSID) indicative of the region to be accessed. The controller 4 selects the API to be used, based on the NSID included in the received commands and the API type management table.

Details of the physical address API (type #1), the physical address API (type #2), and the physical address API (type #3) will be hereinafter explained.

Each of various commands used in the physical address API (type #1), the physical address API (type #2), and the physical address API (type #3) includes the NSID designating a certain region (namespace), and characteristics of the command will be described in the following explanation of each command and the explanation of NSID will be omitted.

<Details of Physical Address API (Type #1)>

First, the physical address API (type #1) will be explained with reference to FIG. 8 to FIG. 35.

FIG. 8 shows role sharing between the host and the conventional SSD, and role sharing between the host 2 and the flash storage device 3 supporting the physical address API (type #1).

The left part of FIG. 8 shows a hierarchical structure of the entire computing system including the conventional SSD and the host executing virtual disk services.

In the host (server), a virtual machine service 101 for providing plural virtual machines to plural end users is executed. In each of the virtual machines on the virtual machine service 101, an operating system and user applications 102 used by the corresponding end users are executed.

In addition, in the host (server), plural virtual disk services 103 corresponding to the user applications 102 are executed. Each of the virtual disk services 103 allocates a part of the capacity of the storage resource in the conventional SSD as the storage resource (virtual disk) for the corresponding user application 102. In each of the virtual disk services 103, application-level address translation which translates the application-level logical address into the logical address for SSD is also executed by using the application-level address translation table. Furthermore, in the host, application-level GC 104 is also executed.

Transmission of the command from the host (server) to the conventional SSD and return of a response of command completion from the conventional SSD to the host (server) are executed via an I/O queue 200 which exists in each of the host (server) and the conventional SSD.

The conventional SSD comprises a write buffer (WB) 301, a lookup table (LUT) 302, a garbage collection function 303, and a NAND flash memory (NAND flash array) 304. The conventional SSD manages only one lookup table (LUT) 302, and resources of the NAND flash memory (NAND flash array) 304 are shared by the plural virtual disk services 103.

In this configuration, write amplification becomes large by duplicated GC including the application-level GC 104 under the virtual disk services 103 and the garbage collection function 303 (LUT-level GC) in the conventional SSD. In addition, in the conventional SSD, the noisy neighbor issue that the frequency of GC increases by the increase in data write amount from a certain end user or a certain virtual disk service 103 and the I/O performance for the other end user or the other virtual disk service 103 is thereby degraded, may occur.

In addition, a number of memory resources are consumed due to the existence of duplicated resources including the application-level address translation table in each virtual disk service and the LUT 302 in the conventional SSD.

The right part of FIG. 8 shows a hierarchical structure of the entire computing system including the host 2 and the flash storage device 3 supporting the physical address API (type #1).

In the host (server) 2, a virtual machine service 401 for providing the plural virtual machines to plural end users is executed. In each of the virtual machines on the virtual machine service 401, an operating system and user applications 402 used by the corresponding end users are executed.

In addition, in the host (server) 2, plural I/O services 403 corresponding to plural user applications 402 are executed. The I/O services 403 may include LBA-based block I/O service, key-value store service, and the like. Each of the I/O services 403 includes a lookup table (LUT) which manages mapping between each of the logical addresses and each of the physical addresses of the flash storage device 3. The logical address is indicative of an identifier which can identify data to be accessed. The logical address may be the logical block address (LBA) which designates a location in the logical address space, or a key (tag) of the key-value store.

In the LBA-based block I/O service, LUT which manages mapping between each of the logical addresses (LBAs) and each of the physical addresses of the flash storage device 3 may be used.

In the key-value store service, LUT which manages mapping between each of the logical addresses (i.e., tags such as keys) and each of the physical addresses in the flash storage device 3 in which the data corresponding to the logical addresses (i.e., tags such as keys) are stored may be used. In the LUT 411, a relationship between the tag, the physical address at which data identified by the tag is stored, and a data length of the data may be managed.

Each of the end users can select an addressing method (LBA, a key of the key-value store, or the like) which should be used.

Each LUT does not translate each of the logical addresses from the user application 402 into each of the logical addresses for the flash storage device 3, but translates each of the logical addresses from the user application 402 into each of the physical addresses of the flash storage device 3. In other words, each LUT is a table in which the table for translating the logical address for the flash storage device 3 into the physical address and the application-level address translation table are integrated (merged).

In the host (server) 2, the I/O service 403 exists for each of the QOS domains. The I/O service 403 belonging to a certain QOS domain manages mapping between each of the logical addresses used by the user application 402 in the corresponding QoS domain and each of the physical addresses of the blocks belonging to the resource group allocated to the corresponding QOS domain.

Transmission of the command from the host (server) 2 to the flash storage device 3 and return of a response of command completion or the like from the flash storage device 3 to the host (server) 2 are executed via an I/O queue 500 which exists in each of the host (server) 2 and the flash storage devices 3. The I/O queues 500 may also be classified into plural queue groups corresponding to the plural QOS domains.

The flash storage device 3 comprises plural write buffers (WB) 601 corresponding to the plural QoS domains, plural garbage collection (GC) functions 602 corresponding to the plural QOS domains, and the NAND flash memories (NAND flash array) 603.

In the configuration illustrated at the right part of FIG. 8, the amount of memory resource consumed to store the address translation information can be reduced since the LUT 302 in the conventional SSD and the application-level address translation table are merged as one LUT in the I/O service 403. In addition, since the number of address translation stages is reduced, the I/O performance can be improved.

Furthermore, not the duplicated GC including the application-level GC and the LUT-level GC, but the only flash storage device 3 executes the data copy for GC (unified GC). The write amplification of the whole system can be therefore reduced remarkably as compared with the configuration in which the duplicated GC is executed. As a result, the I/O performance can be improved and the life of the flash storage device 3 can be maximized.

FIG. 9 shows a write command used in the physical address API (type #1).

The write command is a command to request the flash storage device 3 to write the data. The write command may include the command ID, the QOS domain ID, the logical address, the length, and the like.

The command ID is an ID (command code) indicating that this command is the write command, and the command ID for the write command is included in the write command.

The QoS domain ID is an identifier capable of uniquely identifying the QOS domain to which the data should be written. A write command transmitted from the host 2 in response to a write request from a certain end user may include the QOS domain ID designating the QoS domain corresponding to the end user. The namespace ID may be handled as the QoS domain ID.

The logical address is an identifier for identifying write data to be written. The logical address may be LBA or a key of a key-value store, as explained above. If the logical address is LBA, the logical address (starting LBA) included in the write command is indicative of a logical location (first logical location) to which the write data should be written.

The length is indicative of the length of the write data to be written. This length (data length) may be designated by the number of grains or the number of LBA, or the size may be designated by bytes.

The controller 4 can classify a number of blocks in the NAND flash memory 5 into plural groups (plural QoS domains) such that each of a number of blocks in the NAND flash memory 5 belongs to only one group. Then, the controller 4 can manage a free block list (free block pool) and an active block list (active block pool) for each group (QOS domain).

The state of each block is generally classified into an active block which stores valid data and a free block which does not store valid data. Each of the blocks which are the active blocks is managed by an active block list. In contrast, each of the blocks which are the free blocks is managed by a free block list.

When the controller 4 receives the write command from the host 2, the controller 4 determines the block (write destination block) to which the data should be written from the host 2 and a location in the write destination block (write destination location). The controller 4 may determine one of free blocks belonging to the QoS domain corresponding to the QoS domain ID as the write destination block. The write destination location is determined in consideration of the restrictions on page write order, the bad pages, and the like. Then, the controller 4 writes the data from the host 2 to the write destination location in the write destination block.

If the whole write destination block is filled with the user data, the controller 4 moves the write destination block to the active block list (active block pool). Then, the controller 4 selects again the free block from the free block list corresponding to the QoS domain, and allocates the selected free block as a new write destination block.

If the number of remaining free blocks managed by the free block list is lower than or equal to a threshold value determined by a predetermined policy or if an instruction to execute the garbage collection is sent from the host 2, the controller 4 may start the garbage collection of this QoS domain.

In the garbage collection of this QOS domain, the controller 4 selects a copy source block (GC source block) and a copy destination block (GC destination block) from the active blocks corresponding to the QoS domain. Which block is selected as a GC candidate (copy source block) may be determined under the above-explained policy designated by the host 2 or may be designated by the host 2. If the block is selected under the policy, for example, the block having the smallest valid data amount may be selected as the GC candidate (copy source block).

FIG. 10 shows a response to the write command shown in FIG. 9.

This response includes the logical address, the physical address, and the length.

The logical address is the logical address included in the write command shown in FIG. 9.

The physical address is indicative of a physical storage location in the NAND flash memory 5 to which data corresponding to the write command shown in FIG. 9 has been written. In the flash storage device 3 supporting the physical address API (type #1), the physical address is designated by a combination of the block number and the offset (in-block offset). The block number is an identifier which can uniquely identify an arbitrary one of all the blocks in the flash storage device 3. If different block numbers are assigned to all the blocks, the block numbers may be used directly. Alternatively, the block number may be represented by a combination of the die number and the in-die block number. The length is indicative of the length of the write data to be written. This length (data length) may be designated by the number of grains or the number of LBA, or the size may be designated by bytes.

FIG. 11 shows a Trim command used in the physical address API (type #1).

The Trim command is a command including the block number and the in-block offset indicative of the physical storage location in which data to be invalidated is stored. In other words, the Trim command can designate not the logical address such as LBA, but the physical address. The Trim command includes the command ID, the physical address, and the length.

The command ID is an ID (command code) indicating that this command is the Trim command, and the command ID for Trim command is included in the Trim command.

The physical address is indicative of a first physical storage location to which the data to be invalidated is stored. In the flash storage device 3 supporting the physical address API (type #1), the physical address is designated by a combination of the block number and the offset (in-block offset).

The length is indicative of the length of the data to be invalidated. This length (data length) may be designated by the number of grains or bytes.

The controller 4 manages a flag (bit map flag) indicative of validity/invalidity of each of the data included in each of the plural blocks, by using the block management table 32. If the controller 4 receives from the host 2 the Trim command including the block number and the offset (in-block offset) indicative of the physical storage location in which the data to be invalidated is stored, the controller 4 updates the block management table 32, and changes the flag (bit map flag) corresponding to the data of the physical storage location corresponding to the block number and the in-block offset included in the Trim command to a value indicative of invalidity.

Figure 12:
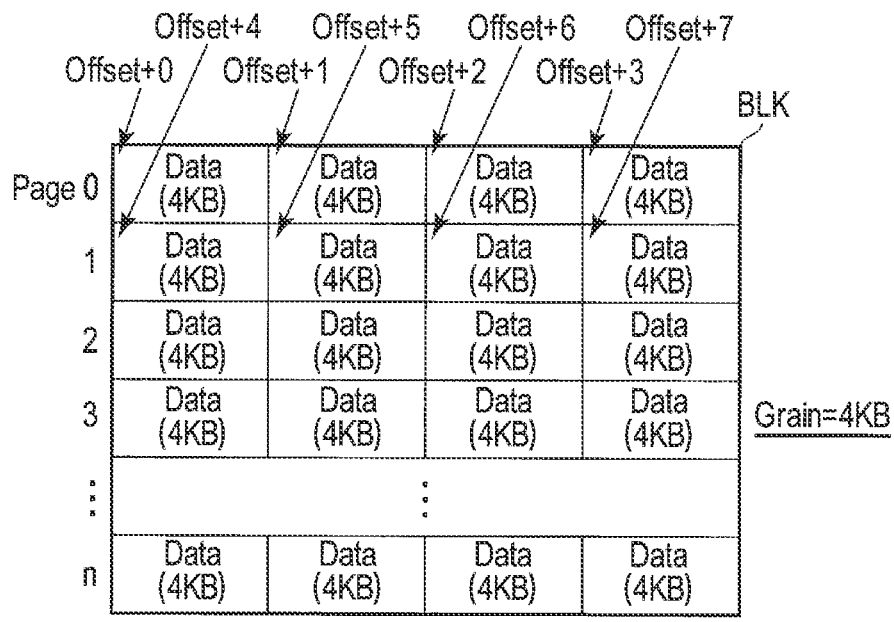
FIG. 12 is a diagram for explanation of a block number and an offset which define a physical address included in the response shown in FIG. 10.

FIG. 12 shows an example of the block numbers and offsets (in-block offsets) which define the physical address included in the response shown in FIG. 10.

The block number designates a certain block BLK. Each of the blocks BLK includes plural pages (page 0 to page n in this case) as shown in FIG. 12.

In a case where the page size (user data storing region of each page) is 16K bytes and the grain is the size of 4 KB, this block BLK is logically divided into 4×(n+1) regions.

Offset +0 is indicative of a first 4 KB area of page 0, offset +1 is indicative of a second 4 KB area of page 0, offset +2 is indicative of a third 4 KB area of page 0, and offset +3 is indicative of a fourth 4 KB area of page 0.

Offset +4 is indicative of a first 4 KB region of page 1, offset +5 is indicative of a second 4 KB region of page 1, offset +6 is indicative of a third 4 KB region of page 1, and offset +7 is indicative of a fourth 4 KB region of page 1.

Figure 13:
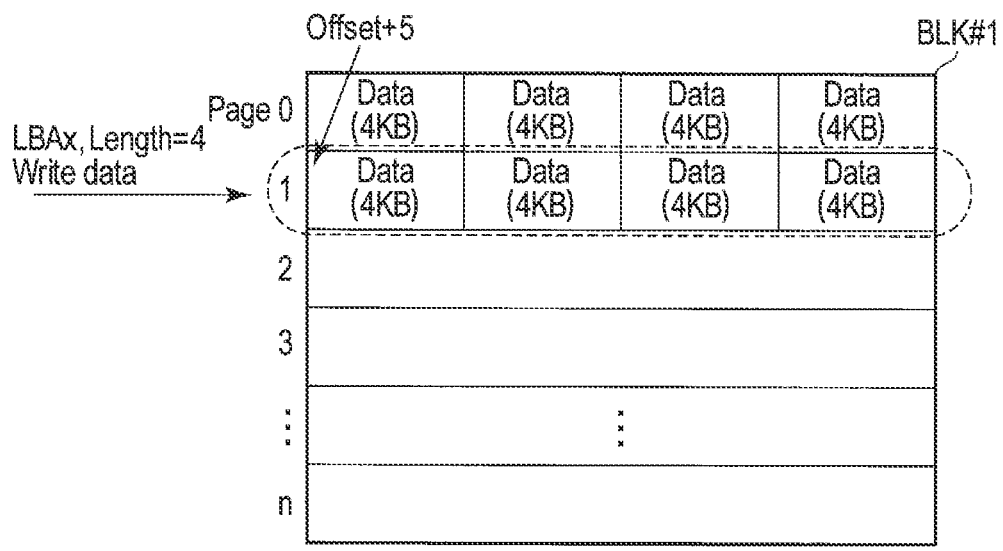
FIG. 13 is a diagram for explanation of a relationship between a write operation executed in response to a write command and a return value included in a response to the write command.

FIG. 13 shows a relationship between a write operation executed in response to a write command and a return value included in a response to the write command.

The controller 4 of the flash storage device 3 manages the free blocks including no valid data by the free block list, and selects a block (free block) from the free blocks and allocates the selected block as a write destination block. It is assumed that the block BLK #1 has been allocated as the write destination block. The controller 4 writes the data to the block BLK #1 in page units, in order of page 0, page 1, page 2, . . . page n.

In FIG. 13, it is assumed that the write command designating the logical address (LBAx), and the length (=4) has been received from the host 2 in a state in which 16K-byte data have already been written to page 0 of block BLK #1. The controller 4 determines page 1 of block BLK #1 as the write destination location, and writes the 16K-byte write data received from the host 2 to page 1 of block BLK #1. Then, the controller 4 returns the response to the write command (i.e., the logical address, the block number, the offset (in-block offset), and the length) to the host 2. In this case, the logical address is LBAx, the block number is BLK #1, the offset (in-block offset) is +5, and the length is 4.

Figure 14:
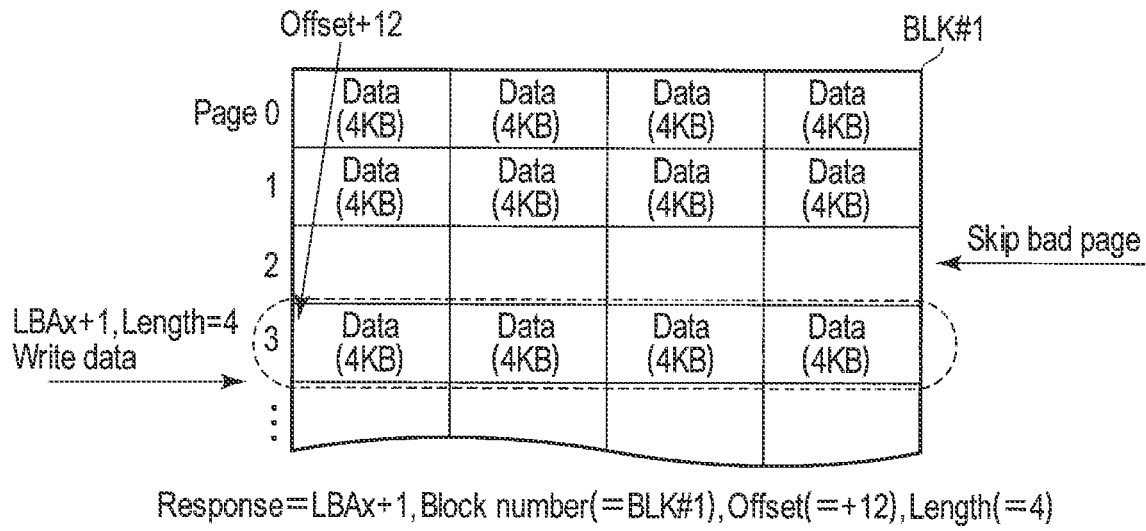
FIG. 14 is a diagram for explanation of a write operation of skipping a defective page.

FIG. 14 shows a write operation for skipping the defective page (bad page).

In FIG. 14, it is assumed that the write command designating the logical address (LBAx+1), and the length (=4) has been received from the host 2 in a state in which data have already been written to page 0 and page 1 of block BLK #1. If page 2 of block BLK #1 is the defective page, the controller 4 determines page 3 of block BLK #1 as the write destination location and writes the 16K-byte write data received from the host 2 to page 3 of block BLK #1. Then, the controller 4 returns the response to the write command (i.e., the logical address, the block number, the offset (in-block offset), and the length) to the host 2. In this case, the logical address is LBAx+1, the block number is BLK #1, the offset (in-block offset) is +12, and the length is 4.

Figure 15:
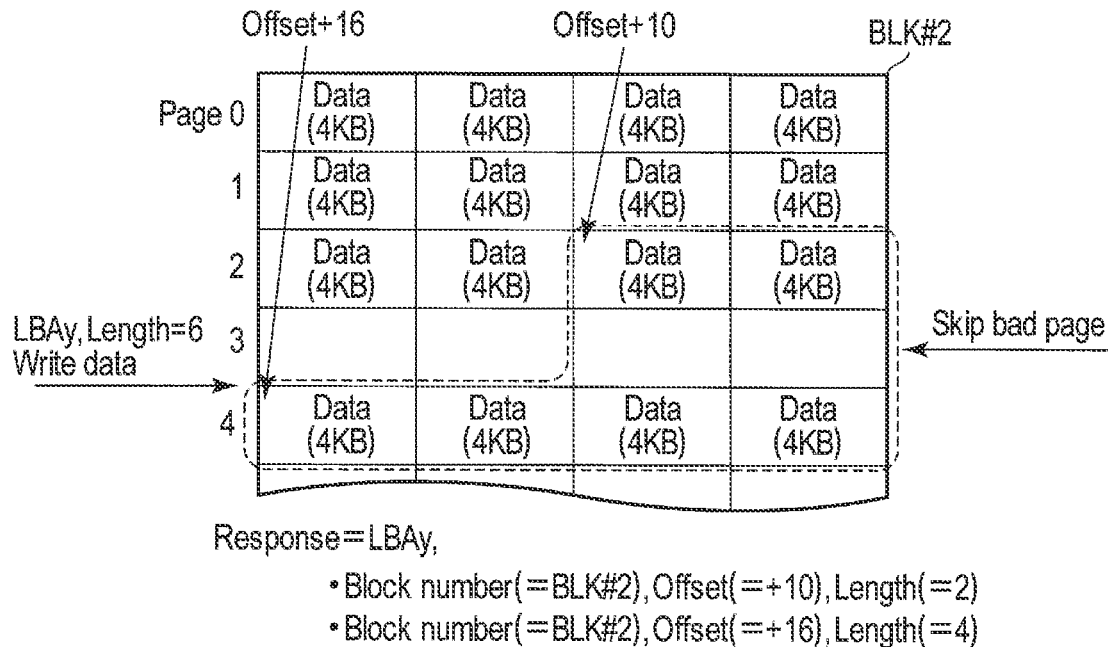
FIG. 15 is a diagram for explanation of another example of the write operation of skipping a defective page.

FIG. 15 shows another example of the write operation for skipping the defective page.

In FIG. 15, it is assumed that the data is written across two pages sandwiching the defective page. It is assumed that data have been written to page 0 and page 1 of block BLK #2 and that unwritten 8K-byte write data remain in the write buffer 31. If the write command designating the logical address (LBAy) and the length (=6) is received in this state, the controller 4 prepares 16K-byte write data corresponding to the page size by using the unwritten 8K-byte write data and first 8K-byte write data in 24K-byte write data newly received from the host 2. Then, the controller 4 writes the prepared 16K-byte write data to page 2 of block BLK #2.

If next page 3 of block BLK #2 is the defective page, the controller 4 determines page 4 of block BLK #2 as the next write destination location and writes remaining 16K-byte write data in the 24K-byte write data received from the host 2 to page 4 of block BLK #2.

Then, the controller 4 returns the response to the write command (i.e., the logical address, the block number, the offset (in-block offset), and the length) to the host 2. In this case, this response may include LBAy, the block number (=BLK #2), the offset (=+10), the length (=2), the block number (=BLK #2), the offset (=+16), and the length (=4).

Figure 16:
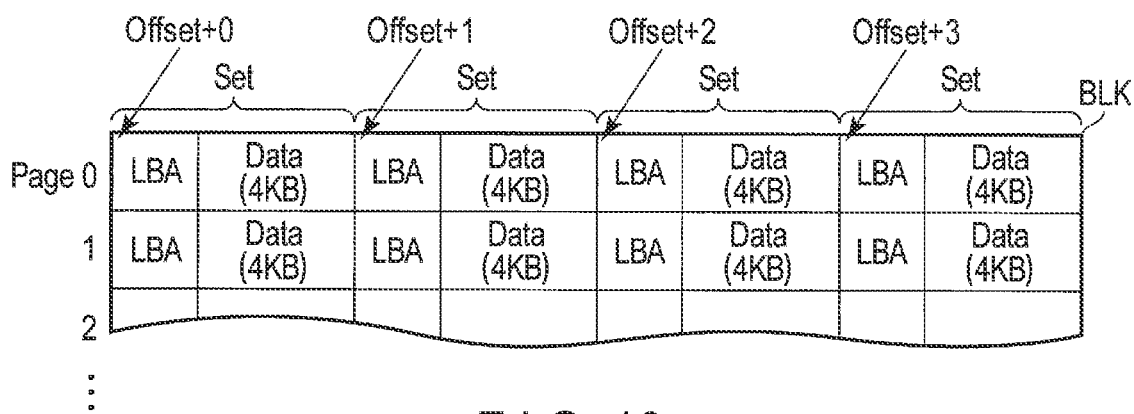
FIG. 16 is a diagram for explanation of an operation of writing a pair of a logical address and data to a page in a block.
Figure 17:
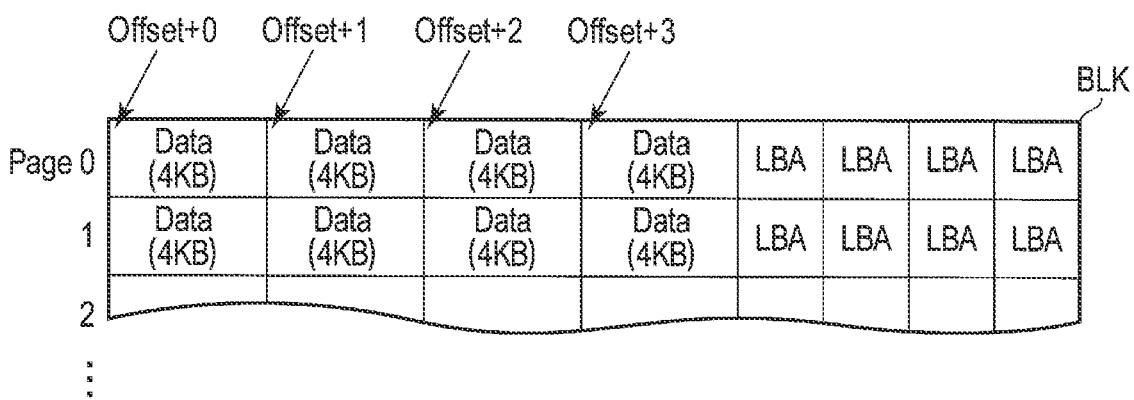
FIG. 17 is a diagram for explanation of an operation of writing data to a user data region of the page and writing the logical address of the data to a redundant region of the page.

FIG. 16 and FIG. 17 show an operation of writing a pair of the logical address and the data to a page in the block.

In each of the blocks, each page may include a user data region for storing the user data and a redundant region for storing the management data. The page size is over 16 KB.

The controller 4 writes both of 4 KB user data and the logical address (for example, LBA) corresponding to the 4 KB user data to the write destination block BLK. In this case, as shown in FIG. 16, four data sets each including LBA and the 4 KB user data may be written to the same page. The in-block offset may be indicative of the set boundary.

Alternatively, as shown in FIG. 17, four 4 KB user data may be written to user data regions in the page and four LBAs corresponding to these four 4 KB user data may be written to redundant regions in this page.

FIG. 18 shows a relationship between the block number and the offset (in-block offset) in a case of using a super block. The in-block offset is also referred to as offset, simply, in the following explanations.

To simplify the diagram, one super block SB #1 is assumed to be composed of four blocks BLK #11, BLK #21, BLK #31, and BLK #41. The controller 4 writes the data in order of page 0 of block BLK #11, page 0 of block BLK #21, page 0 of block BLK #31, page 0 of block BLK #41, page 1 of block BLK #11, page 1 of block BLK #21, page 1 of block BLK #31, page 1 of block BLK #41, . . . .

Offset +0 is indicative of a first 4 KB region of page 0 of block BLK #11, offset +1 is indicative of a second 4 KB region of page 0 of block BLK #11, offset +2 is indicative of a third 4 KB region of page 0 of block BLK #11, and offset +3 is indicative of a fourth 4 KB region of page 0 of block BLK #11.

Offset +4 is indicative of a first 4 KB region of page 0 of block BLK #21, offset +5 is indicative of a second 4 KB region of page 0 of block BLK #21, offset +6 is indicative of a third 4 KB region of page 0 of block BLK #21, and offset +7 is indicative of a fourth 4 KB region of page 0 of block BLK #21.

Similarly, offset +12 is indicative of a first 4 KB region of page 0 of block BLK #41, offset +13 is indicative of a second 4 KB region of page 0 of block BLK #41, offset +14 is indicative of a third 4 KB region of page 0 of block BLK #41, and offset +15 is indicative of a fourth 4 KB region of page 0 of block BLK #41.

Offset +16 is indicative of a first 4 KB region of page 1 of block BLK #11, offset +17 is indicative of a second 4 KB region of page 1 of block BLK #11, offset +18 is indicative of a third 4 KB region of page 1 of block BLK #11, and offset +19 is indicative of a fourth 4 KB region of page 1 of block BLK #11.

Offset +20 is indicative of a first 4 KB region of second 4 KB region of page 1 of block BLK #21, offset +22 is indicative of a third 4 KB region of page 1 of block BLK #21, and offset +23 is indicative of a fourth 4 KB region of page 1 of block BLK #21.

Similarly, offset +28 is indicative of a first 4 KB region of page 1 of block BLK #41, offset +29 is indicative of a second 4 KB region of page 1 of block BLK #41, offset +30 is indicative of a third 4 KB region of page 1 of block BLK #41, and offset +31 is indicative of a fourth 4 KB region of page 1 of block BLK #41.

For example, if 4K-byte data corresponding to a write command designating certain LBA (LBAx) is written to the location corresponding to offset +8, the controller 4 may return the logical address (=LBAx), the block number (=SB #1), the offset (=+8), and the length (=1) to the host 2 as the response to the write command.

A sequence chart of FIG. 19 shows a sequence of write operation processing executed by the host 2 and the flash storage device 3 supporting the physical address API (type #1).

The host 2 transmits the write command including the QoS domain ID, LBA, and the length to the flash storage device 3. When the controller 4 of the flash storage device 3 receives the write command, the controller 4 determines the write destination block to which the data should be written from the host 2 and a location in the write destination block. More specifically, the controller 4 selects a free block from the free block list and allocates the selected free block as a write destination block (step S11). In other words, the selected free block and the first available page in the selected free block are determined as the write destination block to which the write data should be written from the host 2 and the location in the write destination block. If the write destination block has been allocated, the write destination block allocation processing in step S11 does not need to be executed. A next available page in the allocated write destination block is determined as a location in the write destination block to which the write data should be written from the host 2.

The controller 4 may manage plural free block lists corresponding to plural QOS domains. In the free block list corresponding to a certain QOS domain, the only blocks reserved for this QoS domain needs only to be registered. In this case, in step S12, the controller 4 may select the free block list corresponding to the QoS domain designated by the QoS domain ID of the write command, select one of free blocks from the selected free block list, and allocate the selected free block as the write destination block. The data corresponding to different QoS domains can be thereby prevented from existing together in the same block.

The controller 4 writes the write data received from the host 2 to the write destination block (step S12). In step S12, the controller 4 writes both of the logical address (LBA in this case) and the write data to the write destination block.

Figures 20, 21:
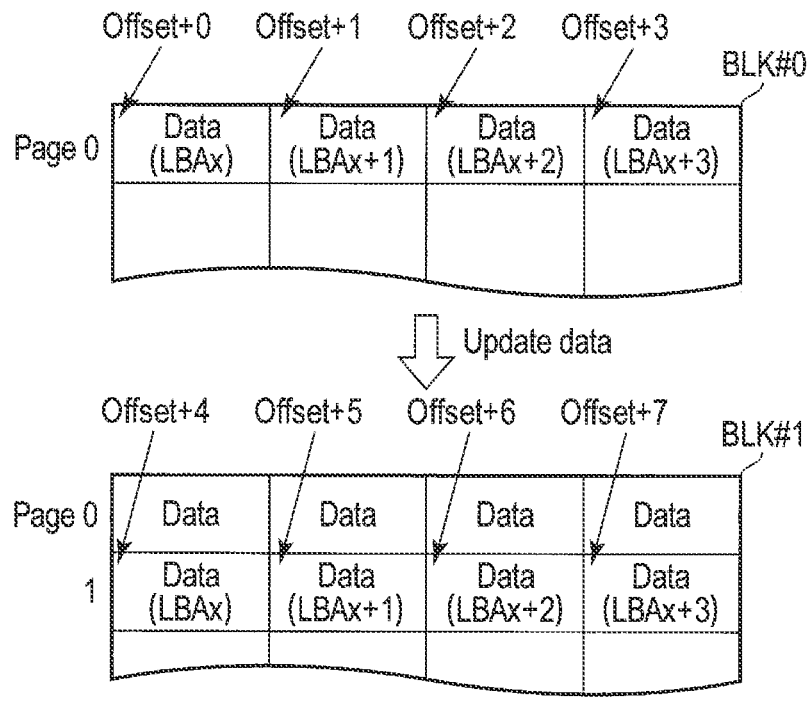
FIG. 20 is a diagram showing a data update operation of writing update data for already written data.
FIG. 21 is a diagram for explanation of an operation of updating a block management table managed by the flash storage device according to the embodiment.

The controller 4 updates the block management table 32, and changes a bit map flag corresponding to the written data (i.e., a bit map flag corresponding to the physical address of the physical storage location to which the data has been written) from 0 to 1 (step S13). It is assumed that as shown in FIG. 20, for example, 16K-byte update data in which starting LBA is LBAx are written to the physical storage locations corresponding to offsets +4 to +7 of block BLK #1. In this case, as shown in FIG. 21, each of the bit map flags corresponding to offsets +4 to +7 is changed from 0 to 1 in the block management table for block BLK #1.

The controller 4 returns a response to the write command to the host 2 (step S14). For example, as shown in FIG. 18, if the 16K-byte update data in which starting LBA is LBAx are written to the physical storage locations corresponding to offsets +4 to +7 of block BLK #1, the response including LBAx, the block number (=BLK1), the offset (=+4), and the length (=4) is transmitted to the host 2 from the controller 4.

When the host 2 receives this response, the host 2 updates the LUT managed by the host 2 and maps the physical address to each of the logical addresses corresponding to the written write data. As shown in FIG. 22, the LUT includes plural entries corresponding to the respective logical addresses (for example, LBA). In an entry corresponding to a certain logical address (for example, certain LBA), physical address PBA indicative of the location (physical storage location) in the NAND flash memory 5 in which the data corresponding to LBA is stored, i.e., the block number and the offset (in-block offset) are stored. As shown in FIG. 20, if the 16K-byte update data in which starting LBA is LBAx are written to the physical storage locations corresponding to offsets +4 to +7 of block BLK #1, the LUT is updated, BLK #1 and offset +4 are stored in the entry corresponding to LBAx, BLK #1 and offset +5 are stored in the entry corresponding to LBAx+1, BLK #1 and offset +6 are stored in the entry corresponding to LBAx+2, and BLK #1 and offset +7 are stored in the entry corresponding to LBAx+3 as shown in FIG. 22.

The host 2 then transmits the Trim command to invalidate previous data which become unnecessary due to write of the above update data, to the flash storage device 3 (step S21). If the previous data are stored in the locations corresponding to offset +0, offset +1, offset +2, and offset +3 of block BLK #0, as shown in FIG. 20, the Trim command designating the block number (=BLK #0), the offset (=+0), and the length (=4) is transmitted from the host 2 to the flash storage device 3 as shown in FIG. 23. The controller 4 of the flash storage device 3 updates the block management table 32 in response to the Trim command (step S15). In step S15, as shown in FIG. 23, each of the bit map flags corresponding to offsets +0 to +3 is changed from 1 to 0 in the block management table for block BLK #0.

FIG. 24 shows a read command used in the physical address API (type #1).

The read command is a command to request the flash storage device 3 to read the data. The read command includes the command ID, the physical address PBA, the length, and the transfer destination pointer.

The command ID is an ID (command code) indicating that this command is the read command, and the command ID for the read command is included in the read command.

The physical address PBA is indicative of a first physical storage location from which the data should be read. The physical address PBA is designated by the block number and the offset (in-block offset).

The length is indicative of the length of the data to be read. The data length can be designated by the number of grains.

The transfer destination pointer is indicative of the location on the memory in the host 2 to which the read data is to be transferred.

One read command can designate plural sets of the physical addresses PBA (block numbers and offsets) and the lengths.

FIG. 25 shows a read operation corresponding to the physical address API (type #1).

It is assumed here that the read command designating the block number (=BLK #2), the offset (=+5), and the length (=3) is received from the host 2. The controller 4 of the flash storage device 3 reads data d1 to d3 from BLK #2, based on the block number (=BLK #2), the offset (=+5), and the length (=3). In this case, the controller 4 reads the data for one page size from page 1 of BLK #2 and extracts data d1 to data d3 from the read data. Next, the controller 4 transfers data d1 to data d3 on a host memory designated by a transfer destination pointer.

A sequence chart of FIG. 26 is indicative of a sequence of read processing corresponding to the physical address API (type #1).

The host 2 translates the logical address included in the read request from the user application into the block number and the offset by referring to the LUT managed by the host 2. Then, the host 2 transmits the read command designating the block number, the offset, and the length to the flash storage device 3.

When the controller 4 of the flash storage device 3 receives the read command from the host 2, the controller 4 determines the block corresponding to the block number designated by the read command as the block to be read, and determines the page to be read, based on the offset designated by the read command (step S31). In step S31, the controller 4 may first divide the offset designated by the read command by the number (4 in this case) of the grains indicative of the page size. Then, the controller 4 may determine a quotient and a remainder obtained by the division as the page number to be read and the in-page offset location to be read, respectively.

The controller 4 reads the data defined by the block number, the offset, and the length from the NAND flash memory 5 (step S32) and transmits the read data to the host 2.

FIG. 27 shows a garbage collection (GC) control command used in the physical address API (type #1).

The GC control command may include the command ID, the policy, the source QOS domain ID, the destination QOS domain ID, and the like.

The command ID is the ID (command code) indicating that this command is the GC control command, and the command ID for the GC control command is included in the GC control command.

The policy is the policy indicating the condition (GC policy) for selecting the GC candidate block (GC source block). The controller 4 of the flash storage device 3 supports plural GC policies.

The GC policy supported by the controller 4 may include a policy (greedy) that the block of a small valid data amount is selected with priority as the GC candidate block (GC source block).

In addition, the GC policy supported by the controller 4 may include a policy that the block in which data (cold data) of a low update frequency are collected is selected as the GC candidate block (GC source block) with higher priority than the block in which data (hot data) of a high update frequency are collected.

Furthermore, the GC poly may designate a GC start condition. The start condition may be indicative of, for example, the number of remaining free blocks.

The controller 4 manages the blocks including the valid data by the active block list and, if GC is executed, the controller 4 selects at least one GC candidate block (GC source block) from the blocks managed by the active block list, based on the GC policy designated by the GC control command.

The source QoS domain ID is a parameter indicating which QoS domain should be the GC source. The controller 4 selects at least one GC candidate block (GC source block) from the blocks belonging to the QoS domain designated by the source QoS domain ID, i.e., the active block list corresponding to the QoS domain.

The destination QoS domain ID is a parameter indicating which QOS domain should be the GC destination. The controller 4 can select at least one free block in the free blocks belonging to the QoS domain designated by the destination QoS domain ID as the GC destination block.

The source QoS domain ID and the destination QoS domain ID may designate the same QoS domain or designate QoS domains different from each other. In other words, each of the source QoS domain ID and the destination QoS domain ID is a parameter designating arbitrary one of the plural QoS domains.

If the number of remaining free blocks corresponding to the source QoS domains is smaller than equal to a threshold value designated by the policy, the controller 4 may start GC. If the controller 4 receives a GC control command including a policy designating forced execution of GC, the controller 4 may immediately start GC when the controller 4 receives the GC control command from the host 2.

FIG. 28 shows a callback command for GC used in the physical address API (type #1).

The callback command for GC is used to notify the host 2 of the logical address of the valid data copied by GC, and the block number and the offset indicating the copy destination location of the valid data.

The callback command for GC may include the command ID, the logical address, the length, a destination physical address, and a source physical address (optional).

The command ID is the ID (command code) indicating that this command is the callback command for GC, and the command ID for the callback command for GC is included in the callback command for GC.

The logical address is indicative of a logical address of the valid data copied from the GC source block to the GC destination block by GC.

The length is indicative of the length of the copied data. The data length may be designated by the number of grains.

The destination physical address is indicative of a location in the GC destination block in which the valid data is copied. The destination physical address is designated by the block number and the offset (in-block offset).

The source physical address (optional) is indicative of a location in the GC destination block in which the valid data has been stored. The source physical address is designated by the block number and the offset (in-block offset).

A sequence chart of FIG. 29 is indicative of a sequence of a garbage collection (GC) operation corresponding to the physical address API (type #1).

The controller 4 of the flash storage device 3 selects at least one GC source block (copy source block) including a mixture of valid data and invalid data from the blocks belonging to the QoS domain designated by the source QOS domain ID, based on the policy designated by the host 2 (step S41). Next, the controller 4 selects at least one free block from the free blocks belonging to the QOS domain designated by the destination QOS domain ID and allocates the selected free block as the GC destination block (copy destination block) (step S42).

The controller 4 copies all the valid data in the GC source block (copy source block) to the GC destination block (copy destination block) (step S43). In step S43, the controller 4 does not copy only the valid data in the GC source block (copy source block), but copies both of the valid data and the logical address corresponding to the valid data from the GC source block (copy source block) to the GC destination block (copy destination block). A pair of the data and the logical address can be thereby held in the GC destination block (copy destination block).

Then, the controller 4 notifies the host 2 of the logical address of the copied valid data and the destination physical address (block number and offset (in-block offset)) indicative of the location in the GC destination block (copy destination block) by using the callback command for GC (step S44). In step S44, the controller 4 may notify the host 2 of not only the destination physical address and the logical address of the copied valid data, but also the source physical address.

When the host 2 receives this callback command for GC, the host 2 updates the LUT managed by the host 2 and maps the destination physical address to each of the logical addresses corresponding to each of the copied valid data (step S51).

FIG. 30 shows an example of a data copy operation executed for the garbage collection (GC).

In FIG. 30, it is assumed that the valid data (LBA=10) stored in the location corresponding to offset +4 of the GC source block (block BLK #50 in this case) is copied to the location corresponding to offset +0 of the GC destination block (block BLK #100 in this case) and that the valid data (LBA=20) stored in the location corresponding to offset +10 of the GC source block (block BLK #50 in this case) is copied to the location corresponding to offset +1 of the GC destination block (block BLK #100 in this case). In this case, the controller 4 notifies the host of {LBA10, BLK #100, offset (=+0), LBA20, BLK #100, and offset (=+1)} (callback processing for GC).

FIG. 31 shows contents of LUT 411 of the host 2 updated based on a result of the data copy operation shown in FIG. 30.

In the LUT, the block number and the offset corresponding to LBA 10 are updated from BLK #50 and offset (=+4) to BLK #100 and offset (=+0). Similarly, the block number and the offset corresponding to LBA 20 are updated from BLK #50 and offset (=+10) to BLK #100 and offset (=+1).

After the LUT is updated, the host 2 may transmit the Trim command designating BLK #50 and offset (=+4) to the flash storage device 3 and invalidate the data stored in the location corresponding to offset (=+4) of BLK #50. Furthermore, the host 2 may transmit the Trim command designating BLK #50 and offset (=+10) to the flash storage device 3 and invalidate data stored in the location corresponding to offset (=+10) of BLK #50.

Figure 32:
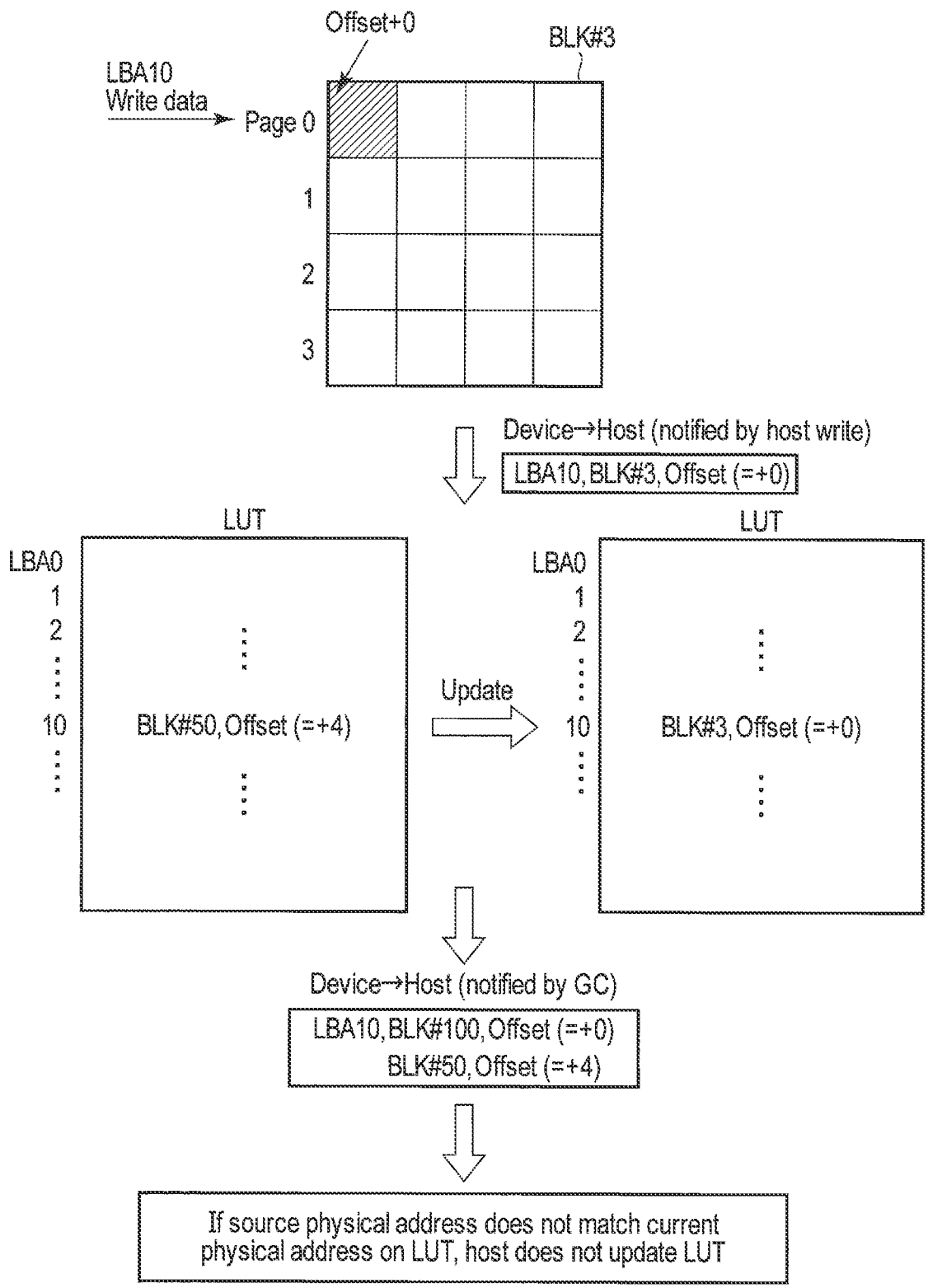
FIG. 32 is an illustration for explanation of a relationship between a response to the write command and the callback processing for GC.

FIG. 32 shows a relationship between a response to the write command and the callback processing for GC.

When the controller 4 is copying the valid data corresponding to certain logical address, the write command designating this logical address is often received by the host 2.

In FIG. 32, it is assumed that the write command designating LBA10 has been received from the host 2 during execution of the data copy operation (data copy operation corresponding to LBA10) shown in FIG. 30.

The controller 4 writes the write data received from the host 2 to the write destination block (i.e., to the location corresponding to offset +0 of BLK #3). Then, the controller 2 notifies the host 2 of {LBA10, BLK #3, offset (=+0)}.

The host 2 updates the LUT, and changes the block number and the offset corresponding to LBA 10 from BLK #50 and offset (=+4) to BLK #3 and offset (=+0).

After this, if the controller 4 notifies the host 2 of the destination physical address of LBA 10, the block number and the offset (BLK #3 and offset (+0)) indicative of the location where the latest data corresponding to LBA 10 is stored may be erroneously changed to the destination physical address (BLK #100 and offset (+0) in this case) corresponding to LBA 10.

In the flash storage device 3 supporting the physical address API (type #1), the controller 4 can notify the host 2 of not only LBA 10 and the destination physical address (BLK #100 and offset (+0)), but also the source physical address (BLK #50 and offset (+4)). If the source physical address (BLK #50 and offset (+4)) does not match the block number and the offset currently mapped to LBA 10 by LUT, the host 2 does not update LUT. Thus, the block number and the offset (BLK #3 and offset (+0)) indicative of the location where the latest data corresponding to LBA 10 is stored can be prevented from being erroneously changed to the destination physical address (BLK #100 and offset (+0) in this case) corresponding to LBA 10.

FIG. 33 shows another example of the garbage collection (GC) control command used in the physical address API (type #1).

The GC control command shown in FIG. 33 may designate a pair of the source device ID and the source QoS domain ID, instead of the source QOS domain ID. Furthermore, the GC control command shown in FIG. 33 may designate a pair of the destination device ID and the destination QOS domain ID, instead of the destination QoS domain ID. Thus, a certain flash storage device 3 can be operated as the GC source and the other flash storage device 3 can be operated as the GC destination. If the source device ID and the destination device ID are the same, GC is executed in one flash storage device 3.

FIG. 34 shows another example of the callback command for GC used in the physical address API (type #1).

The callback command for GC shown in FIG. 34 includes a pair of the destination device ID and the destination physical address, instead of the destination physical address. In addition, the callback command for GC shown in FIG. 34 may include a pair (optional) of the source device ID and the source physical address, instead of the source physical address (optional).

It is assumed that the flash storage device 3 having the device ID #1 operates as the GC source and that another flash storage device 3 having the device ID #2 operates as GC destination. The host 2 may transmit the GC control command designating source device ID #1 and destination device ID #2 to the flash storage device 3 of the device ID #1 and the flash storage device 3 of the device ID #2.

The flash storage device 3 of device ID #1 selects the GC source block from the blocks belonging to the QoS domain designated by the source QOS domain ID, and transmits the valid data in the GC source block and the logical address of the valid data to the flash storage device (i.e., flash storage device of device ID #2) designated by the destination device ID. The valid data in the GC source block and the logical address of the valid data are transferred, for example, from the flash storage device 3 of the device ID #1 to the flash storage device 3 of the device ID #2 via the interface 50 shown in FIG. 1.

The flash storage device 3 of device ID #2 select the GC destination block from the free blocks belonging to the QoS domain designated by the destination QoS domain ID, and writes (copies) the valid data and the logical address received via the switch 1 to the GC destination block.

The flash storage device 3 of the device ID #2 notifies the host 2 of the logical address of the copied valid data and the destination physical address (the block number and the offset) to which the valid data is copied, by the callback command for GC.

The flash storage device 3 of the device ID #1 notifies the host 2 of the logical address of the copied valid data and the source physical address (the block number and the offset) in which the valid data the valid data has been stored, by the callback command for GC.

FIG. 35 shows write/read/GC operations corresponding to the physical address API (type #1).

First, a host write operation to write the data from the host 2 will be explained.

(1) The controller 4 receives LBA and the write data from the host 2.

(2) The controller 4 writes both of the LBA and the write data to the write destination block. If the write destination block is not allocated, the controller 4 selects one of the free blocks from the free block list and allocates the selected free block as a new write destination block. Then, the controller 4 writes both of the LBA and the write data to the new write destination block.

(3) The controller 4 notifies the host 2 of the LBA and the physical address PBA indicative of the location in the write destination block to which the write data is written. The physical address PBA is represented by the block number and the offset. If the entire write destination block is full of the data, the controller 4 registers the write destination block to an active block list.

Next, the read operation will be explained.

(4) The host 2 translates the LBA included in the read request from the user application into the physical address PBA for read (block number and offset) by referring to the LUT managed by the host 2.

(5) On the basis of the physical address PBA (block number and offset) for read received from the host 2, the controller 4 determines the block having the block number as the block to be read. The block to be read is any one of the blocks (active blocks) managed by the active block list, the current GC source block, or the current write destination block. The controller 4 reads the data from the block to be read, based on the offset.

Next, the GC operation will be explained.

(6) The controller 6 selects the GC source block (copy source block) and the GC destination block (copy destination block), and copies both of the valid data stored in the GC source block and LBA of the valid data to the GC destination block.

(7) The controller 4 notifies the host 2 of both of LBA of the copied valid data and PBA (block number and offset) indicative of the location in the GC destination block in which the valid data has been copied.

Alternatively, the controller 4 may notify the host 2 of LBA of the copied valid data, PBA (block number and offset) indicative of the location in the GC destination block in which the valid data has been copied, and PBA (block number and offset) indicative of the location in the GC source block in which the valid data is stored.

<Details of Physical Address API (Type #2)>

Next, physical address API (type #2) will be explained with reference to FIG. 36 to FIG. 50.

FIG. 36 shows role sharing between the host and the conventional SSD, and role sharing between the host 2 and the flash storage device 3 supporting the physical address API (type #2).

The right part of FIG. 36 shows a hierarchical structure of the entire computing system including the host 2 and the flash storage device 3 supporting the physical address API (type #2).

In the host (server) 2, a virtual machine service 401 for providing the plural virtual machines to plural end users is executed. In each of the virtual machines on the virtual machine service 401, an operating system and user applications 402 used by the corresponding end users are executed.

In addition, in the host (server) 2, plural I/O services 403 corresponding to plural user applications 402 are executed. The I/O services 403 may include LBA-based block I/O service, key-value store service, and the like. Each of the I/O services 403 includes a block-level LUT which manages mapping between each of the logical addresses and each of the block numbers of the flash storage device 3. The logical address is indicative of an identifier which can identify data to be accessed. The logical address may be the logical block address (LBA) which designates a location in the logical address space, a key (tag) of the key-value store or a hash value of the key.

In the LBA-based block I/O service, the block-level LUT which manages mapping between each of the logical addresses (LBAs) and each of the block numbers of the flash storage device 3 may be used.

In the key-value store service, the block-level LUT which manages mapping between each of the logical addresses (i.e., tags such as keys) and each of the block numbers in the flash storage device 3 in which the data corresponding to the logical addresses (i.e., tags similar to keys) are stored may be used. In the block-level LUT, relationship between the tag, the block numbers at which data identified by the tag is stored, and a data length of the data may be managed.

Each of the end users can select an addressing method (LBA, a key of the key-value store, or the like) which should be used.

Each block-level LUT does not translate each of the logical addresses from the user application 402 into each of the logical addresses for the flash storage device 3, but translates each of the logical addresses from the user application 402 into each of the block numbers of the flash storage device 3. In other words, each bock-level LUT is a table in which the table for translating the logical address for the flash storage device 3 into the block numbers and the application-level address translation table are integrated (merged).

In addition, each I/O service 403 includes a GC block selection function. The GC block selection function can manage a valid data amount of each block by using the corresponding block-level LUT and can thereby select the GC source block.

In the host (server) 2, the I/O service 403 may exist for each of the QOS domains. The I/O service 403 belonging to a certain QoS domain manages mapping between each of the logical addresses used by the user application 402 in the corresponding QoS domain and each of the block numbers of the blocks belonging to the resource group allocated to the corresponding QoS domain.

Transmission of the command from the host (server) 2 to the flash storage device 3 and return of a response of command completion or the like from the flash storage device 3 to the host (server) 2 are executed via an I/O queue 500 which exists in each of the host (server) 2 and the flash storage devices 3. The I/O queues 500 may also be classified into plural queue groups corresponding to the plural QoS domains.

The flash storage device 3 comprises plural write buffers (WB) 601 corresponding to the plural QoS domains, plural in-block LUTs 602A corresponding to the plural QoS domains, plural garbage collection (GC) functions 603A corresponding to the plural QoS domains, and the NAND flash memories (NAND flash array) 603.

In the configuration shown at the right part of FIG. 36, since the upper layer (host 2) can recognize the block boundary, the upper layer can write the user data to each block in consideration of the block boundary/block size. In other words, the host 2 can recognize each of blocks of the NAND flash memory (NAND flash array) 603 and can thereby execute, for example, the control such as simultaneously writing the data to one entire block or invalidating the entire data in one block by deleting (unmapping) or updating. As a result, a situation in which the valid data and the invalid data exist together in one block can be prevented from easily occurring. The frequency at which GC needs to be executed can be therefore reduced. By reducing the frequency of GC, the write amplification can be lowered, the performance of the flash storage device 3 can be improved, and the life of the flash storage device 3 can be maximized. Thus, the configuration that the upper layer (host 2) can recognize the block number is useful.

In contrast, the page which can be currently written is only one page per block. For this reason, showing the page number to the upper layer is not useful as compared with showing the block number to the upper layer.

Figures 37, 38:
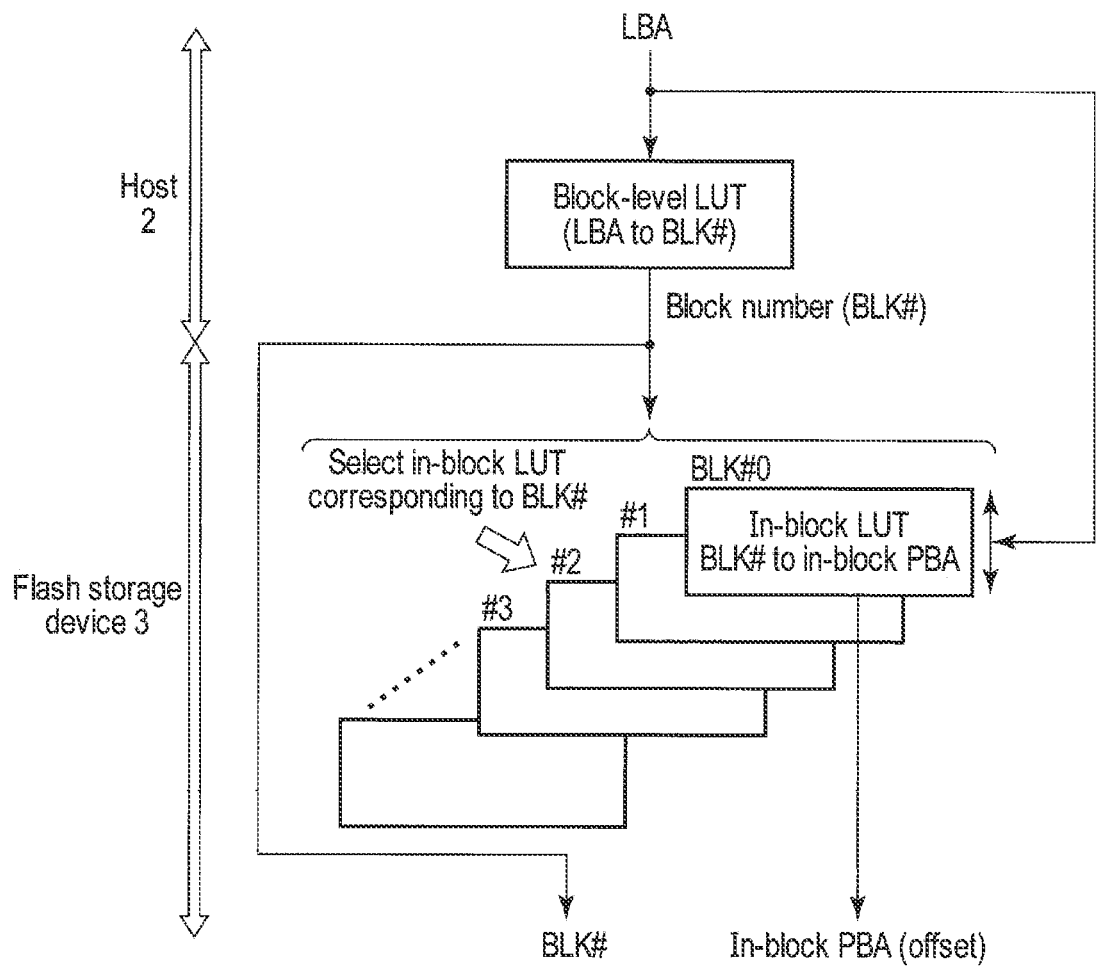
FIG. 37 is a diagram for explanation of a block-level address translation table managed by the host and an in-block address translation table managed by the flash storage device according to the embodiment.
FIG. 38 is a table for explanation of a write command used in the physical address API (type #2).

FIG. 37 shows the block-level LUT (block-level address translation table) managed by the host 2 and the in-block LUT (in-block address translation table) managed by the flash storage device 3 supporting the physical address API (type #2).

The block-level LUT manages mapping between each of the logical addresses and each of the block numbers corresponding to the plural blocks of the flash storage device 3. The block-level LUT is a table for translating a certain logical address to certain block number BLK #.

In the flash storage device 3, the plural in-block LUTs corresponding to the blocks are managed. Each of the in-block LUTs manages mapping between each of the logical addresses and each of the in-block physical addresses (in-block offsets) in the block. Each of the in-block LUTs is a table for translating a certain logical address into an in-block physical address (in-block PBA). The in-block physical address (in-block PBA) is represented by the above-explained in-block offset.

The address translation is executed in the following manner.

For example, in the read operation, the host 2 refers to the block-level LUT by using a certain logical address (for example, certain LBA) and translates the logical address (LBA) into block number BLK #. The logical address and the block number BLK #are transmitted from the host 2 to the flash storage device 3. In the flash storage device 3 supporting the physical address API (type #2), a specific logical address range is not allocated to each block, in order to enable the data corresponding to an arbitrary logical address to be stored in any block, the logical address is transmitted from the host 2 to the flash storage device 3 together with block number BLK #.

In the flash storage device 3, the controller 4 selects the in-block LUT corresponding to block number BLK #. For example, if block number BLK #from the host 2 is indicative of block number BLK #0 the in-block LUT corresponding to block number BLK #0 is selected, if block number BLK #from the host 2 is indicative of block number BLK #1 the in-block LUT corresponding to block number BLK #1 is selected, and if block number BLK #from the host 2 is indicative of block number BLK #2 the in-block LUT corresponding to block number BLK #2 is selected.

The selected in-block LUT is referred to by the logical address from the host 2. Then, the in-block PBA corresponding to the logical address is acquired from the selected in-block LUT.

FIG. 38 shows a write command used in the physical address API (type #2).

The write command is a command to request the flash storage device 3 to write the data. The write command may include the command ID, the block number BLK #, the logical address, the length, and the like.

The command ID is an ID (command code) indicating that this command is the write command, and the command ID for the write command is included in the write command.

The block number BLK #is an identifier (block address) capable of uniquely identifying the block to which the data should be written.

The logical address is an identifier for identifying write data to be written. The logical address may be LBA, a key of a key-value store, or a hash value of the key, as explained above. If the logical address is LBA, the logical address (starting LBA) included in the write command is indicative of a logical location (first logical location) to which the write data should be written.

The length is indicative of the length of the write data to be written. This length (data length) may be designated by the number of grains or the number of LBA, or the size may be designated by bytes.

When the controller 4 receives the write command from the host 2, the controller 4 determines the write destination location in the block having the block number designated by the write command. The write destination location is determined in consideration of the restrictions on page write order, the bad pages, and the like. The controller 4 writes the data from the host 2 to the write destination location in the block having the block number designated by the write command.

FIG. 39 shows a Trim command used in the physical address API (type #2).

The Trim command is a command including the block number of the block storing data which should be invalidated, and the logical address of the data. The Trim command includes the command ID, the block number BLK #, the logical address, the length, and the like.

The command ID is an ID (command code) indicating that this command is the Trim command, and the command ID for Trim command is included in the Trim command.

The block number is indicative of the block storing the data to be invalidated.

The logical address is indicative of a first logical location of the data to be invalidated.

The length is indicative of the length of the data to be invalidated. This length (data length) may be designated by the number of the logical addresses, the number of grains, or bytes.

The controller 4 manages a flag (bit map flag) indicative of validity/invalidity of each of the data included in each of the plural blocks, by using the block management table 32. If the controller 4 receives from the host 2 the Trim command including the block number indicative of the block storing the data to be invalidated is stored, and the logical address, the controller 4 updates the block management table 32, and changes the flag (bit map flag) corresponding to the in-block physical address specified by the block number and the logical address included in the Trim command to a value indicative of invalidity.

A sequence chart of FIG. 40 is indicative of a sequence of write processing corresponding to the physical address API (type #2).

The host 2 first selects the block (free block) which should be used for writing by itself or requests the flash storage device 3 to allocate the free block by transmitting the block allocate command to the flash storage device 3. Then, the host 2 transmits to the flash storage device 3 the write command including block number BLK #of the block selected by itself (or block number BLK #of the free block allocated by the flash storage device 3), the logical address (LBA), and the length (step S20A).

When the controller 4 of the flash storage device 3 receives the write command, the controller 4 determines the write destination location in the block (write destination block BLK #) having the block number BLK #to which the data should be written from the host 2, and writes the write data to the write destination location of the write destination block BLK #(step S11A). In step S11A, the controller 4 may write both of the logical address (LBA in this case) and the write data to the write destination block.

The controller 4 updates the in-block LUT corresponding to the write destination block BLK #and maps the offset (in-block offset) indicative of the write destination block to the logical address (step S12A).

Next, the controller 4 updates the block management table 32 corresponding to the write destination block BLK #, and changes a bit map flag corresponding to the written data (i.e., a bit map flag corresponding to the offset (in-block offset) to which the data has been written) from 0 to 1 (step S13A).

Figures 41, 42:
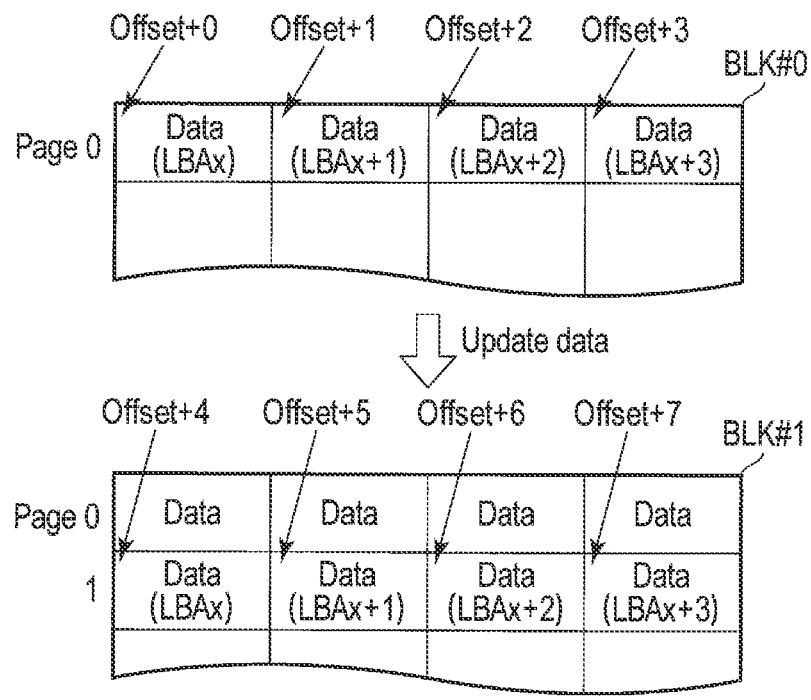
FIG. 41 is a diagram showing a data update operation of writing update data for already written data.
FIG. 42 is a diagram for explanation of an in-block LUT for block number BLK #1 managed by the flash storage device according to the embodiment.

It is assumed that as shown in FIG. 41, for example, 16K-byte update data in which starting LBA is LBAx are written to the physical storage locations corresponding to offsets +4 to +7 of block BLK #1. In this case, as shown in FIG. 42, offsets +4 to +7 are mapped to LBAx to LBAx+3, in the in-block LUT for block BLK #1. In addition, as shown in FIG. 43, each of the bit map flags corresponding to offsets +4 to +7 is changed from 0 to 1 in the block management table for block BLK #1.

The controller 4 returns a response (success/failure) to the write command to the host 2 (step S14A).

When the host 2 receives this response, the host 2 updates block-level LUT managed by the host 2 and maps the block number BLK #of the write destination block BLK #to the logical address corresponding to the written write data (step S21A). As shown in FIG. 44, the block-level LUT includes plural entries corresponding to the plural logical addresses (for example, LBA), respectively. In an entry corresponding to a certain logical address (for example, certain LBA), the block number of the NAND flash memory 5 in which the data corresponding to the LBA is stored. As shown in FIG. 41, if 16K-byte update data in which the starting LBA is LBAx is written to block BLK #1, the block-level LUT is updated and the block number corresponding to LBAx to LBAx+3 is changed from BLK #0 to BLK #1 as shown in FIG. 44.

After that, as shown in FIG. 40, the host 2 then transmits the Trim command to invalidate previous data which become unnecessary due to write of the above update data, to the flash storage device 3. The controller 4 of the flash storage device 3 updates the in-block LUT and the block management table in response to the Trim command (steps S15A and S16A).

Figure 45:
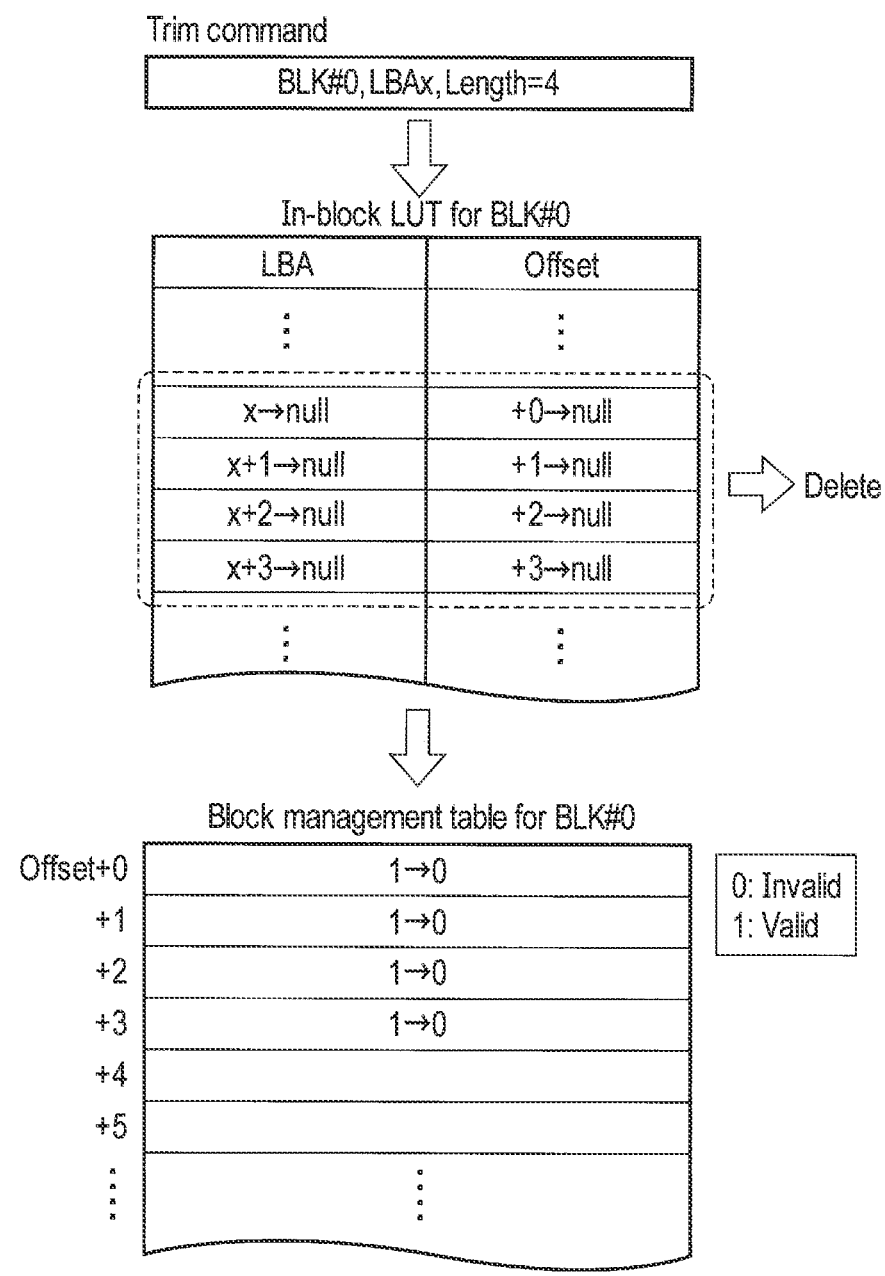
FIG. 45 is a diagram for explanation of an operation of updating the in-block LUT and the block management table in response to a notification from the host indicative of both of the block number and the physical address corresponding to data to be invalidated.

If the previous data are stored in the block BLK #0, as shown in FIG. 41, the Trim command designating the block number (=BLK #0), LBAx, and the length (=4) is transmitted from the host 2 to the flash storage device 3 as shown in FIG. 45. The controller 4 of the flash storage device 3 updates the in-block LUT corresponding to BLK #0 and deletes information indicative of mapping between LBAx to LBAx+3 and offsets +1 to +3, in response to the Trim command. In this case, the controller 4 may change LBAx to LBAx+3 and offsets +1 to +3 to values (null) indicative of invalidity. Furthermore, the controller 4 updates the block management table 32 corresponding to BLK #0 and changes each of the bit map flags corresponding to offsets +0 to +3 from 1 to 0.

FIG. 46 shows a read command used in the physical address API (type #2).

The read command is a command to request the flash storage device 3 to read the data. The read command includes the command ID, the block number BLK #, the logical address, the length, and the transfer destination pointer.

The command ID is an ID (command code) indicating that this command is the read command, and the command ID for the read command is included in the read command.

The block number BLK #is indicative of the block number of the block in which the data to be read is stored. The logical address is a logical address of the data to be read.

The length is indicative of the length of the data to be read. The data length may be designated by the number of LBAs or the number of grains.

The transfer destination pointer is indicative of the location on the memory in the host 2 to which the read data is to be transferred.

A sequence chart of FIG. 47 is indicative of a read operation corresponding to the physical address API (type #2).

The host 2 translates the logical address (LBA) included in the read request from the user application into the block number by referring to the in-block LUT managed by the host 2. Then, the host 2 transmits the read command designating the block number, the LBA, and the length to the flash storage device 3.

When the controller 4 of the flash storage device 3 receives the read command from the host 2, the controller 4 selects in-block LUT corresponding to the block number designated by the read command, refers to the selected in-block LUT with LBA in the read command, and acquires the offset (in-block offset) corresponding to this LBA (step S31A). The controller 4 reads the data corresponding to the LBA from the NAND flash memory 5, based on the block number designated by the read command and the acquired offset (in-block offset) (step S32A), and transmits the read data to the host 2.

FIG. 48 shows a garbage collection (GC) control command used in the physical address API (type #2).

The GC control command is used to notify the flash storage device 3 of the GC source block number and the GC destination block number. The host 2 manages the valid data amount/invalid data amount of each block, and can select several blocks in which the valid data amount is smaller as the GC source blocks. In addition, the host 2 manages the free block list, and can select several free blocks as the GC destination blocks. The GC control command may include the command ID, the GC source block number, the GC destination block number, and the like.

The command ID is the ID (command code) indicating that this command is the GC control command, and the command ID for the GC control command is included in the GC control command.

The GC source block number is a block number indicative of the GC source block. The host 2 can designate the block which should be the GC source block. The host 2 may set plural GC source block numbers to one GC control command.

The GC destination block number is a block number indicative of the GC destination block. The host 2 can designate the block which should be the GC destination block. The host 2 may set plural GC destination block numbers to one GC control command.

FIG. 49 shows a callback command for GC used in the physical address API (type #2).

The callback command for GC is used to notify the host 2 of a list including plural pairs of the logical addresses (LBAs) and the destination block numbers. The logical address (LBA) included in a certain pair is the logical address of the copied valid data. The destination block number included in this pair is the block number of the GC destination block in which the valid data has been copied. This callback command for GC may be transmitted from the flash storage device 3 to the host 2 only when the plural GC source block numbers and the plural GC destination block numbers are designated by the GC control command.

A sequence chart of FIG. 50 is indicative of a sequence of a garbage collection (GC) operation corresponding to the physical address API (type #2).

For example, if the number of remaining free blocks included in the free block list managed by the host 2 is reduced to a threshold value or less, the host 2 selects the GC source block and the GC destination block and transmits the GC control command to the flash storage device 3 (step S41A).

When receiving this GC control command, the controller 4 of the flash storage device 3 executes a data copy operation including an operation of determining a location (copy destination location) in the GC destination block to which the valid data in the GC source block should be written, and an operation of copying the valid data in the GC source block to the copy destination location in the GC destination block (step S51A). In step S51A, the data copy operation is repeated until copying all of the valid data in GC source block is completed. If plural GC source blocks are designated by the GC control command, the data copy operation is repeated until copying all of the valid data in all of the GC source blocks is completed.

Then, the controller 4 notifies the host 2 of the pairs of the logical addresses (LBAs) and the destination block numbers by using the callback command for GC (step S52A), and updates the in-block LUT corresponding to the GC source block and the in-block LUT corresponding to the GC destination block, such that the offset (in-block offset) mapped to the logical address of the copied valid data is changed from the offset (in-block offset) indicative of the copy source location in the GC source block to the offset (in-block offset) indicative of the copy destination location in the GC destination block (step S53A).

The host 2 updates the block-level LUT, based on the list of which the flash storage device 3 notifies the host 2 (step S42A).

<Details of Physical Address API (Type #3)>

Next, physical address API (type #3) will be explained with reference to FIG. 51 to FIG. 60.

FIG. 51 shows role sharing between the host and the conventional SSD, and role sharing between the host 2 and the flash storage device 3 supporting the physical address API (type #3).

The right part of FIG. 51 shows a hierarchical structure of the entire computing system including the host 2 and the flash storage device 3 supporting the physical address API (type #3).

In the host (server) 2, a virtual machine service 401 for providing the plural virtual machines to plural end users is executed. In each of the virtual machines on the virtual machine service 401, an operating system and user applications 402 used by the corresponding end users are executed.

In addition, in the host (server) 2, plural I/O services 403 corresponding to plural user applications 402 are executed. The I/O services 403 may include LBA-based block I/O service, key-value store service, and the like. Each of the I/O services 403 includes a lookup table (LUT) 411 which manages mapping between each of the logical addresses and each of the physical addresses of the flash storage device 3. The logical address is indicative of an identifier which can identify data to be accessed. The logical address may be the logical block address (LBA) which designates a location in the logical address space, a key (tag) of the key-value store or a hash value of the key.

In the LBA-based block I/O service, LUT 411 which manages mapping between each of the logical addresses (LBAs) and each of the physical addresses of the flash storage device 3 may be used.

In the key-value store service, LUT 411 which manages mapping between each of the logical addresses (i.e., tags such as keys) and each of the physical addresses indicative of the physical storage locations in the flash storage device 3 in which the data corresponding to the logical addresses (i.e., tags such as keys) are stored may be used. In the LUT 411, relationship between the tag, the physical address at which data identified by the tag is stored, and a data length of the data may be managed.

Each of the end users can select an addressing method (LBA, a key of the key-value store, or the like) which should be used.

Each LUT 411 does not translate each of the logical addresses from the user application 402 into each of the logical addresses for the flash storage device 3, but translates each of the logical addresses from the user application 402 into each of the physical addresses of the flash storage device 3. In other words, each LUT 411 is a table in which the table for translating the logical address for the flash storage device 3 into the physical address and the application-level address translation table are integrated (merged).

In addition, each I/O service 403 includes a GC block selection function. The GC block selection function can manage a valid data amount of each block by using the corresponding LUT and can thereby select the GC source block.

In the host (server) 2, the I/O service 403 may exist for each of the QOS domains. The I/O service 403 belonging to a certain QoS domain may manage mapping between each of the logical addresses used by the user application 402 in the corresponding QoS domain and each of the block numbers of the blocks belonging to the resource group allocated to the corresponding QoS domain.

Transmission of the command from the host (server) 2 to the flash storage device 3 and return of a response of command completion or the like from the flash storage device 3 to the host (server) 2 are executed via an I/O queue 500 which exists in each of the host (server) 2 and the flash storage devices 3. The I/O queues 500 may also be classified into plural queue groups corresponding to the plural QOS domains.

The flash storage device 3 comprises plural write buffers (WB) 601 corresponding to the QOS domains, plural garbage collection (GC) functions 603A corresponding to the QoS domains, and the NAND flash memories (NAND flash array) 603.

In the configuration shown at the right part of FIG. 51, since the upper layer (host 2) can recognize the block boundary, the upper layer can write the user data to each block in consideration of the block boundary/block size. In other words, the host 2 can recognize each of blocks of the NAND flash memory (NAND flash array) 603 and can thereby execute, for example, the control such as simultaneously writing the data to one entire block or invalidating the entire data in one block by deleting (unmapping) or updating. As a result, a situation in which the valid data and the invalid data exist together in one block can be prevented from easily occurring. The frequency at which GC needs to be executed can be therefore reduced. By reducing the frequency of GC, the write amplification can be lowered, the performance of the flash storage device 3 can be improved, and the life of the flash storage device 3 can be extended to the maximum value. Thus, the configuration that the upper layer (host 2) can recognize the block number is useful.

In contrast, the location in the block to which the data should be written is determined by not the upper layer (host 2), but the flash storage device 3. Therefore, the defective page (bad page) can be concealed and the restrictions on page write order can be secured.

FIG. 52 shows a data write operation corresponding to the physical address API (type #3) and a data read operation corresponding to the physical address API (type #3).

The data write operation is executed in the following steps.

(1) When a write processing unit 412 of the host 2 needs to write the data (write data) to the flash storage device 3, the write processing unit 412 may request the flash storage device 3 to allocate the free block. The controller 4 of the flash storage device 3 comprises a block allocation unit 701 which manages a free blocks of the NAND flash memory 5. When the block allocation unit 701 receives this request (block allocate request) from the write processing unit 412, the block allocation unit 701 allocates one free block of the free blocks to the host 2 and notifies the host 2 of a block number (BLK #) of the allocated block.

Alternatively, the write processing unit 412 may select the write destination block by itself, in the configuration in which the write processing unit 412 manages the free blocks.

(2) The write processing unit 412 transmits to the flash storage device 3 the write request which designate both of the logical address (for example, LBA) corresponding to the write data and the block number (BLK #) of the write destination block.

(3) The controller 4 of the flash storage device 3 comprises a page allocation unit 702 which allocates a page for data write. When the page allocation unit 702 receives the write request, the page allocation unit 702 determines an in-block physical address (in-block PBA) indicative of the write destination location in the block (write destination block) having the block number designated by the write request. The in-block physical address (in-block PBA) can be represented by the in-block offset as explained above (or simply referred to as the offset). The controller 4 writes the write data from the host 2 to the write destination location in the write destination block, based on both of the block number designated by the write request and the in-block physical address (in-block PBA).

(4) The controller 4 notifies the host 2 of the in-block physical address (in-block PBA) indicative of the write destination location as a response to the write request. Alternatively, the controller 4 may notify the host 2 of the group of the logical address (LBA) corresponding to the write data, the block number (BLK #) of the write destination block, and the in-block PBA (offset) indicative of the write destination location, as the response to the write request. In other words, the controller notifies the host of either the in-block physical address or the group of the logical address, the block number, and the in-block physical address. In the host 2, LUT 411 is updated such that the physical address (block number and in-block physical address (in-block offset)) indicative of the physical storage location to which the write data is written is mapped to the logical address of the write data.

The data read operation is executed in the following steps.

(1)' When the host 2 needs to read the data from the flash storage device 3, the host 2 acquires the physical address (block number and in-block physical address (in-block offset)) corresponding to the logical address of the data to be read, from LUT 411, by referring to LUT 411.

(2)' The host 2 transmits the read request designating the acquired block number and the acquired in-block physical address (in-block offset) to the flash storage device 3. When the controller 4 of the flash storage device 3 receives the read request from the host 2, the controller 4 specifies the block to be read and the physical storage location to be read, and reads the data from the physical storage location to be read in the block to be read, based on the block number and the in-block physical address.

FIG. 53 shows a write command used in the physical address API (type #3).

The write command is a command to request the flash storage device 3 to write the data. The write command may include the command ID, the block number BLK #, the logical address, the length, and the like.

The command ID is an ID (command code) indicating that this command is the write command, and the command ID for the write command is included in the write command.

The block number BLK # is an identifier (block address) capable of uniquely identifying the block to which the data should be written.

The logical address is an identifier for identifying write data to be written. The logical address may be LBA, a key of a key-value store, or a hash value of the key, as explained above. If the logical address is LBA, the logical address (starting LBA) included in the write command is indicative of a logical location (first logical location) to which the write data should be written.

The length is indicative of the length of the write data to be written. This length (data length) may be designated by the number of grains or the number of LBA, or the size may be designated by bytes.

When the controller 4 receives the write command from the host 2, the controller 4 determines the write destination location in the block having the block number designated by the write command. The write destination location is determined in consideration of the restrictions on page write order, the bad pages, and the like. The controller 4 writes the data from the host 2 to the write destination location in the block having the block number designated by the write command.

FIG. 54 shows a response to the write command shown in FIG. 53.

This response includes the in-block physical address and the length. The in-block physical address is indicative of a location in the block (physical storage location) to which the data is written. The in-block physical address can be designated by the in-block offset as explained above. The length is indicative of the length of the written data. This length (data length) may be designated by the number of grains or the number of LBA, or the size may be designated by bytes.

Alternatively, this response may include not only the in-block physical address and the length, but also the logical address and the block number. The logical address is the logical address included in the write command shown in FIG. 53. The block number is the block address included in the write command shown in FIG. 53.

FIG. 55 shows a Trim command used in the physical address API (type #3).

The Trim command is a command including the block number and the in-block physical address (in-block offset) indicative of the physical storage location in which data to be invalidated is stored. In other words, the Trim command can designate not the logical address such as LBA, but the physical address. The Trim command includes the command ID, the physical address, and the length.

The command ID is an ID (command code) indicating that this command is the Trim command, and the command ID for Trim command is included in the Trim command.

The physical address is indicative of a first physical storage location to which the data to be invalidated is stored. In the flash storage device 3 supporting the physical address API (type #3), the physical address is designated by a combination of the block number and the offset (in-block offset).

The length is indicative of the length of the data to be invalidated. This length (data length) may be designated by the number of grains or bytes.

The controller 4 manages a flag (bit map flag) indicative of validity/invalidity of each of the data included in each of the plural blocks, by using the block management table 32. If the controller 4 receives from the host 2 the Trim command including the block number and the offset (in-block offset) indicative of the physical storage location in which the data to be invalidated is stored, the controller 4 updates the block management table 32, and changes the flag (bit map flag) corresponding to the data of the physical storage location corresponding to the block number and the in-block offset included in the Trim command to a value indicative of invalidity.

A sequence chart of FIG. 56 is indicative of a sequence of write processing corresponding to the physical address API (type #3).

The host 2 first selects the block (free block) which should be used for writing by itself or requests the flash storage device 3 to allocate the free block by transmitting the block allocate command to the flash storage device 3. Then, the host 2 transmits to the flash storage device 3 the write command including block number BLK # of the block selected by itself (or block number BLK # of the free block allocated by the flash storage device 3), the logical address (LBA), and the length (step S20B).

When the controller 4 of the flash storage device 3 receives the write command, the controller 4 determines the write destination location in the block (write destination block BLK #) having the block number BLK # to which the data should be written from the host 2, and writes the write data to the write destination location of the write destination block BLK # (step S11B). In step S11B, the controller 4 may write both of the logical address (LBA in this case) and the write data to the write destination block.

The controller 4 updates the block management table 32 corresponding to the write destination block BLK #, and changes a bit map flag corresponding to the written data (i.e., a bit map flag corresponding to the offset (in-block offset) to which the data has been written) from 0 to 1 (step S12B).

As shown in FIG. 56, the controller 4 returns a response to the write command to the host 2 (step S13B). This response includes at least the offset (in-block offset) to which the data is written.

When the host 2 receives this response, the host 2 updates LUT 411 managed by the host 2 and maps the physical address to each of the logical addresses corresponding to the written write data (step S21B).

The host 2 then transmits the Trim command to invalidate previous data which become unnecessary due to write of the above update data, to the flash storage device 3. The controller 4 of the flash storage device 3 updates the block management table 32 in response to the Trim command (FIG. 56, step S14B).

FIG. 57 shows a read command used in the physical address API (type #3).

The read command is a command to request the flash storage device 3 to read the data. The read command includes the command ID, the physical address PBA, the length, and the transfer destination pointer.

The command ID is an ID (command code) indicating that this command is the read command, and the command ID for the read command is included in the read command.

The physical address PBA is indicative of a first physical storage location from which the data should be read. The physical address PBA is designated by the block number and the offset (in-block offset).

The length is indicative of the length of the data to be read. The data length can be designated by the number of grains.

The transfer destination pointer is indicative of the location on the memory in the host 2 to which the read data is to be transferred.

One read command can designate plural sets of the physical addresses PBA (block numbers and offsets) and the lengths.

FIG. 58 shows a garbage collection (GC) control command used in the physical address API (type #3).

The GC control command is used to notify the flash storage device 3 of the GC source block number and the GC destination block number. The host 2 manages the valid data amount/invalid data amount of each block, and can select several blocks in which the valid data amount is smaller as the GC source blocks. In addition, the host 2 manages the free block list, and can select several free blocks as the GC destination blocks. The GC control command may include the command ID, the GC source block number, the GC destination block number, and the like.

The command ID is the ID (command code) indicating that this command is the GC control command, and the command ID for the GC control command is included in the GC control command.

The GC source block number is a block number indicative of the GC source block. The host 2 can designate the block which should be the GC source block. The host 2 may set plural GC source block numbers to one GC control command.

The GC destination block number is a block number indicative of the GC destination block. The host 2 can designate the block which should be the GC destination block. The host 2 may set plural GC destination block numbers to one GC control command.

FIG. 59 shows a callback command for GC used in the physical address API (type #3).

The callback command for GC is used to notify the host 2 of the logical address of the valid data copied by GC, and the block number and the offset indicating the copy destination location of this valid data.

The callback command for GC may include the command ID, the logical address, the length, and a destination physical address.

The command ID is the ID (command code) indicating that this command is the callback command for GC, and the command ID for the callback command for GC is included in the callback command for GC.

The logical address is indicative of a logical address of the valid data copied from the GC source block to the GC destination block by GC.

The length is indicative of the length of the copied data. The data length may be designated by the number of grains.

The destination physical address is indicative of a location in the GC destination block in which the valid data is copied. The destination physical address is designated by the block number and the offset (in-block offset).

A sequence chart of FIG. 60 is indicative of a sequence of a garbage collection (GC) operation corresponding to the physical address API (type #3).

For example, if the number of remaining free blocks included in the free block list managed by the host 2 is reduced to a threshold value or less, the host 2 selects the GC source block and the GC destination block, and transmits the GC control command designating the selected GC source block and the selected GC destination block to the flash storage device 3 (step S41B). Alternatively, when the number of remaining free blocks becomes smaller than or equal to the threshold value, in a configuration in which the write processing unit 412 manages the free blocks, the write processing unit 412 may notify the host 2 of the reduction in the number of the free blocks and the host 2 receiving the notification may select the block and transmit the GC control command.

When receiving this GC control command, the controller 4 of the flash storage device 3 executes a data copy operation including an operation of determining a location (copy destination location) in the GC destination block to which the valid data in the GC source block should be written, and an operation of copying the valid data in the GC source block to the copy destination location in the GC destination block (step S51B). In step S51B, the controller 4 copies not only the valid data in the GC source block (copy source block) but also both of the valid data and the logical address corresponding to the valid data from the GC source block (copy source block) to the GC destination block (copy destination block). A pair of the data and the logical address can be thereby held in the GC destination block (copy destination block).

In addition, in step S51B, the data copy operation is repeated until copying all of the valid data in GC source block is completed. If plural GC source blocks are designated by the GC control command, the data copy operation is repeated until copying all of the valid data in all of the GC source blocks is completed.

Then, the controller 4 notifies the host 2 of the logical address (LBA) of the valid data, the destination physical address indicative of the copy destination location of the valid data, and the like, for each copied valid data, by using the callback command for GC (step S52B). The destination physical address corresponding to certain valid data is represented by the block number of the copy destination block (GC destination block) to which the valid data is copied, and the in-block physical address (in-block offset) indicative of the physical storage location in the copy destination block to which the valid data is copied.

When the host 2 receives this callback command for GC, the host 2 updates LUT 411 managed by the host 2 and maps the destination physical address (block number and in-block offset) to the logical address corresponding to each of the copied valid data (step S42B).

As explained above, according to the embodiments, plural types of interfaces to access the NAND flash memory 5 are supported and the interfaces to be used can be changed for each region to be accessed inside the NAND flash memory 5. The host 2 can therefore selectively use the plural regions corresponding to different types of interfaces. In addition, the plural regions include, at least, the first region that is read accessed using the first type interface where the host 2 designates the logical address and does not designate the physical address of the NAND flash memory 5, and the second region that is read accessed using the second type interface where the host 2 designates a part of or all of the physical address of the NAND flash memory 5.

In the first type interface, the host 2 does not need to designate the physical address of the NAND flash memory 5 but may designate the only logical address corresponding to the data to be read. Therefore, when read accessing the first region, the function group for directly handling the NAND flash memory 5 does not need to be already run on the host 2. Thus, the first region can be used as a bootable region for booting the operating system.

In addition, when the data is read by using the second type interface (physical address API), the host 2 can designate a part of or all of the physical address of the NAND flash memory 5. The host 2 can therefore use the physical address API as needed and directly access the NAND flash memory 5.

The flash storage device 3 may be utilized as one of plural flash storage devices 3 provided in the storage array. The storage array may be connected to the information processing device such as a server computer via a cable or a network. The storage array comprises a controller which controls the flash storage devices 3 in the storage array. If the flash storage devices 3 are applied to the storage array, the controller of the storage array may function as the host 2 of the flash storage devices 3.

In addition, in the present embodiments, the NAND flash memory has been explained as an example of a nonvolatile memory. However, the functions of the present embodiments are also applicable to the other various nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
   a nonvolatile memory that includes a plurality of blocks, each of the plurality of blocks being a unit of a data erase operation; and
   a controller electrically connected to the nonvolatile memory and configured to:
      manage one or more block groups, each of the one or more block groups including at least one of the plurality of blocks;
      manage a first command set in which first access target data is specified by using a logical block address (LBA) of the first access target data but not using an identifier of a block or a block group in which the first access target data is stored;
      manage a second command set in which second access target data is specified by using an LBA of the second access target data and an identifier of a block or a block group in which the second access target data is stored; and
      in response to receiving a command from a host, the command requesting to create a namespace and specifying the first command set or the second command set, allow the host to selectively use the first command set or the second command set that is specified in the command for the created namespace to issue an access command associated with the created namespace.

2. The memory system according to claim 1, wherein the controller is further configured to:
   manage a plurality of namespaces, the plurality of namespaces including at least a first namespace and a second namespace;
   allow the host to use the first command set for the first namespace, the first command set including at least a first write command that specifies first data that is target data of the first write command by using a first LBA associated with the first data but not using an identifier of a block or a block group to which the first data is to be written; and
   allow the host to use the second command set for the second namespace, the second command set including at least a second write command that specifies second data that is target data of the second write command by using at least a second LBA associated with the second data and an identifier of a block or a block group to which the second data is to be written.

3. The memory system according to claim 2, wherein the plurality of blocks includes at least a first block and a second block, and
the controller is further configured to:
   in response to receiving the first write command from the host, the first write command including the first LBA but not including an identifier of the first block to which the first data is to be written, write the first data to a first location in the first block; and
   in response to receiving the second write command from the host, the second write command including an identifier of the second block to which the second data is to be written, write the second data to a second location in the second block.

4. The memory system according to claim 3, wherein the controller is further configured to notify the host of the second location by using an offset address in the second block.

5. The memory system according to claim 2, wherein the first command set further includes a first read command that specifies third data that is target data of the first read command by using a third LBA associated with the third data but not using an identifier of a block or a block group from which the third data is to be read.

6. The memory system according to claim 5, wherein the plurality of blocks includes at least a third block, and the controller is further configured to:
   in response to receiving the first read command from the host, the first read command including the third LBA but not including an identifier of the third block from which the third data is to be read, read the third data from a third location in the third block.

7. The memory system according to claim 2, wherein the second command set further includes a second read command that specifies fourth data that is target data of the second read command by using at least an identifier of a block or a block group from which the fourth data is to be read.

8. The memory system according to claim 7, wherein the plurality of blocks includes at least a fourth block, and the controller is further configured to:
   in response to receiving the second read command from the host, the second read command including an identifier of the fourth block from which the fourth data is to be read, read the fourth data from a fourth location in the fourth block.

9. The memory system according to claim 1, wherein the command further specifies an LBA range, and the created namespace includes a plurality of LBAs corresponding to the LBA range specified in the command.

10. A memory system, comprising:
a nonvolatile memory; and
a controller electrically connected to the nonvolatile memory and configured to:
   manage a first command set in which first access target data is specified by using a logical block address (LBA) of the first access target data;

manage a second command set in which second access target data is specified by using at least a key of a key-value store relating to the second access target data; and in response to receiving a command from a host, the command requesting to create a namespace and specifying the first command set or the second command set, allow the host to selectively use the first command set or the second command set that is specified in the command for the created namespace to issue an access command associated with the created namespace.

11. A method of controlling a nonvolatile memory that includes a plurality of blocks, each of the plurality of blocks being a unit of a data erase operation, the method comprising:

managing one or more block groups, each of the one or more block groups including at least one of the plurality of blocks;

managing a first command set in which first access target data is specified by using a logical block address (LBA) of the first access target data but not using an identifier of a block or a block group in which the first access target data is stored;

managing a second command set in which second access target data is specified by using an LBA of the second access target data and an identifier of a block or a block group in which the second access target data is stored;

receiving a command from a host, the command requesting to create a namespace and specifying the first command set or the second command set; and in response to receiving the command from the host, allowing the host to selectively use the first command set or the second command set that is specified in the command for the created namespace to issue an access command associated with the created namespace.

12. The method according to claim 11, further comprising:

managing a plurality of namespaces, the plurality of namespaces including at least a first namespace and a second namespace;

allowing the host to use the first command set for the first namespace, the first command set including at least a first write command that specifies first data that is target data of the first write command by using a first LBA associated with the first data but not using an identifier of a block or a block group to which the first data is to be written; and allowing the host to use the second command set for the second namespace, the second command set including at least a second write command that specifies second data that is target data of the second write command by using a second LBA associated with the second data and at least an identifier of a block or a block group to which the second data is to be written.

13. The method according to claim 12, wherein the plurality of blocks includes at least a first block and a second block, and the method further comprises:

in response to receiving the first write command from the host, the first write command including the first LBA but not including an identifier of the first block to which the first data is to be written, writing the first data to a first location in the first block; and in response to receiving the second write command from the host, the second write command including an identifier of the second block to which the second data is to be written, writing the second data to a second location in the second block.

14. The method according to claim 13, further comprising:

notifying the host of the second location by using an offset address in the second block.

15. The method according to claim 12, wherein the first command set further includes a first read command that specifies third data that is target data of the first read command by using a third LBA associated with the third data but not using an identifier of a block or a block group from which the third data is to be read.

16. The method according to claim 15, wherein the plurality of blocks includes at least a third block, and the method further comprises:

in response to receiving the first read command from the host, the first read command including the third LBA but not including an identifier of the third block from which the third data is to be read, reading the third data from a third location in the third block.

17. The method according to claim 12, wherein the second command set further includes a second read command that specifies fourth data that is target data of the second read command by using at least an identifier of a block or a block group from which the fourth data is to be read.

18. The method according to claim 17, wherein the plurality of blocks includes at least a fourth block, and the method further comprises:

in response to receiving the second read command from the host, the second read command including an identifier of the fourth block from which the fourth data is to be read, reading the fourth data from a fourth location in the fourth block.

19. The method according to claim 11, wherein the command further specifies an LBA range, and the created namespace includes a plurality of LBAs corresponding to the LBA range specified in the command.

* * * * *